(12) United States Patent
Craven et al.

(10) Patent No.: US 12,259,399 B2
(45) Date of Patent: Mar. 25, 2025

(54) SYSTEMS, APPARATUS AND METHODS TO PICK AND/OR PLACE SPECIMEN CONTAINERS

(71) Applicant: TMRW LIFE SCIENCES, INC., New York, NY (US)

(72) Inventors: James Norman Craven, Ely (GB); Ian James Riley, Middlesbrough (GB); Matthew Watson, Marske by the Sea (GB)

(73) Assignee: TMRW Life Sciences, Inc., New York, NY (US)

( * ) Notice: Subject to any disclaimer, the term of this patent is extended or adjusted under 35 U.S.C. 154(b) by 690 days.

(21) Appl. No.: 17/573,935

(22) Filed: Jan. 12, 2022

(65) Prior Publication Data
US 2022/0221476 A1 Jul. 14, 2022

Related U.S. Application Data

(60) Provisional application No. 63/136,886, filed on Jan. 13, 2021.

(51) Int. Cl.
*G01N 35/00* (2006.01)
*G01N 35/10* (2006.01)

(52) U.S. Cl.
CPC ......... *G01N 35/0099* (2013.01); *G01N 35/10* (2013.01)

(58) Field of Classification Search
CPC ...... G01N 35/0099; G01N 35/10; G01N 1/42; G01N 2035/00445; G01N 35/04; G01N 2035/041
See application file for complete search history.

(56) References Cited

U.S. PATENT DOCUMENTS

| 4,573,581 A | 3/1986 | Galloway et al. |
| 5,024,830 A | 6/1991 | Linner |

(Continued)

FOREIGN PATENT DOCUMENTS

| AU | 2011357590 B2 | 9/2015 |
| AU | 2017287017 A1 | 1/2019 |

(Continued)

OTHER PUBLICATIONS

International Search Report and Written Opinion for PCT/US2022/012151, mailed Apr. 29, 2022, 9 pages.

(Continued)

*Primary Examiner* — Jennifer Wecker
*Assistant Examiner* — Britney N. Washington
(74) *Attorney, Agent, or Firm* — Cozen O'Connor

(57) ABSTRACT

A system, device and method to pick and/or place specimen containers. The system or device may include a mechanical pick and/or place head, or a vacuum-based pick and/or place head. The mechanical pick and/or place head may include a drive shaft with an engagement head to draw a single specimen container into a receiver and retain such until positioned to place such. The vacuum-based mechanical pick and/or place head may include a vacuum conduit to draw a single specimen container into a receiver and drive shaft that orients a portion of the receiver to retain such until positioned to place such. Various sensors may be employed, for example to detect frost, and a defroster employed.

23 Claims, 27 Drawing Sheets

(56) References Cited

U.S. PATENT DOCUMENTS

| | | |
|---|---|---|
| 5,176,202 A | 1/1993 | Richard |
| 5,355,684 A | 10/1994 | Guice |
| 5,545,562 A | 8/1996 | Cassou et al. |
| 5,741,462 A | 4/1998 | Nova et al. |
| 5,751,629 A | 5/1998 | Nova et al. |
| 5,874,214 A | 2/1999 | Nova et al. |
| 5,921,102 A | 7/1999 | Vago |
| 5,925,562 A | 7/1999 | Nova et al. |
| 5,964,095 A | 10/1999 | Coelho et al. |
| 6,100,026 A | 8/2000 | Nova et al. |
| 6,141,975 A | 11/2000 | Tatsumi |
| 6,156,566 A | 12/2000 | Bryant |
| 6,302,327 B1 | 10/2001 | Coelho et al. |
| 6,329,139 B1 | 12/2001 | Nova et al. |
| 6,564,120 B1 | 5/2003 | Richard et al. |
| 7,070,053 B1 | 7/2006 | Abrams et al. |
| 7,091,864 B2 | 8/2006 | Veitch et al. |
| 7,278,328 B2 | 10/2007 | Massaro |
| 7,316,896 B2 | 1/2008 | Kuwayama et al. |
| 7,350,703 B2 | 4/2008 | Ambartsoumian |
| 7,411,508 B2 | 8/2008 | Harazin et al. |
| 7,661,591 B2 | 2/2010 | Dearing et al. |
| 7,694,886 B2 | 4/2010 | Tan et al. |
| 7,861,540 B2 | 1/2011 | Cloutier et al. |
| 7,870,748 B2 | 1/2011 | Byrne |
| D642,697 S | 8/2011 | Gaefvert |
| 8,097,199 B2 | 1/2012 | Abbott et al. |
| 8,098,162 B2 | 1/2012 | Abbott et al. |
| 8,115,599 B2 | 2/2012 | Harazin et al. |
| 8,168,138 B2 | 5/2012 | Che et al. |
| 8,378,827 B2 | 2/2013 | Davidowitz et al. |
| 8,502,645 B2 | 8/2013 | Thomas et al. |
| 8,710,958 B2 | 4/2014 | Yang et al. |
| 8,790,597 B2 | 7/2014 | Childs et al. |
| 8,852,536 B2 | 10/2014 | Davidowitz et al. |
| 8,872,627 B2 | 10/2014 | Davidowitz |
| 8,884,743 B2 | 11/2014 | Chaffey et al. |
| 8,919,532 B2 | 12/2014 | Buergermeister et al. |
| 8,937,550 B2 | 1/2015 | Phaneuf et al. |
| 9,028,754 B2 | 5/2015 | Winter et al. |
| 9,140,487 B2 | 9/2015 | Chaffey et al. |
| 9,163,869 B2 | 10/2015 | Warhurst et al. |
| 9,211,540 B2 | 12/2015 | Lansdowne |
| 9,297,499 B2 | 3/2016 | Jimenez-Rios et al. |
| 9,418,265 B2 | 8/2016 | Morris et al. |
| 9,431,692 B2 | 8/2016 | Davidowitz et al. |
| D768,868 S | 10/2016 | Inoue |
| 9,501,734 B2 | 11/2016 | Morris |
| 9,516,876 B2 | 12/2016 | Inoue |
| 9,538,746 B2 | 1/2017 | Inoue |
| 9,538,747 B2 | 1/2017 | Inoue |
| 9,547,782 B2 | 1/2017 | Lansdowne |
| 9,551,649 B2 | 1/2017 | Houghton et al. |
| 9,589,225 B2 | 3/2017 | Morris |
| 9,619,678 B2 | 4/2017 | Morris et al. |
| 9,697,457 B2 | 7/2017 | Morris |
| 9,723,832 B2 | 8/2017 | Camenisch et al. |
| 9,736,890 B2 | 8/2017 | Chaffey et al. |
| 9,764,325 B2 | 9/2017 | Davidowitz |
| 9,796,574 B2 | 10/2017 | Frey et al. |
| 9,928,457 B2 | 3/2018 | McDowell |
| 10,156,386 B2 | 12/2018 | Bartlett et al. |
| 10,207,270 B2 | 2/2019 | Lansdowne |
| 10,241,015 B2 | 3/2019 | Hollabaugh et al. |
| 10,328,431 B2 | 6/2019 | Davidowitz |
| 10,401,082 B2 | 9/2019 | Coradetti et al. |
| 10,493,457 B2 | 12/2019 | Croquette et al. |
| 10,531,657 B2 | 1/2020 | Farrington et al. |
| 10,561,141 B2 | 2/2020 | Suzuki et al. |
| 10,677,810 B2 | 6/2020 | Grimwood et al. |
| 10,748,050 B2 | 8/2020 | Morris et al. |
| 10,973,226 B2 | 4/2021 | Blair et al. |
| 10,989,636 B2 | 4/2021 | Gutelius et al. |
| 11,148,143 B2 | 10/2021 | Davidowitz et al. |
| 11,175,298 B2 | 11/2021 | Neeper et al. |
| 2002/0190845 A1 | 12/2002 | Moore |
| 2002/0196146 A1 | 12/2002 | Moore |
| 2003/0174046 A1 | 9/2003 | Abrams |
| 2004/0100415 A1 | 5/2004 | Veitch et al. |
| 2005/0058483 A1 | 3/2005 | Chapman et al. |
| 2005/0237195 A1 | 10/2005 | Urban |
| 2005/0247782 A1 | 11/2005 | Ambartsoumian |
| 2006/0051239 A1 | 3/2006 | Massaro |
| 2006/0283945 A1 | 12/2006 | Excoffier et al. |
| 2007/0068208 A1 | 3/2007 | Norman et al. |
| 2007/0172396 A1 | 7/2007 | Neeper et al. |
| 2008/0012687 A1 | 1/2008 | Rubinstein |
| 2008/0024301 A1 | 1/2008 | Fritchie et al. |
| 2008/0121700 A1 | 5/2008 | Dearing et al. |
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0141384 A1 | 6/2010 | Chen et al. |
| 2010/0281886 A1 | 11/2010 | Shaham et al. |
| 2010/0302040 A1 | 12/2010 | Davidowitz et al. |
| 2010/0318217 A1 | 12/2010 | Ferrer et al. |
| 2011/0088424 A1 | 4/2011 | Cloutier et al. |
| 2011/0088517 A1* | 4/2011 | Tsujimura ............ G01N 35/026 81/3.2 |
| 2011/0137812 A1 | 6/2011 | Sherga |
| 2011/0143452 A1 | 6/2011 | Che et al. |
| 2011/0181875 A1 | 7/2011 | Nakahana et al. |
| 2011/0199187 A1 | 8/2011 | Davidowitz |
| 2011/0199188 A1 | 8/2011 | Dickson |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |
| 2012/0167786 A1 | 7/2012 | Lagharn, Jr. |
| 2012/0256806 A1 | 10/2012 | Davidowitz et al. |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Lagharn et al. |
| 2013/0217107 A1 | 8/2013 | Pederson et al. |
| 2013/0342320 A1 | 12/2013 | Hinman et al. |
| 2014/0008355 A1 | 1/2014 | Chaffey et al. |
| 2014/0157798 A1 | 6/2014 | Jimenez-Rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0295328 A1 | 10/2015 | Fireaizen |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0086003 A1 | 3/2016 | Nikitin |
| 2016/0095309 A1 | 4/2016 | Reuteler |
| 2016/0143270 A1 | 5/2016 | Schryver |
| 2016/0175837 A1 | 6/2016 | Chaffey et al. |
| 2016/0288999 A1 | 10/2016 | Caveney et al. |
| 2016/0289000 A1 | 10/2016 | Caveney et al. |

(56) References Cited

U.S. PATENT DOCUMENTS

| | | |
|---|---|---|
| 2016/0349172 A1 | 12/2016 | Houghton et al. |
| 2016/0353730 A1 | 12/2016 | Harston et al. |
| 2016/0358062 A1 | 12/2016 | Morris |
| 2017/0113909 A1 | 4/2017 | Frey et al. |
| 2017/0122846 A1 | 5/2017 | Holmes et al. |
| 2017/0184479 A1 | 6/2017 | Schryver et al. |
| 2017/0190056 A1 | 7/2017 | Lapham et al. |
| 2017/0320054 A1 | 11/2017 | Crum et al. |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |
| 2018/0202908 A1 | 7/2018 | Croquette et al. |
| 2018/0313498 A1 | 11/2018 | Antola et al. |
| 2018/0368394 A1 | 12/2018 | Kjelland et al. |
| 2019/0000073 A1 | 1/2019 | Pedersen et al. |
| 2019/0025280 A1 | 1/2019 | Kaditz et al. |
| 2019/0060892 A1 | 2/2019 | Davidowitz et al. |
| 2019/0162639 A1 | 5/2019 | Gutelius et al. |
| 2019/0193078 A1 | 6/2019 | Fiondella et al. |
| 2019/0250181 A1 | 8/2019 | Seeber |
| 2019/0276233 A1* | 9/2019 | Caveney ............... F25D 29/001 |
| 2019/0293344 A1* | 9/2019 | Sun .................... G01N 35/0099 |
| 2019/0297877 A1 | 10/2019 | Komatsu et al. |
| 2020/0097788 A1 | 3/2020 | Pedersen et al. |
| 2020/0107541 A1 | 4/2020 | Blair et al. |
| 2020/0143930 A1 | 5/2020 | Catchings et al. |
| 2020/0248638 A1 | 8/2020 | Engfehr et al. |
| 2020/0319625 A1 | 10/2020 | Morris et al. |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1 | 3/2022 | Gupta et al. |
| 2022/0136656 A1 | 5/2022 | Clarke et al. |
| 2023/0329230 A1 | 10/2023 | Li et al. |

FOREIGN PATENT DOCUMENTS

| | | |
|---|---|---|
| CA | 2972315 A1 | 8/2016 |
| CN | 105857932 A | 8/2016 |
| CN | 105890965 A | 8/2016 |
| CN | 106102460 A | 11/2016 |
| CN | 205815766 U | 12/2016 |
| CN | 106370879 A | 2/2017 |
| CN | 106871546 A | 6/2017 |
| CN | 107624751 A | 1/2018 |
| CN | 207595583 U | 7/2018 |
| CN | 207663251 U | 7/2018 |
| CN | 207675193 U | 7/2018 |
| CN | 108541702 A | 9/2018 |
| CN | 109258627 A | 1/2019 |
| CN | 208425434 U | 1/2019 |
| CN | 109922887 A | 6/2019 |
| CN | 110476952 A | 11/2019 |
| CN | 110517737 A | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 210711515 U | 6/2020 |
| CN | 111771211 A | 10/2020 |
| CN | 112090469 A | 12/2020 |
| CN | 112189657 A | 1/2021 |
| CN | 112325976 A | 2/2021 |
| CN | 112325978 A | 2/2021 |
| CN | 112340334 A | 2/2021 |
| CN | 112841172 A | 5/2021 |
| CN | 213274464 U | 5/2021 |
| CN | 112894791 A | 6/2021 |
| CN | 213863260 U | 8/2021 |
| CN | 213872207 U | 8/2021 |
| CN | 213874569 U | 8/2021 |
| CN | 213995979 U | 8/2021 |
| CN | 214006820 U | 8/2021 |
| CN | 214216855 U | 9/2021 |
| CN | 214358041 U | 10/2021 |
| CN | 214398091 U | 10/2021 |
| CN | 214758843 U | 11/2021 |
| CN | 115352743 A | 11/2022 |
| CN | 219596677 U | 8/2023 |
| DE | 102011012887 A1 | 8/2012 |
| EP | 0411224 A2 | 2/1991 |
| EP | 0706825 A1 | 4/1996 |
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2301857 A1 | 3/2011 |
| EP | 2315163 A1 | 4/2011 |
| EP | 2358196 A1 | 8/2011 |
| EP | 2467465 A1 | 6/2012 |
| EP | 2124171 B1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2614320 B1 | 10/2016 |
| EP | 2354729 B1 | 12/2016 |
| EP | 2873497 B1 | 5/2017 |
| EP | 2948247 B1 | 11/2017 |
| EP | 2743865 B1 | 6/2019 |
| EP | 2866938 B1 | 6/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3655892 A1 | 5/2020 |
| EP | 3228191 B1 | 8/2020 |
| ES | 2467465 A2 | 6/2014 |
| ES | 2595984 T3 | 1/2017 |
| JP | 2001142861 A | 5/2001 |
| JP | 2004028595 A | 1/2004 |
| JP | 2005009863 A | 1/2005 |
| JP | 2005239366 A | 9/2005 |
| JP | 2005321935 A | 11/2005 |
| JP | 2007235905 A | 9/2007 |
| JP | 2007532867 A | 11/2007 |
| JP | 2008021082 A | 1/2008 |
| JP | 2010521725 A | 6/2010 |
| JP | 5278978 B2 | 5/2013 |
| JP | 2015019244 A | 1/2015 |
| JP | 2015087306 A | 5/2015 |
| JP | 2017508984 A | 3/2017 |
| JP | 2017514499 A | 6/2017 |
| JP | 6343934 B2 | 6/2018 |
| JP | 2018136246 A | 8/2018 |
| JP | 2018529062 A | 10/2018 |
| JP | 2019518974 A | 7/2019 |
| JP | 2019529938 A | 10/2019 |
| JP | 2019536973 A | 12/2019 |
| KR | 20080070015 A | 7/2008 |
| KR | 102368093 B1 | 2/2022 |
| WO | 9216800 A1 | 10/1992 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |

(56) References Cited

FOREIGN PATENT DOCUMENTS

| | | | |
|---|---|---|---|
| WO | 2006029110 A1 | 3/2006 | |
| WO | 2007024540 A1 | 3/2007 | |
| WO | 2007049039 A1 | 5/2007 | |
| WO | 2007075253 A2 | 7/2007 | |
| WO | 2007092119 A1 | 8/2007 | |
| WO | 2008024471 A2 | 2/2008 | |
| WO | 2008057150 A1 | 5/2008 | |
| WO | 2009004366 A1 | 1/2009 | |
| WO | 2009017558 A1 | 2/2009 | |
| WO | 2009094071 A3 | 10/2009 | |
| WO | 2009120596 A1 | 10/2009 | |
| WO | 2009155638 A1 | 12/2009 | |
| WO | 2010037166 A1 | 4/2010 | |
| WO | 2011069190 A1 | 6/2011 | |
| WO | 2012083396 A1 | 6/2012 | |
| WO | 2012100281 A1 | 8/2012 | |
| WO | 2012033605 A3 | 11/2012 | |
| WO | 2012033994 A3 | 12/2012 | |
| WO | 2012033992 A3 | 4/2013 | |
| WO | 2013053011 A1 | 4/2013 | |
| WO | 2010014656 A3 | 5/2013 | |
| WO | 2012034037 A3 | 5/2013 | |
| WO | 2014001819 A1 | 1/2014 | |
| WO | 2014009729 A1 | 1/2014 | |
| WO | 2014114938 A2 | 7/2014 | |
| WO | 2014157798 A1 | 10/2014 | |
| WO | 2014191757 A1 | 12/2014 | |
| WO | 2015073964 A1 | 5/2015 | |
| WO | 2015109315 A3 | 10/2015 | |
| WO | 2016081755 A1 | 5/2016 | |
| WO | 2016120224 A1 | 8/2016 | |
| WO | 2016160984 A1 | 10/2016 | |
| WO | 2016160986 A3 | 11/2016 | |
| WO | 2016200519 A1 | 12/2016 | |
| WO | 2017014999 A1 | 1/2017 | |
| WO | 2017075144 A1 | 5/2017 | |
| WO | 2017109153 A1 | 6/2017 | |
| WO | 2017215957 A1 | 12/2017 | |
| WO | 2018000051 A1 | 1/2018 | |
| WO | 2018002287 A1 | 1/2018 | |
| WO | 2018005129 A1 | 1/2018 | |
| WO | 2018025053 A1 | 2/2018 | |
| WO | 2018039727 A1 | 3/2018 | |
| WO | 2018041516 A1 | 3/2018 | |
| WO | 2018097267 A1 | 5/2018 | |
| WO | 2018215588 A1 | 11/2018 | |
| WO | 2019005450 A1 | 1/2019 | |
| WO | 2019182900 A1 | 9/2019 | |
| WO | 2020033578 A1 | 2/2020 | |

OTHER PUBLICATIONS

Non Final Office Action for U.S. Appl. No. 17/083,179, mailed Sep. 1, 2022, 8 pages.
Non Final Office Action for U.S. Appl. No. 17/321,174, mailed Nov. 22, 2022, 26 pages.
Japanese Office Action for Japanese Patent Application No. 2022-525678, mailed May 29, 2023 (with English Translation) 12 pages.
Japanese Office Action, dated Jun. 6, 2023, for corresponding Japanese Application No. 2022-525679, 16 pages.
International Search Report and Written Opinion for PCT/US2022/077741, mailed date Feb. 1, 2023, 12 pages.
Chinese Notice of Allowance for Application No. 2023-541871 mailed Oct. 8, 2024, 3 pages.
Comiso, S. et al., "Biot cryocarrier-standardized cryogenic temperature handling of biospecimens"; Biopreservation and Biobanking 13.3: A15. Mary Ann Liebert Inc. (Jun. 2015) (Year: 2015).
Non Final Office Action for U.S. Appl. No. 18/487,878, mailed Sep. 16, 2024, 25 pages.
Thermo Fisher Scientific Introduces System to Double Cryogenic Storage Capacity; M2 Presswire Oct. 27, 2011: NA (Year: 2011).
Zachman, "High-Resolution Studies of Intact Solid-Liquid Interfaces and Reactive Materials by Cryogenic Electron Microscopy"; Cornell University. ProQuest Dissertations & Theses, 2018. 10845397. (Year: 2018).
EP Search Report mailed Mar. 6, 2024 in EP App No. 22739992.0, 7 pages.
"Secure Your Future with Cryofuture", Https://cryofuture.com, 2004, 13 pages.
"Your Partner for Local and Secure Cryostorage and Transportation", http://cryofuture.com, Clinic's workflow, 2024, 12 pages.
Australian Examination Report mailed Feb. 26, 2024, Application No. 2021348066, 8 pages.
International Search Report and Written Opinion for PCT/US2022/028185, mailed Aug. 26, 2022, 11 pages.
Japanese Office Action, dated Mar. 19, 2024, for corresponding Japanese Application No. 2023-519519, 15 pages.
Non-Final Office Action Issued in U.S. Appl. No. 18/113,297, mailed May 14, 2024, 41 pages.
Notice of Reasons for Refusal, Japanese Application No. 2023-541871, dated Apr. 24, 2024, 3 pages.
Fontaine, "Automated Visual Tracking for Behavioral Analysis of Biological Model Organisms," Dissertation (Ph.D.), California Institute of Technology, ProQuest Dissertations Publishing (2008), 156 pages.
Notice of Allowance for U.S. Appl. No. 17/321,174, mailed Jul. 12, 2023, 13 pages.
"Abeyance Web App / Stay Connected", July 6, Abeyance Cry Solutions—Abeyateck, LLC, 2021, 3 pages.
"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.
"IVF Witness System: RI Witness Tm Art Management System", CooperSurgical Fertility Company 2021, 24 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: ROW Oct. 24, 2018, 12 pages.
"S840 Lab Mover", Large vol. LNS Dry Vapor Shipper, Products Shipping, July 6, Abeyance Cry Solutions—Abeyateck, LLC, 2021, 3 pages.
"Simple, Secure—190°C LN2 Vapor Storage", Products Shipping, Jul. 6, Abeyance Cry Solutions—Abeyateck, LLC, 2021, 7 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017, 11 pages.
Coopersurgical, RI Witness, Order No. CE 60010312 Version 3-ROW: Oct. 24, 2018, 12 pages.
FluidX Tri-Coded Jacket: 0.7ml Sample Storage Tube with External Thread; Brooks Life Sciences; https://bioinventory.biostorage.com.
HID Beyond Cool: RFID disentangles cryopreservation storage and management, 2015, 4 pages.
Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.
International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
International Search Report and Written Opinion of the International Searching Authority, mailed Jan. 12, 2022, for International Application No. PCT/US2021/051803, 8 pages.
International Search Report for PCT/US2021/032600, mailed Sep. 3, 2021, 4 pages.

(56) References Cited

OTHER PUBLICATIONS

Non-Final Office Action Issued in U.S. Appl. No. 16/840,270, Mailed Sep. 21, 2021, 58 pages.

Office Action dated Sep. 3, 2020, for U.S. Appl. No. 16/840,718, 46 pages.

Maggiulli, Roberta, et al., "Implementing an electronic witnessing system into a busy IVF clinic—one clinic's experience", Genera Center for Reproductive Medicine, Rome, Italy, 2 pages.

Rienzi, Laura, et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.

Swedberg, Claire, "Hitachi Chemical Markets Tiny UHF Tag", https://www.rfidjournal.com/hitachi-chemical-markets-tiny-uhf-tag, Sep. 12, 2010, 4 pages.

Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.

EP Search Report mailed Nov. 7, 2023, in EP App No. 21808453.1, Nov. 11, 2023.

Japanese Office Action for Japanese Patent Application No. 2022-525678, mailed Oct. 12, 2023 (with English Translation) 12 pages.

Japanese Office Action for JP 2022-569516, mailed Nov. 8, 2023, 6 pages {with English Translation).

Final Office Action Issued in U.S. Appl. No. 18/113,297, mailed Aug. 27, 2024, 54 pages.

Notice of Allowance for U.S. Appl. No. 17/490,274, mailed Jun. 26, 2024, 13 pages.

Notice of Reasons for Refusal. Japanese Application No. 2023-518185, dated Jun. 17, 2024, 8 pages.

\* cited by examiner

SYSTEMS, APPARATUS AND METHODS TO PICK AND/OR PLACE SPECIMEN CONTAINERS

TECHNICAL FIELD

The present disclosure relates generally to systems, apparatus and/or methods to pick and/or place specimen containers, for example picking specimen containers and/or placing specimen containers to an array of specimen containers, for instance in a cryogenic environment.

BACKGROUND

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological sample (e.g., an oocyte, an embryo, a biopsy) contained in or on a specimen holder is rapidly cooled by placing the biological sample and the specimen holder in a substance, such as liquid nitrogen. This results in a glass-like solidification or glassy state of the biological sample (e.g., a glass structure at the molecular level), which maintains the absence of intracellular and extracellular ice (e.g., reducing cell damage and/or death) and, upon thawing, improves post-thaw cell viability. To ensure viability, the vitrified biological samples are then typically continuously stored in a liquid nitrogen dewar or other container, which is at a temperature conducive to cryopreservation, for example negative 196 degrees Celsius.

BRIEF SUMMARY

The specimen holder may, for example, take the form of a cryopreservation straw, cryopreservation tube, cryopreservation stick or cryopreservation spatula. The specimen holders are typically placed in a specimen container. The specimen container typically comprises a vial and a cap, the cap selectively removable from the vial to access an interior of the vial. In some instances, two or more specimen holders may be placed in a single specimen container. In other instances, as described in Applicant's own patent applications, a specimen holder may be attached or fixed to the cap. The cap may be removably attached to the vial, for example, via mating threads or a snap fit. As also described in Applicant's own patent applications, the specimen containers and/or even the specimen holder(s) can include identification information, for instance in the form of one or more of: direct markings or indicia made on the specimen containers or specimen holders; one or more labels (e.g., labels bearing printed or hand written indicia); one or more machine-readable symbols (e.g., one-dimensional or barcode symbols; two-dimensional code symbols) and/or one or more wireless transponders (e.g., radio frequency identification (RFID) transponders). While denominated as radio frequency identification, it is noted that RFID typically encompasses wireless transmission in the radio frequency and/or microwave frequency portions of the electromagnetic spectrum. Hence, references herein to radio or radio frequency are not intended to be limited to the radio frequency range of the electromagnetic spectrum unless clearly indicated otherwise, and typically are meant to also include the microwave frequency range of the electromagnetic spectrum.

The ability to accurately identify, manage, inventory, store, and/or retrieve biological specimens is typically considered an objective of any system or facility (e.g., in vitro fertilization (IVF) facility). Vitrification can be damage direct markings or indicia, labels, and/or machine readable symbols. In any case, wireless interrogation of wireless transponders may be preferred as a more fully automated approach to identification.

The specimen containers in many implementations will be closely spaced with respect to one another, for instance to minimize the amount of storage spaced required and/or to maximize the number of specimens that may be stored in a given volume of space (e.g., stored in a volume of a cryogenic freezer or dewar). For example, a plurality of specimen containers may be arrayed in a carrier, tray or shelf, the specimen containers spaced within a few centimeters of one another. A storage space (e.g., a cryogenic freezer or dewar) may contain a plurality of these carriers, trays or shelves, for example arrayed about a central axis, and at two or more levels along the central axis.

Conventionally, entire carriers, trays or shelves that hold a plurality of specimen containers are retrieved from and/or placed into the cryogenic environment. While retrieval of only one or a limited number of specimen containers may be desired, conventional approaches that retrieve entire carriers, trays or shelves expose many more specimen containers to non-cryogenic temperatures then need to be exposed. The close spacing of specimen containers in an array may cause difficulties in picking specimen containers from and/or placing specimen containers into the array. While not limited to cryogenic environments, such difficulties may be exacerbated where the specimen containers are located in a cryogenic environment such as a cryogenic freezer or dewar, as such cryogenic environments typically provided limited access to the interior of the cryogenic environment, typically through a single opening or aperture at a top of the cryogenic freezer or dewar.

Various systems, devices and methods are described herein that advantageously address the various issues presented with picking or retrieving individual specimen containers from an array of specimen containers and/or placing individual specimen containers into an array of specimen containers, even where the array of specimen containers is located in a cryogenic freezer or dewar. Such may advantageously reduce or even eliminate exposure of other specimen containers to non-cryogenic temperatures. Such may also advantageously automate retrieval and/or placement of specimen containers, whether from or into cryogenic storage or non-cryogenic storage, reducing manual labor, increasing accuracy and/or improving tracking of specimen container and specimens held by the specimen containers.

A system to pick and/or place individual specimen containers from and/or to an array of specimen containers can be summarized as including: a receiver having a proximate end, a distal end, and a receptacle having an opening at the distal end of the receiver, the receptacle having a principal axis and a set of lateral inner dimensions measured laterally with respect to the principal axis, the lateral inner dimensions of the receptacle sized to accommodate a set of lateral outer dimensions of at least a portion of a single container therein and at least a portion of the receptacle sized to physically prevent rotation of the single one of the specimen containers about the principal axis while allowing translation with respect thereto; a drive shaft having a proximate end and a distal end; and an engagement head at the distal end of the driver shaft and which translates and rotates along with the drive shaft, wherein the drive shaft is translatable parallel with the principal axis to selectively position the engagement head alternatingly distally from and proximate to a first portion of the single one of the specimen containers when the single one of the specimen containers is positioned at least partially in the receptacle of the receiver, and at least when positioned proximate to the first portion of the single one of the specimen containers the drive shaft is selectively rotatable alternatingly in a clockwise and a counterclockwise direction about the principal axis to cause at least a portion of the engagement head to alternatingly engage and disengage the first portion of the single one of the specimen containers while at least a portion of the receptacle of the receiver prevents the single one of the specimen containers from rotating about the principal axis.

The engagement head may include a base and a pair of lugs, each of the lugs comprises a stem extending downwardly from the base and a finger that extends radially inwardly from the stem, the finger having a distal most portion that is spaced radially inwardly of the principal axis. The finger of each of the lugs may be disposed in a same rotational direction about the principal axis as the finger of the other one of the lugs.

The system may further include one or more actuators drivingly coupled to control translation and rotation of the drive shaft and the engagement head, and at least one processor-based control system communicatively coupled to control the one or more actuators. The system may further include one or more sensors, for example positon sensors, orientation sensors, frost detectors and/or resistance sensors or detectors (e.g. to sense or detect resistance to movement for instance resistance to translation).

The system may further include one or more defrosters operable to remove frost build up on one or more components.

The system may further include a manual override mechanism that manually dispenses the single one of the specimen containers from the receiver, for instance even when frost buildup prevents the at least one actuator from successfully dispensing the single one of the specimen containers from the receiver.

The system may include a wireless interrogator to interrogate wireless transponders and/or an optical reader to optically read human-readable and/or machine-readable symbols carried by or on the specimen containers.

A method to pick individual specimen containers from or to an array of specimen containers may employ a system comprising a pick and/or place head comprising a receiver, a drive shaft and an engagement head at a distal end of the drive shaft. The method may be summarized as including: i) moving the pick and/or place head proximate the one of the specimen containers; ii) translating at least the distal portion of the receiver to encompass at least a portion of the single one of the specimen containers; iii) translating the drive shaft from a retracted position to an extended position to position the engagement head proximate the second portion of the single one of the specimen containers; iv) rotating the drive shaft in a first rotational direction about the principal axis to engage the second portion of the single one of the specimen containers with the engagement head while the at least one first engagement feature prevents the single one of the specimen containers from rotating about the principal axis; and v) translating the drive shaft from the extended position to the retracted position to draw the single one of the specimen containers further into the receiver, and vi) translate the pick and place head away from the array of specimen containers.

A method to place individual specimen containers to a destination location may employ a system comprising a pick and/or place head comprising a receiver, a drive shaft and an engagement head at a distal end of the drive shaft. The method may be summarized as including: i) translate the pick and/or place head over the destination location; ii) translate the pick and/or place head to position in which at least the receiver proximate the destination location; iii) rotate the drive shaft in a second rotational direction about the principal axis to disengage the second portion of the single one of the specimen containers from the engagement head while the at least one first engagement feature prevents the single one of the specimen containers from rotating about the principal axis; iv) translate the pick and/or place head away from the position in which at least the receiver is proximate the destination location.

The method may further include translating the drive shaft from the retracted positon to the extended position to push the single one of the specimen containers out of the receiver after iii) rotating the drive shaft in the second rotational direction about the principal axis to disengage the second portion of the single one of the specimen containers from the engagement head and before iv) translating the pick and/or place head away from the position in which at least the receiver is proximate the destination location.

Any of the methods may further include sensing one or more of a position, orientation, or frost build up. The methods may further include defrosting one or more components.

Any of the methods may further include wirelessly interrogating wireless transponders and/or an optical reading human-readable and/or machine-readable symbols carried by or on the specimen containers.

A system to pick and/or place individual specimen containers from an array of specimen containers may be summarized as including: a receiver having a proximate end, a distal end, an interior, a port that provides fluid communication with the interior, and an opening at the distal end that provides access to the interior from an exterior of the receiver, the interior and the opening having a set of lateral internal dimensions sized to receive at least a portion of a single one of the specimen containers therein; a conduit coupled to provide a negative pressure to the interior of the receiver via the port to pneumatically draw a single one of the specimen containers inwardly at least further into the interior of the receiver; a drive shaft rotatable about a principal axes to selectively mechanically retain the single one of the specimen containers in the interior of the receiver; and one or more actuators drivingly coupled to control movement of the drive shaft.

The system may further include a vacuum source fluidly communicatively coupled to the port via the conduit.

The system may further include at least one processor-based control system communicatively coupled to control the one or more actuators and at least one of the vacuum source or a valve fluidly communicatively located between the vacuum source and the port.

The system may further include one or more defrosters operable to remove frost build up on one or more components.

The system may further include a manual override mechanism that manually dispenses the single one of the specimen containers from the receiver, for instance even when frost buildup prevents the at least one actuator from successfully dispensing the single one of the specimen containers from the receiver.

The system may include a wireless interrogator to interrogate wireless transponders and/or an optical reader to optically read human-readable and/or machine-readable symbols carried by or on the specimen containers.

A method may employ a system to pick individual specimen containers from an array of specimen containers, the system comprising a pick and/or place head comprising a receiver, a drive shaft and an engagement head at a distal end of the drive shaft. The method may be summarized as including: i) translating the pick and/or place head from a retracted position to an extended position in which at least part of the single one of the specimen containers is received within the receiver via the opening of the receiver; ii) applying a negative pressure within an interior of the receiver to draw the single one of the specimen containers further into the interior of the receiver; and iii) rotating the drive shaft in a first rotational direction about a principal axis to cause a portion of the receiver to retain the single one of the specimen containers in the interior of the receiver by limiting translation of the single one of the specimen containers.

The method may further include withdrawing the pick and/or place head from the array of specimen containers while the single one of the specimen containers remains in the interior of the receiver.

A method may employ a system to place individual specimen containers to a destination location, the system comprising a pick and/or place head comprising a receiver, a drive shaft and an engagement head at a distal end of the drive shaft. The method may be summarized as including: i) positioning the pick and/or place head over the destination location; ii) translating the pick and/or place head from a retracted position to an extended position to reduce a vertical distance to the destination location; iii) rotating the drive shaft in a second rotational direction about a principal axis to cause a portion of the receiver to release the single one of the specimen containers from the interior of the receiver by no longer limiting translation of the single one of the specimen containers.

The method may further include iv) withdrawing the pick and/or place head from the array destination location while the single one of the specimen containers remains at the destination location.

The method may further include applying a positive pressure within an interior of the receiver to push the single one of the specimen containers further out of the interior of the receiver after iii) the drive shaft is rotated in the second rotational direction about the principal axis to cause the portion of the receiver to release the single one of the specimen containers from the interior of the receiver by no longer limiting translation of the single one of the specimen containers.

Any of the methods may further include sensing one or more of a position, orientation, or frost build up. The methods may further include defrosting one or more components.

Any of the methods may further include wirelessly interrogating wireless transponders and/or an optical reading human-readable and/or machine-readable symbols carried by or on the specimen containers.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
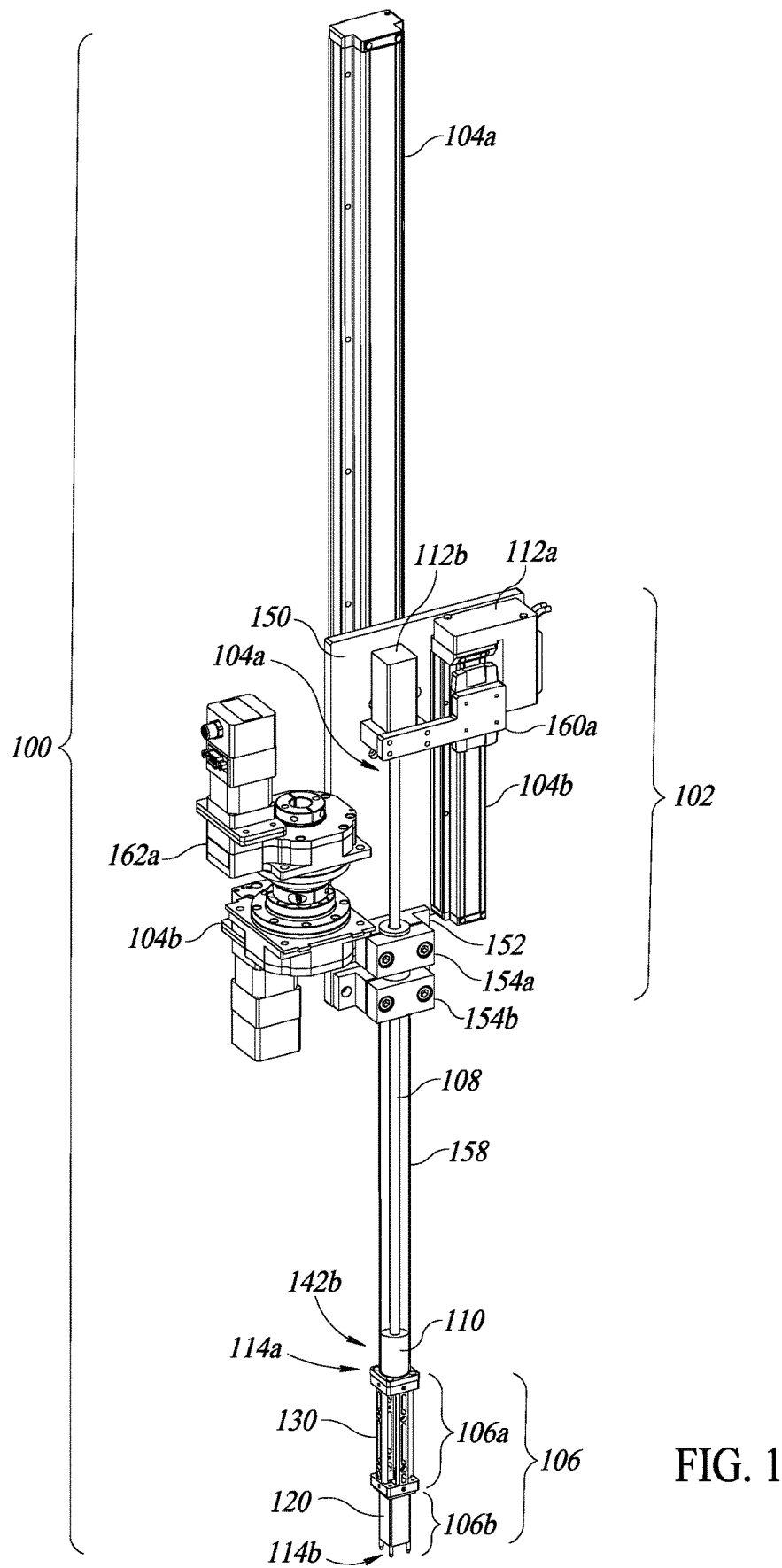
FIG. 1 is a front, left, top isometric view of a mechanical system to pick and/or place specimen containers from an array of specimen containers, according to one illustrated implementation.
Figure 2:
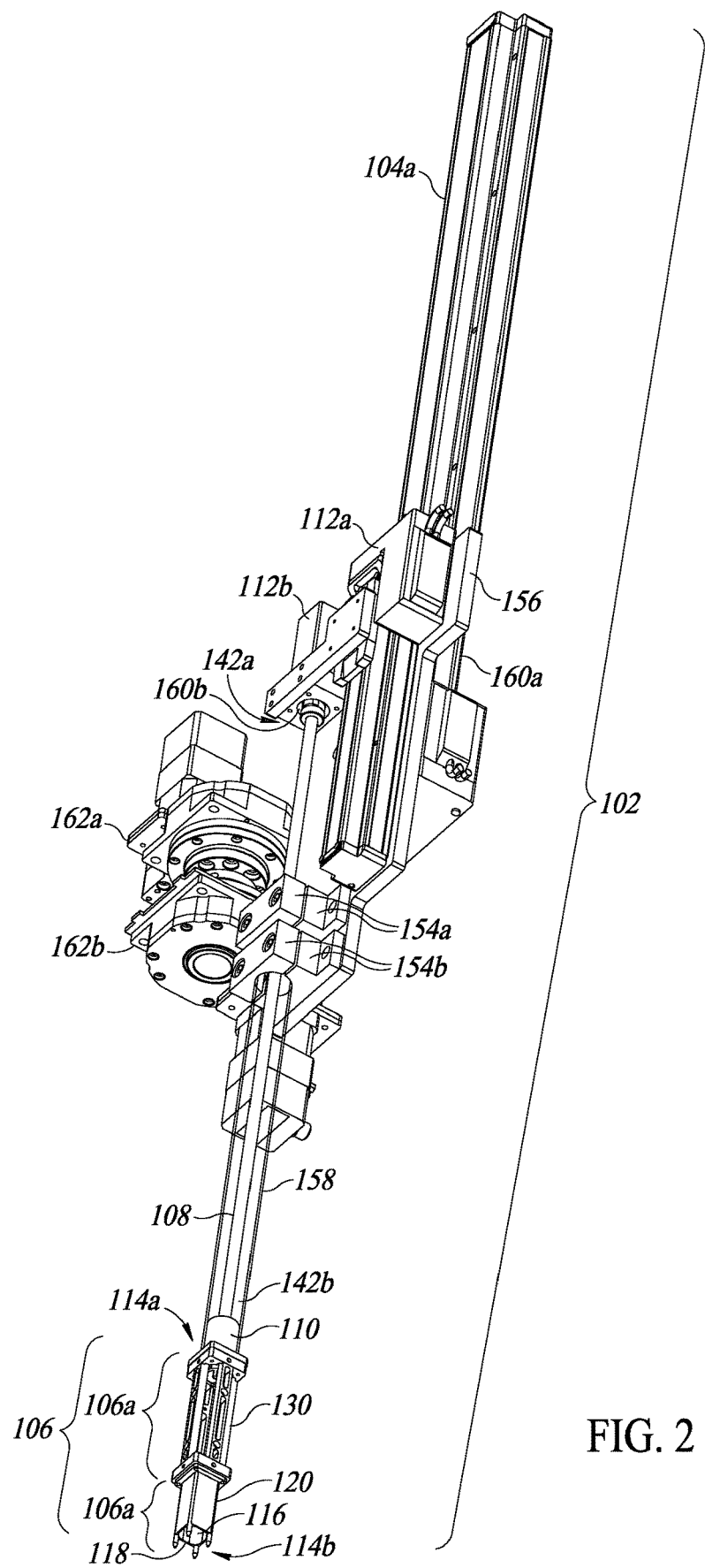
FIG. 2 is a front, right, bottom isometric view of the mechanical system to pick and/or place specimen containers of FIG. 1.
Figure 3:
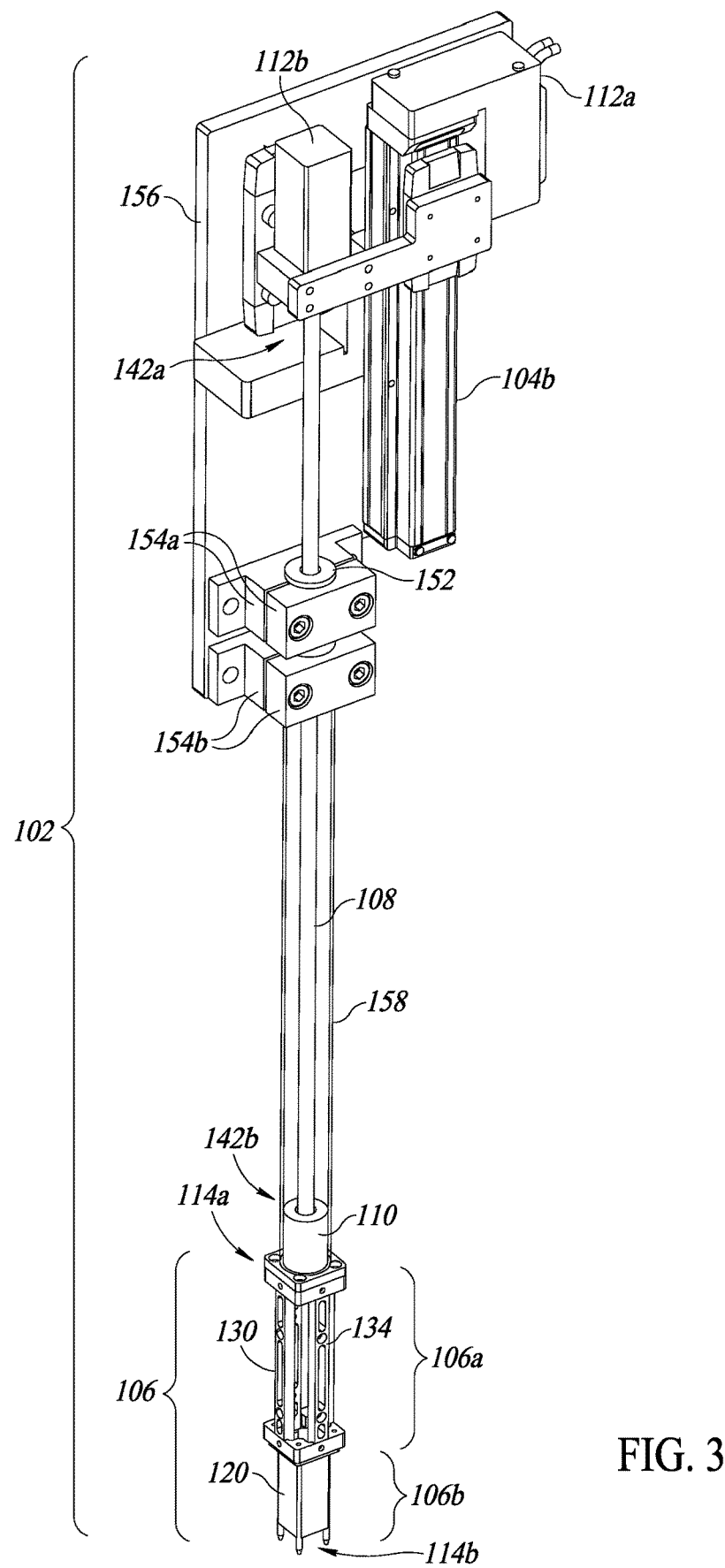
FIG. 3 is a front, left, top isometric view of a portion of the mechanical system to pick and/or place specimen containers of FIG. 1.
Figure 4:
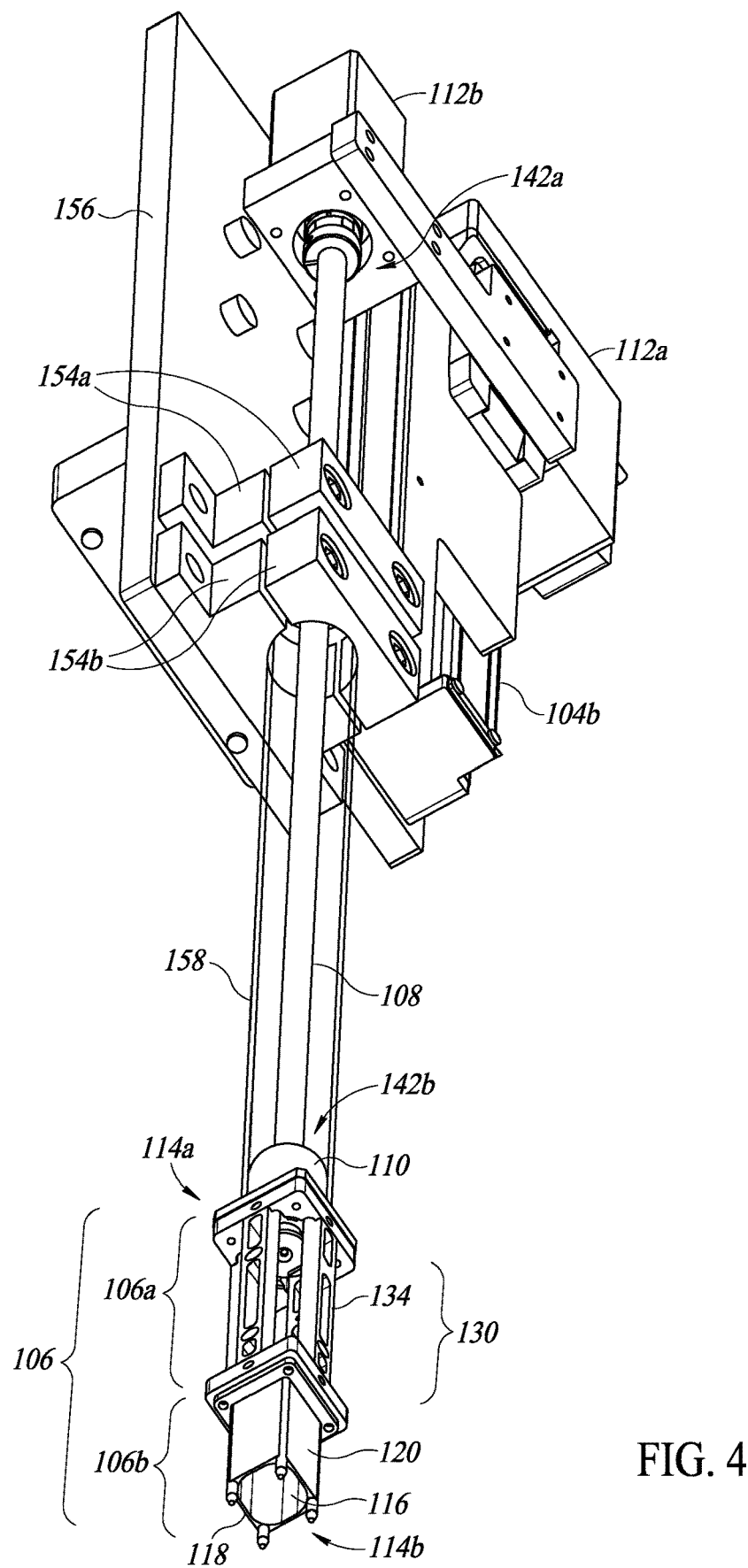
FIG. 4 is a front, right, bottom isometric view of a portion of the mechanical system to pick and/or place specimen containers of FIG. 1.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with wireless transponders, interrogators or interrogation systems, computer systems, server computers, and/or communications networks have not been shown or described in detail to avoid unnecessarily obscuring descriptions of the implementations.

Unless the context requires otherwise, throughout the specification and claims that follow, the word "comprising"

is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

FIGS. 1-6 show a mechanical system 100 to pick and/or place specimen containers, according to one illustrated implementation.

The mechanical system 100 includes a pick and/or place head 102. The pick and/or place head 102 is mounted to travel along a first rail 104a. The first rail 104a may extend vertically, for example, allowing the pick and/or place head 102 to translate vertically. Such may, for example, allow the pick and/or place head 102 to be moved between an interior and an exterior of an enclosed cryogenic environment (e.g., cryogenic freezer, dewar or other cryogenic enclosure), for example via a door or access port at a top of cryogenic enclosure.

The pick and/or place head 102 includes a receiver 106, a drive shaft 108, an engagement head 110, and one or more actuators, for example a translation motor 112a and a rotation motor 112b.

The receiver 106 has a proximate end 114a, a distal end 114b, and a receptacle 116 having an opening 118 (FIG. 2) at the distal end 114b of the receiver 106.

As illustrated the receiver 106 and the receptacle 116 may be formed of two or more parts, although in some implementations the receiver 106 may take the form of a single-piece, unitary structure. As illustrated, the receiver 106 comprises a proximate portion 106a and a distal portion 106b.

Figure 5:
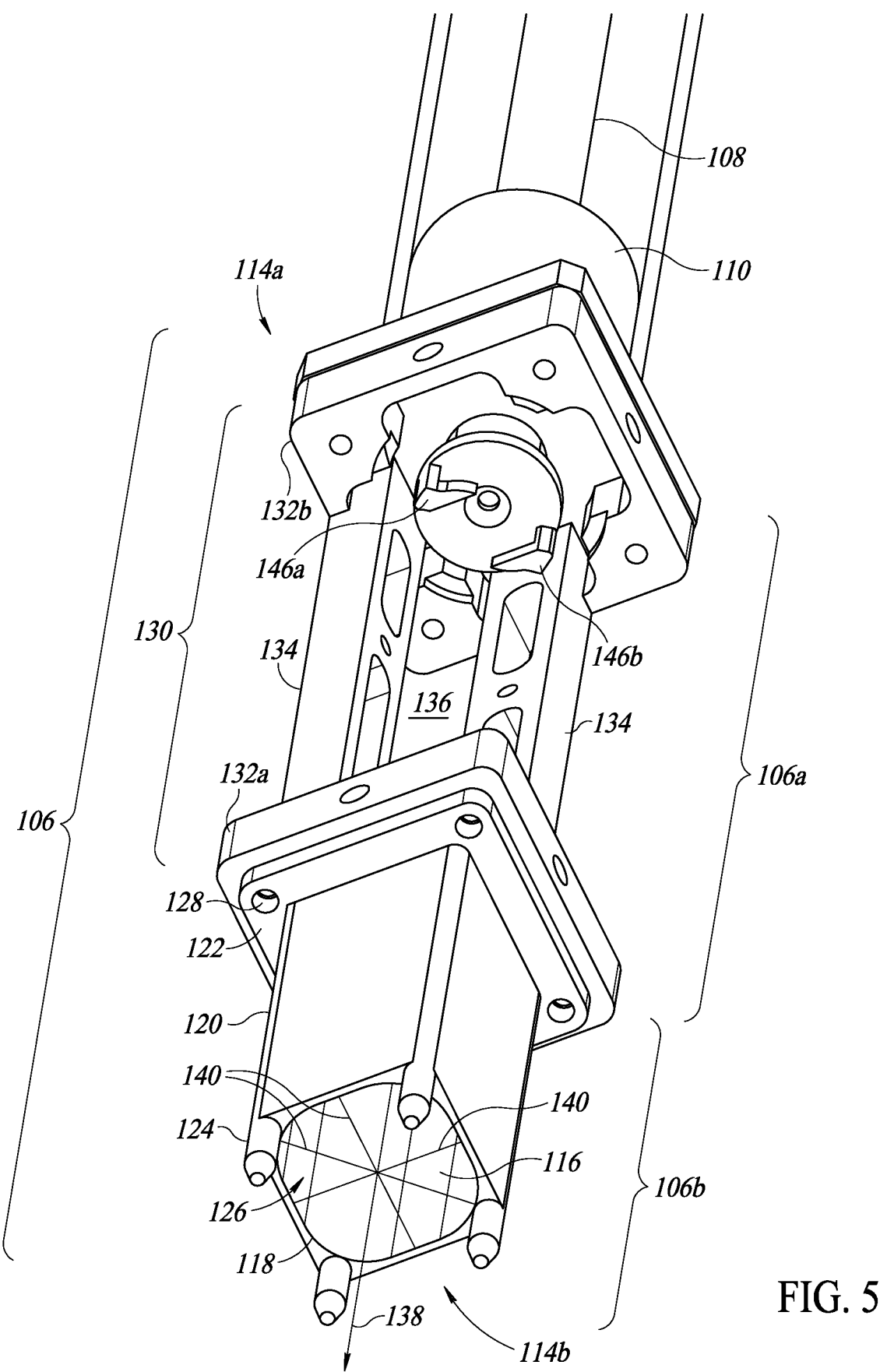
FIG. 5 is an enlarged view of the portion of the mechanical system to pick and/or place specimen containers of FIG. 3 with two frame members removed to better illustrate an engagement head.
Figure 19:
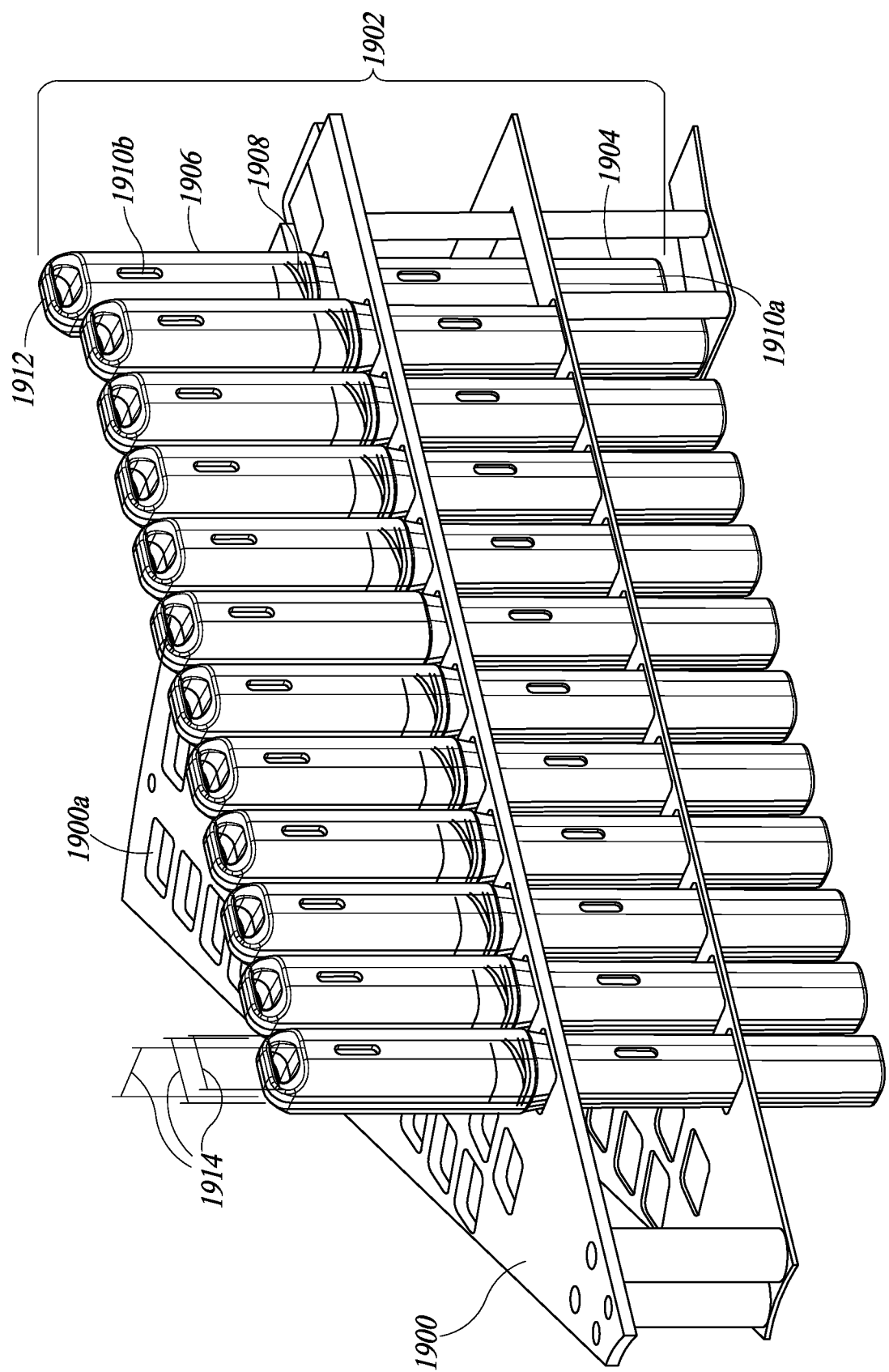
FIG. 19 is an isometric view of an exemplary specimen shelf that holds a plurality of specimen containers an array, according to at least one illustrated implementation.

As best illustrated in FIG. 5, the distal portion 106b of the receiver 106 is illustrated as a block or sleeve 120 with a peripheral flange 122 extending lateral therefrom at a proximate end of the block or sleeve 120 and with a set of feet or standoffs 124 (only one called out in FIG. 5) extending or projecting longitudinally therefrom at a distal end of the block or sleeve 120. The block or sleeve 120 includes the opening 118 which provides access to an interior 126 of the block or sleeve 120. The opening 118 and/or the interior 126 of the block or sleeve 120 have a profile that is/are sized and/or shaped to accommodate a profile of a single specimen container 1902 (FIG. 19). The peripheral flange 122 of the block or sleeve 120 may have throughholes 128 (only one called out in FIG. 5) to allow the distal portion 106b to be coupled to the proximate portion 106a, for instance via one or more fasteners (not called out in FIGS. 1-4, and omitted from FIG. 5).

The proximate portion 106a of the receiver 106 is illustrated as a frame or cage 130, comprising a base 132a, a top 132b and frame members or struts 134 that extend between the base 132a and the top 132b, to define an interior 136 therebetween. (Four frame members or struts 134 are shown in FIGS. 1-4, two of the frame members or struts 134 are omitted from FIG. 5, to provide a better view of the interior 136 and of a portion of the engagement head 110.) The interior 136 of the proximate portion 106a has a profile that is sized and/or shaped to accommodate a profile of a single specimen container 1902 (FIG. 19), although may have higher fit tolerances than that of the interior 126 of the block or sleeve 120 or opening 118. The interior 136 of the proximate portion 106a, or a part thereof, may be open to an exterior or alternatively one or more sidewalls may enclose the interior 136. The base 132a of the proximate portion 106a may have throughholes to allow the proximate portion 106a to be coupled to the distal portion 106a, for instance via one or more fasteners (e.g., threaded fasteners for instance screws or bolts and nuts). The top 132b of the proximate portion 106a may have throughholes (not called out) to allow the proximate portion 106a to be coupled to other portions of the pick and/or place head 102 (described below), for instance via one or more fasteners ((e.g., threaded fasteners for instance screws or bolts and nuts, not called out in FIGS. 1-4, and omitted from FIG. 5).

The receptacle 116 has a principal axis 138 and a set of lateral inner dimensions 140 measured laterally with respect to the principal axis 138. The lateral inner dimensions 140 of the receptacle 116 are sized to accommodate a set of lateral outer dimensions 1914 (FIG. 19) of at least a portion of a single container 1902 (FIG. 19) therein. At least a portion of the receptacle 116 is sized to physically prevent rotation of the single one of the specimen containers 1902 (FIG. 19) about the principal axis 138 while allowing translation with respect thereto. For example, the lateral inner dimensions 140 of the receptacle 116 at a smallest portion is sized to provide either a clearance fit or close fit (e.g., physically contact without deformation while preventing rotation) with a widest portion of the single container 1902 (FIG. 19). For example, the receptacle 116 or a portion thereof may have a non-circular profile, for instance a D-shaped profile, rectangular profile, or as illustrated in FIG. 5 the receptacle 116 has a square profile with two pairs of parallel sides (e.g., a rectangular cuboid) and rounded or arcuate corners between pairs of the sides. Such may receive a portion or all of a single specimen container 1902 (FIG. 19), while preventing rotation of or restraining rotation of the single specimen container 1902 within a set angular range.

As best illustrated in FIGS. 1-4, the drive shaft 108 has a proximate end 142a and a distal end 142b. The drive shaft 108 is a generally elongate member, and may take a variety of forms that allow transmission of translational displacement and rotation. The drive shaft 108 may, for example, take the form of a solid rod or a hollow rod. While illustrated as a cylindrical rod, the drive shaft 108 can have non-circular profiles, for example a D-shaped profile, rectangular profile including a square profile, or a polygonal profile such as a hexagonal or octagonal profile. The drive shaft 108 may be made of a metal, or a plastic, or a combination thereof.

Figure 6:
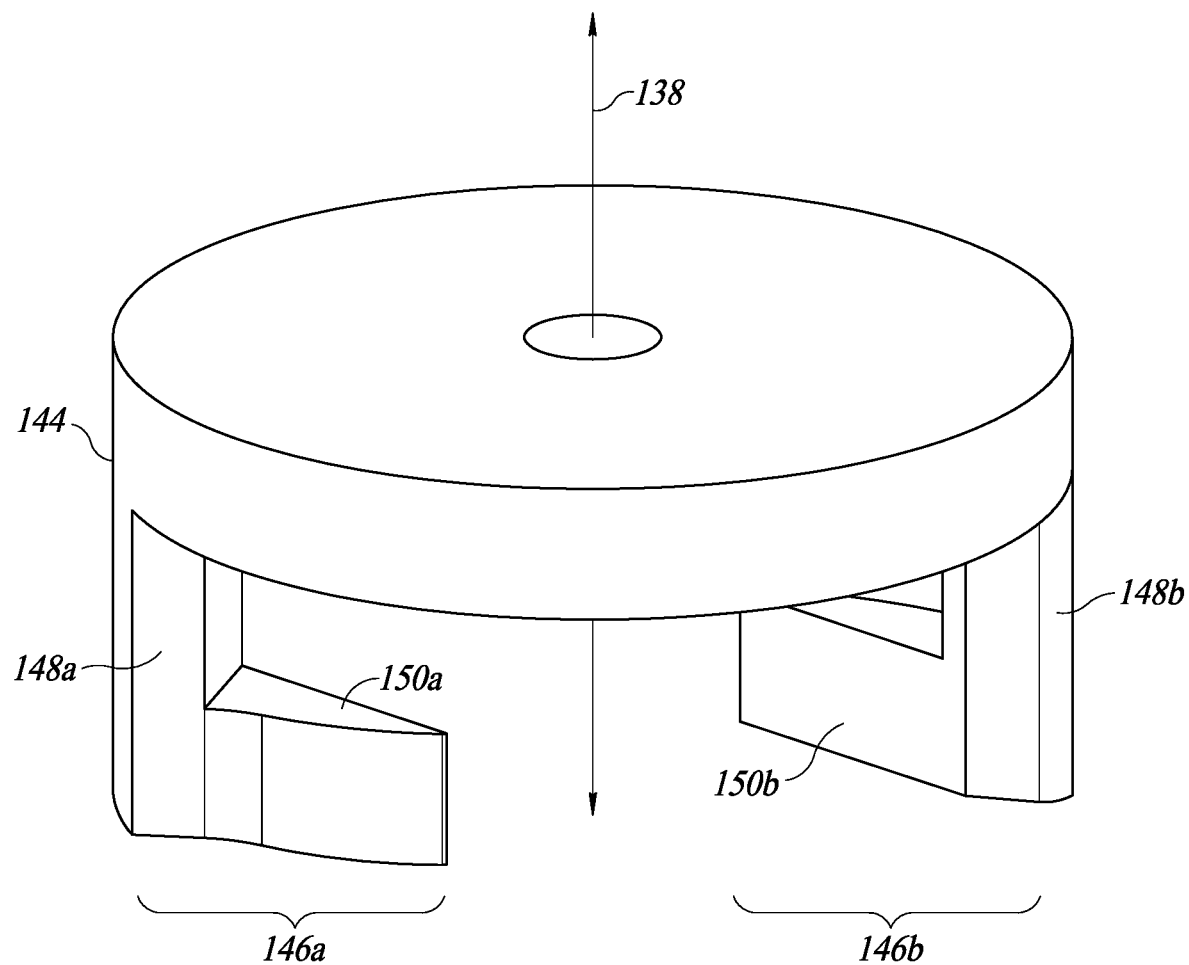
FIG. 6 is an isometric view of the engagement head of FIG. 5.

The engagement head 110 is located at the distal end 142b of the driver shaft 108, and translates and rotates along with the drive shaft 108. The engagement head 110 may be an integral, unitary part of the drive shaft 108, or may be a separate and distinct part physically coupled or otherwise attached directly, or indirectly to the drive shaft 108. The engagement head 110 includes or more engagement features to engage a portion of a single one of the specimen containers 1902 (FIG. 19) when the single one of the specimen containers 1902 is positioned in the receptacle 116 of the receiver 106. For example, as best illustrated in FIGS. 5 and 6, the engagement head 110 includes a base 144 (called out in FIG. 6) and a pair of lugs 146*a*, 146*b*. Each of the lugs 146*a*, 146*b* comprises a stem 148*a*, 148*b* (called out in FIG. 6) positioned at diametrically opposed locations at a periphery of the base 144 and extending longitudinally outwardly (e.g., perpendicularly) from the base 144. Each of the lugs 146*a*, 146*b* comprises a finger 150*a*, 150*b* (called out in FIG. 6) that extends angled radially inwardly from the respective stem 148*a*, 148*b*, the fingers 150*a*, 150*b* each having a distal most portion that is spaced radially inwardly of the principal axis 138 of the receptacle 116. The finger 150*a*, 150*b* of each of the lugs 146*a*, 146*b* is disposed in a same rotational direction about the principal axis 138 as the finger 150*a*, 150*b* of the other one of the lugs 146*a*, 146*b*. The stems 148*a*, 148*b* provide for a gap to exist between the fingers 150*a*, 150*b* and the base 144.

Where specimen containers 1902 (FIG. 1) each include a vial and a cap, the cap having a handle, the cap threadedly coupled to vials, and the lugs are disposed about the principal axis 138 such that a counterclockwise rotation of the drive shaft 108 causes the lugs 146*a*, 146*b*, and in particular fingers 150*a*, 150*b*, to engage the handle of the cap in a direction in which the cap tightens to the vial, and such that a clockwise rotation of the drive shaft 108 causes the lugs 146*a*, 146*b* to disengage the handle of the cap. For an oppositely or reverse threaded cap and vial, the inverse directions would apply.

The pick and/or place head 102 may optionally include one or more bearings 152 (only one shown in FIGS. 1 and 3) that support the drive shaft 108 for translation along the principal axis and rotation about the principal axis 138 of the receptacle 116. The bearing(s) 152 may be supported via one or more brackets 154*a* (FIGS. 1-4) attached for example to a support plate 156 (FIGS. 1-4). The pick and/or place head 102 may optionally include a guide tube 158 (FIGS. 1-4) through which a portion of the drive shaft 108 translates in moving between a retracted position the engagement head 110 and an extended position of the engagement head 110. In the extended position, the engagement head 110 is positioned distally with respect to the retracted position, for example positioned to contact and engage a portion (e.g., handle on cap) of the single specimen container 1902 (FIG. 1) that is located in the interior of the block or sleeve 120. The guide tube 158 may be supported via one or more brackets 154*b*, for example, attached to the support plate 156.

Figure 18:
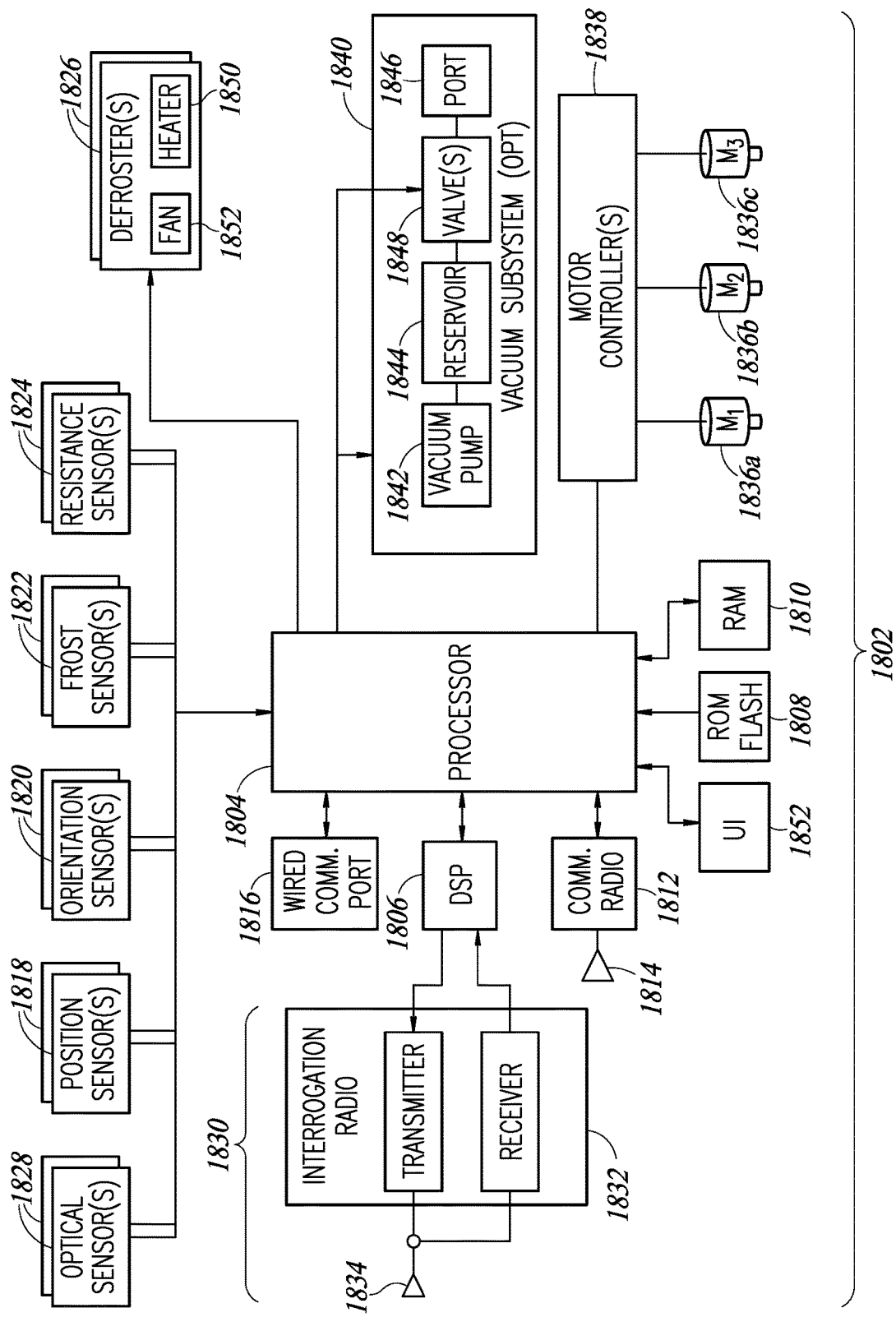
FIG. 18 is a schematic diagram of a control system to control the mechanical system of FIGS. 1, 2, 7B and 8B and/or the vacuum-based system of FIGS. 7A and 8A, according to at least one illustrated implementation.

The translation motor 112*a* and a rotation motor 112*b* may be coupled to the drive shaft 108 via respective drive trains or transmissions 160*a*, 160*b*. For example, the translation motor 112*a* may be coupled to a second rail 104*b*, to drive the drive shaft to translate along the second rail 104*b*, in what would typically be a vertical direction. The translation motor 112*a*, rotation motor 112*b*, and/or the respective drive trains or transmissions 160*a*, 160*b* (FIG. 2) may be supported by the support plate 156. While illustrated as a translation motor 112*a* and a rotation motor 112*b*, the actuators of the pick and/or place head 102 can take other forms, for example one or more of the actuators may take the form of one or more solenoids. The translation motor 112*a* and a rotation motor 112*b* may be controlled or operated via signals supplied by one or more control systems, for instance via one or more motor controllers 1838 (FIG. 18).

The drive shaft 108 is translatable, via the translation motor 112*a* and respective drive train or transmission 160*a*, parallel with the principal axis 138 to selectively position the engagement head 110 alternatingly distally from and proximate to a first portion of the single one of the specimen containers 1902 (FIG. 1) when the single one of the specimen containers 1902 is positioned at least partially in the receptacle 116 of the receiver 106. At least when positioned proximate to the first portion of the single one of the specimen containers 1902, the drive shaft 108 is selectively rotatable, via the rotation motor 112*b* and respective drive train or transmission 160*b*, alternatingly in a clockwise and a counterclockwise direction about the principal axis 138 to cause at least a portion (e.g., lugs 146*a*, 146*b*) of the engagement head 110 to alternatingly engage and disengage the first portion of the single one of the specimen containers 1902 while at least a portion of the receptacle 116 of the receiver 106 prevents the single one of the specimen containers 1902 from rotating about the principal axis 138.

As previously noted, the pick and/or place head 102 may be driven to translate along the first rail 104*a*, for example by one or more actuators, for example motors 162*a*, 162*b* drivingly coupled via one or more drive trains or transmissions 164*a*, 164*b* to translate the pick and/or place head 102. The motors 162*a*, 162*b* may be controlled or operated via signals supplied by one or more control systems, for instance via one or more motor controllers 1838 (FIG. 18).

Figure 7A:
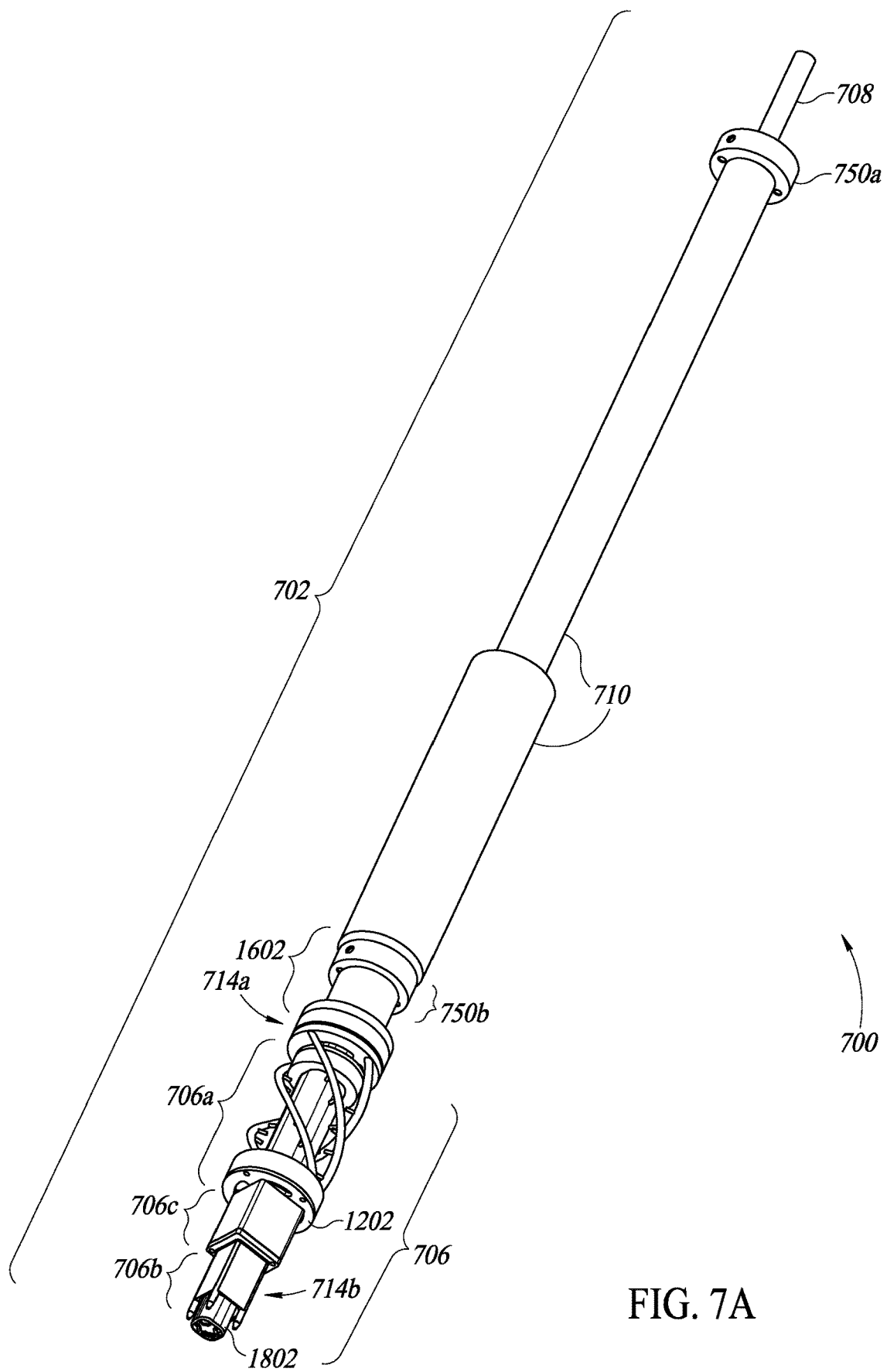
FIG. 7A is a front, right, bottom isometric view of a vacuum-based system to pick and/or place specimen containers from an array of specimen containers along with a single one of the specimen containers partially received by a portion of the vacuum-based system, according to one illustrated implementation.
Figure 7B:
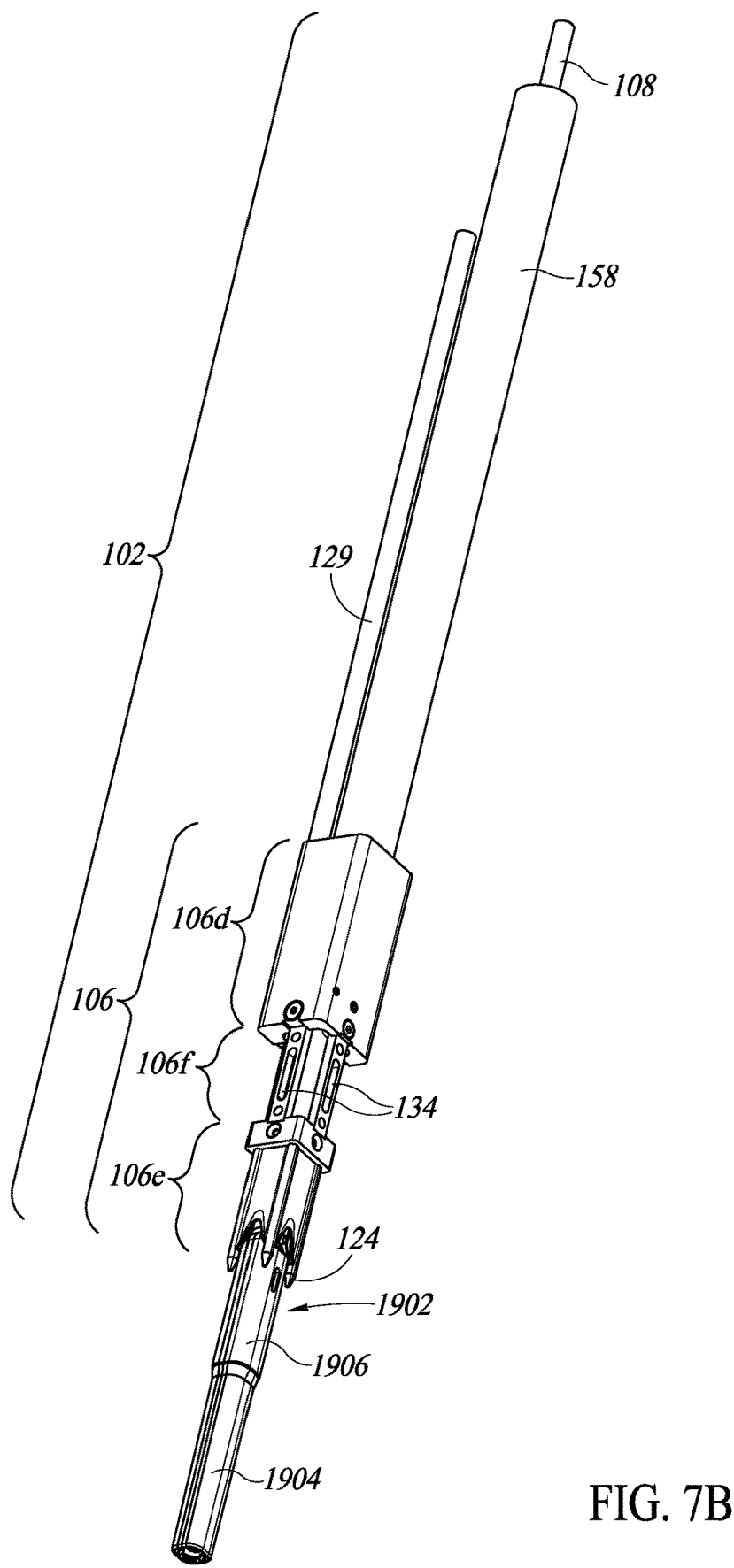
FIG. 7B is a front, right, bottom isometric view of a mechanical system to pick and/or place specimen containers from an array of specimen containers along with a single one of the specimen containers partially received by a portion of the mechanical system, according to another illustrated implementation.
Figure 8A:
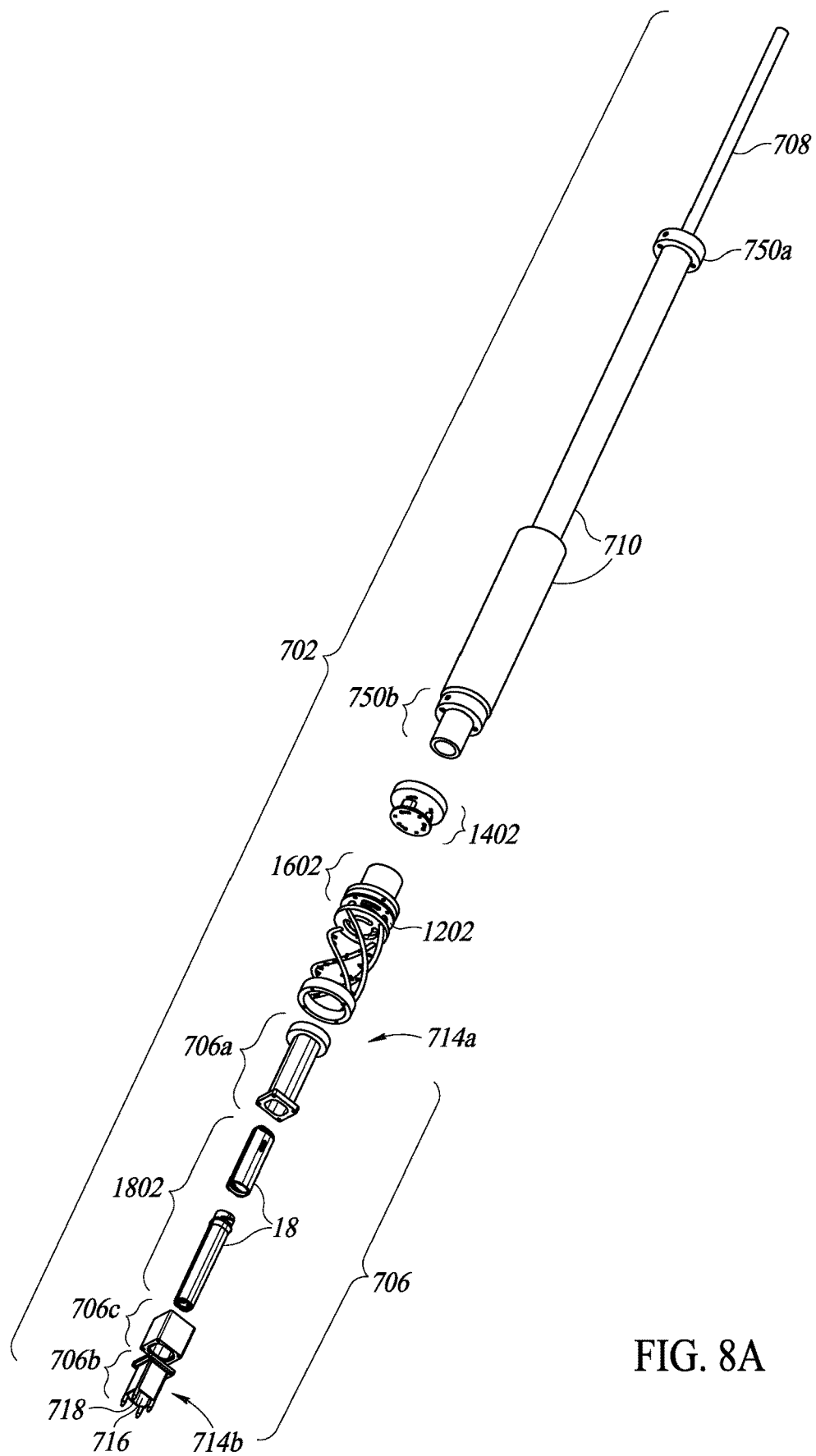
FIG. 8A is an exploded view of the vacuum-based system to pick and/or place specimen containers of FIG. 7A along with the single one of the specimen containers.
Figure 8B:
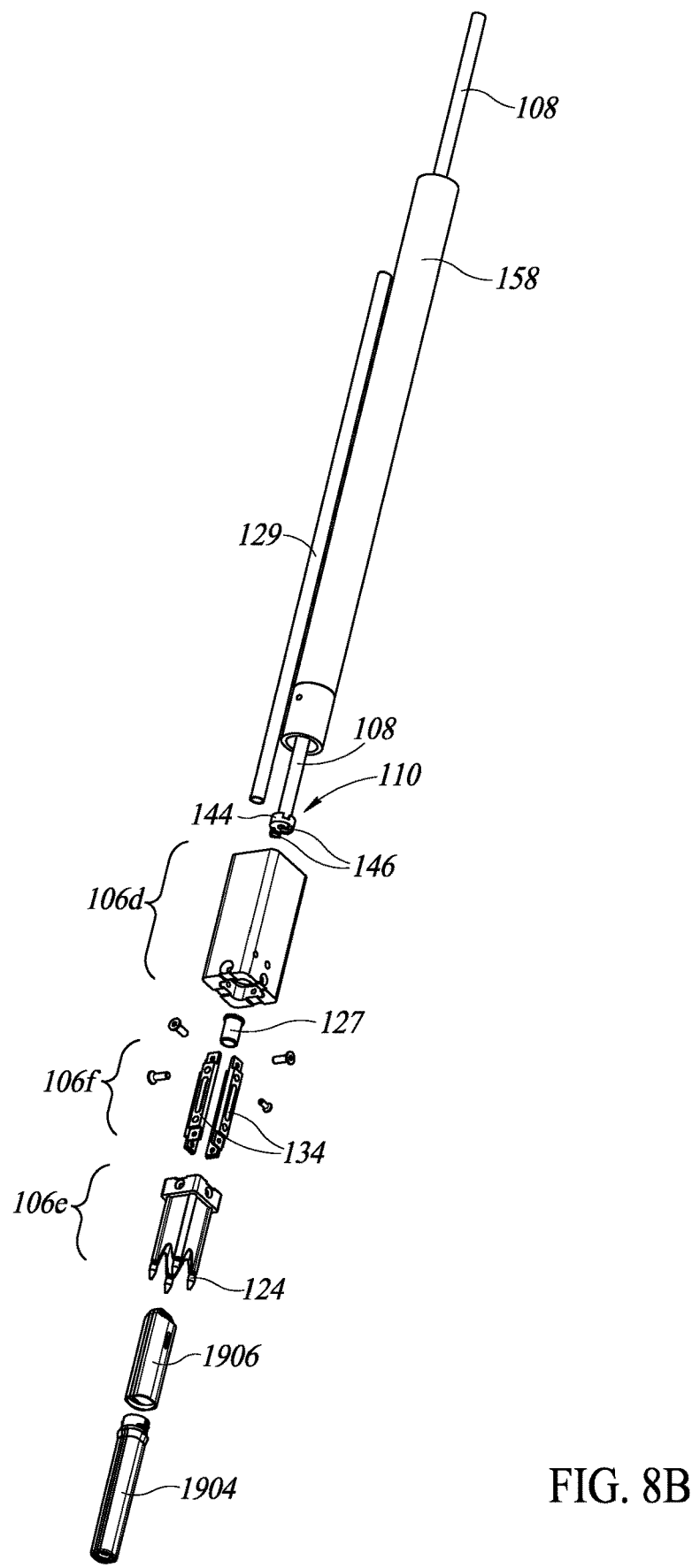
FIG. 8B is an exploded view of the mechanical system to pick and/or place specimen containers of FIG. 7B along with the single one of the specimen containers.

FIGS. 7B and 8B show portion of a mechanical system 100 to pick and/or place specimen containers, according to another one illustrated implementation. Some of the components are similar or even identical to those of the implementation of FIGS. 1-6, and hence the same reference numbers are employed for similar or identical components. Only some of the significant differences are discussed below. In particular, the receiver 106 in the implementation of FIGS. 7B and 8B has some differences with respect to the receiver 106 of the implementations of FIGS. 1-6, resulting in a simpler to manufacture design.

A proximate portion 106*d* of the receiver 106 in the implementation of FIGS. 7B and 8B is a block with a longitudinally extending cavity. The longitudinally extending cavity of the proximate portion 106*d* can be sized and shaped to receive an upper portion (e.g., cap 1902) of the single specimen container 1902 when drawn upward by the drive shaft 108, and prevent rotation of the single specimen container 1902 about a longitudinal axis when received in the longitudinally extending cavity of the proximate portion 106*d*.

A distal portion 106*e* of the receiver 106 in the implementation of FIGS. 7B and 8B is similar to the distal portion 106*b* of the receiver 106 of the implementation of FIGS. 1-6, if somewhat more elongated along the longitudinal axis thereof, and with arch shaped slots on the sides between each pair of feet or standoffs 124. The distal portion 106*e* includes a longitudinally extending cavity. The longitudinally extending cavity of the distal portion 106*e* can be sized and shaped to receive a lower portion (e.g., vial portion 1904) of the single specimen container 1902 when drawn upward by the drive shaft 108, and prevent rotation of the vial portion 1904 of single specimen container 1902 about a longitudinal axis when received in the longitudinally extending cavity distal portion 106*e*. When drawn upward into a withdrawn position or configuration, a bottom of the vial portion 1904 may extend just beyond flush with respect to the cavity of the distal portion 106*e*, protruding slightly therefrom.

An intermediate portion 106f of the receiver 106 in the implementation of FIGS. 7B and 8B is similar to the proximate portion 106a of the receiver 106 of the implementation of FIGS. 1-6. The intermediate portion 106f is illustrated as a frame or cage, comprising a set of frame members or struts 134 that extend between the proximate portion 106d and the distal portion 106e, to define an interior 136 therebetween. (Only two of four frame members or struts 134 are visible in FIGS. 7B and 8B.) The interior of the proximate portion 106a has a profile that is sized and/or shaped to accommodate a profile of a single specimen container 1902 (FIG. 19). The interior of the intermediate portion 106f, or a part thereof, may be open to an exterior or alternatively one or more sidewalls may enclose the interior. The intermediate portion 106f may have throughholes to allow the intermediate portion 106f to be coupled to the proximate portion 106d and/or distal portion 106e, for instance via one or more fasteners (e.g., threaded fasteners for instance screws or bolts and nuts).

Also visible in FIG. 8B is a bushing 127 through which the drive rod 108 is received and rotatably mounted. The bushing typically is positioned above the distal end 142b and the engagement head 110 of the drive rod 108, and is located in guide tube 158.

Also visible in FIGS. 7B and 8B is tubing 129. Tubing 129 supplies a flow of cryogenic fluid (e.g., liquid nitrogen) to the single specimen container 1902 in the event of an anomaly or error condition. Such can advantageously flood the single specimen container 1902 with liquid nitrogen in the event that the single specimen container 1902 cannot be successfully picked or placed, or the pick and/or place head 102 otherwise becomes stuck or non-operable.

The implementations of FIGS. 1-6, 7B and 8B can include one or more magnets positioned to exert an upward (i.e., against the force of gravity) magnetic force, directly or indirectly, on the shaft 108, biasing and thereby retaining the shaft 108 in a retracted position unless actively driven downward by a motor (e.g., motors 162a) and thereby preventing the shaft 108 from falling downward in the event of a power failure or other loss of control. This can advantageously ensure that access to the containers, vial or beacons will remain at least manually accessible and not blocked by the pick and/or place head 102 during any contingencies. The one or more magnets can, for example take the form of permanent magnets or electric magnets, although permanent magnets may be preferred since such would not be adversely effected in the event of a loss of electrical power.

As described with reference to FIG. 18, below, the mechanical system 100, the pick and/or place head 102 and/or a control system may include one or more sensors (e.g., mechanical encoders, optical encoders, magnetic encoders, electromagnetic induction encoders, rotary encoders, linear encoders, position encoders, level sensors, cameras, infrared transmitter and receiver pairs, Reed switches, Hall effect sensors, temperature sensors or thermocouples, humidity sensors, force sensors, pressure sensors, load cells, vibration sensors, flow rate or volume sensors) positioned to sense various conditions (e.g., position, orientation, mechanical resistance, presence or absence of frost). As described with reference to FIG. 18, below, the mechanical system 100 and/or the pick and/or place head 102 may include one or more defrosters selectively operable to defrost portions of the mechanical system 100, portions of the pick and/or place head 102 and/or the specimen containers 1902 (FIG. 19).

In at least some implementations, the mechanical system 100 of FIGS. 1, 2, 7B and 8B may include a manual override mechanism that manually dispenses the single one of the specimen containers from the receiver, for example even when frost buildup prevents the at least one actuator from successfully dispensing the single one of the specimen containers from the receiver. The manual override mechanism may, for example, include at least one handle, for instance a knob, that extends lateral from the drive shaft. The manual override mechanism may optionally include a slot in a side wall of the receiver and a cover that selectively provides access laterally into the interior of the receiver via the side wall, similar in some respects to a bolt action rifle.

FIGS. 7A and 8A show a vacuum-based system 700 to pick and/or place specimen containers from an array of specimen containers, which is illustrate along with a single one of the specimen containers 1902 partially received by a portion of the vacuum-based system 700, according to one illustrated implementation.

The vacuum-based system 700 includes a pick and/or place head 702. The pick and/or place head 702 may be mounted to travel along a rail (e.g., first rail 104a, FIG. 1). The first rail 104a may extend vertically, for example, allowing the pick and/or place head 702 to translate vertically. Such may, for example, allow the pick and/or place head 702 to be moved between an interior and an exterior of an enclosed cryogenic environment (e.g., cryogenic freezer, dewar or other cryogenic enclosure), for example via a door or access port at a top of cryogenic enclosure.

The pick and/or place head 702 includes a receiver 706, a drive shaft 708, a vacuum conduit 710. The pick and/or place head 702 may include or may be coupled with one or more actuators, for example one or more solenoids or electric motors 1836a, 1836b, 1836c (FIG. 18) and/or one or more vacuum source(s) 1842 (FIG. 18). It is noted that use of the term vacuum herein and in the claims refers to a negative pressure, e.g., a pressure below atmospheric pressure or below ambient pressure in the adjacent surroundings, which typically is somewhat above an absolute vacuum or zero pressure.

The receiver 706 has a proximate end 714a, a distal end 714b, and a receptacle 716 (called out in FIG. 8) having an opening 718b at the distal end 714b of the receiver 706.

As illustrated, the receiver 706 and the receptacle 716 may be formed of two or more parts, although in some implementations the receiver 706 may take the form of a single-piece, unitary structure. As illustrated, the receiver 706 comprises a proximate portion 706a, a distal portion 706b, and an intermediate portion 706c, the intermediate portion 706c positioned between the proximate portion 706a and the distal portion 706b.

Figure 9A:
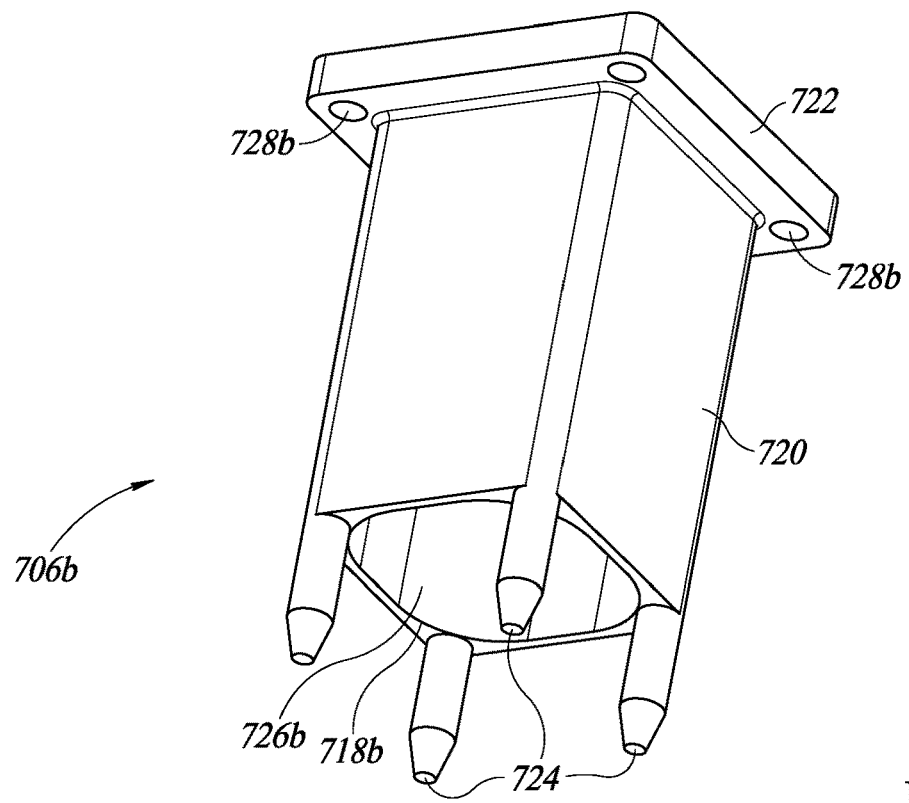
FIG. 9A is a bottom, front, right side isometric view of a distal portion of a receiver of a pick and/or place head of the vacuum-based system of FIGS. 7A and 8A, illustrated as a distal block or sleeve with a peripheral flange and with a set of feet or standoffs, according to at least one illustrated implementation.
Figure 9B:
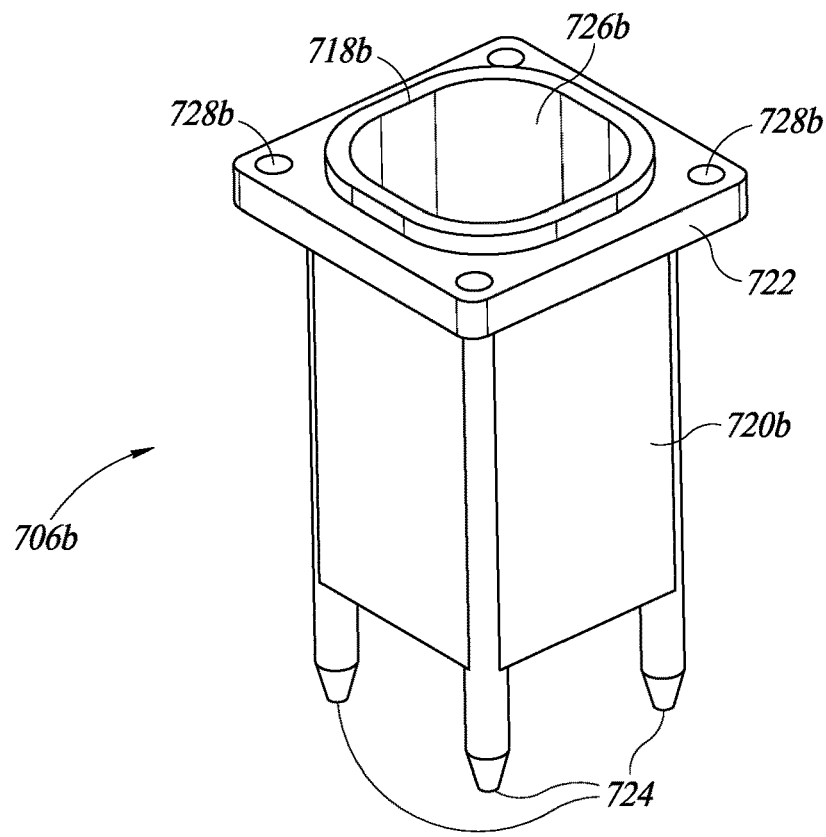
FIG. 9B is a top, front, right side isometric view of a distal portion of a receiver of a pick and/or place head of the vacuum-based system of FIGS. 7A and 8A, illustrated as a distal block or sleeve with a peripheral flange and with a set of feet or standoffs, according to at least one illustrated implementation.

As best illustrated in FIGS. 9A and 9B, the distal portion 706b of the receiver 706 is illustrated as a distal block or sleeve 720b with a peripheral flange 722 extending laterally therefrom at a proximate end of the distal block or sleeve 720b and with a set of feet or standoffs 724 extending or projecting longitudinally therefrom at a distal end of the distal block or sleeve 720b. The distal block or sleeve 720b includes a through-passage 726b with openings 718b that provide access to an interior of the distal block or sleeve 720b, for example from an exterior of the receiver 706. The openings 718b and/or the through-passage 726b of the distal block or sleeve 720b have a profile that is/are sized and/or shaped to accommodate a profile of a single specimen container 1902 (FIGS. 7A and 8A). The peripheral flange 722 of the distal block or sleeve 720b may have holes 728b (e.g., threaded holes, only one called out in FIGS. 9A and 9B) to allow the distal portion 706b to be coupled to the intermediate portion 106c, for instance via one or more fasteners (e.g., threaded fasteners, not called out in FIGS. 7A and 8A), and omitted from FIGS. 9A and 9B).

Figure 10A:
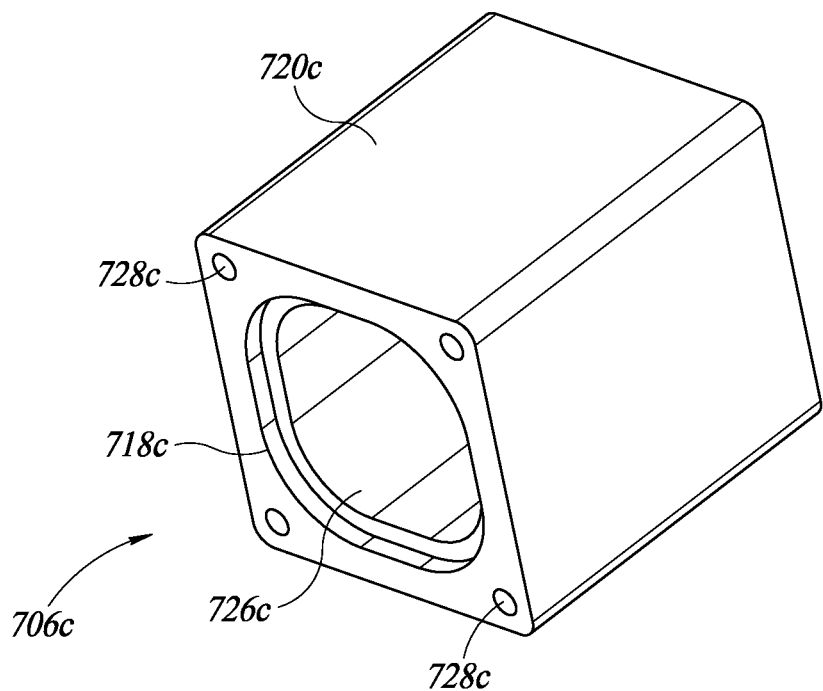
FIG. 10A is a bottom, front, right side isometric view of an intermediate portion of a receiver of a pick and/or place head of the vacuum-based system of FIGS. 7A and 8A, illustrated as an intermediate block or sleeve, according to at least one illustrated implementation.
Figure 10B:
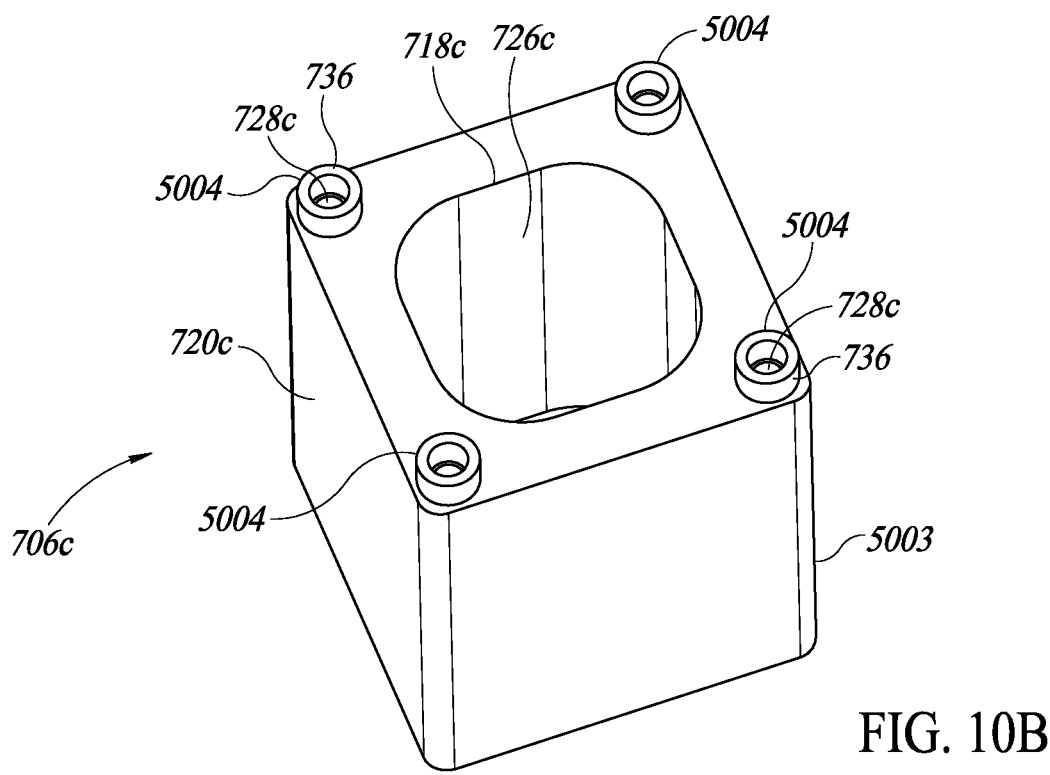
FIG. 10B is a top, front, right side isometric view of an intermediate portion of a receiver of pick and/or place head of the vacuum-based system of FIGS. 7A and 8A, illustrated as an intermediate block or sleeve, according to at least one illustrated implementation.

As best illustrated in FIGS. 10A and 10B, the intermediate portion 706c of the receiver 706 is illustrated as an intermediate block or sleeve 720c. The intermediate block or sleeve 720c includes a through-passage 726c with openings 718c that provide access to an interior of the intermediate block or sleeve 720c. The openings 718c and/or the through-passage 726c of the intermediate block or sleeve 720c have a profile that is/are sized and/or shaped to accommodate a profile of a single specimen container 1902 (FIGS. 7A and 8A). The intermediate block or sleeve 720c may have holes 728c (only two called out in each of FIGS. 10A and 10B) to allow the intermediate portion 706c to be coupled to the distal portion 706a and coupled to proximate portion 706b, for instance via one or more fasteners (not called out in FIGS. 7A and 8A), and omitted from FIGS. 10A and 10B). As best illustrated in FIG. 10B, one or more bearings 736 may be coupled to a proximate end of the intermediate portion 706c of the receiver 706.

Figure 11A:
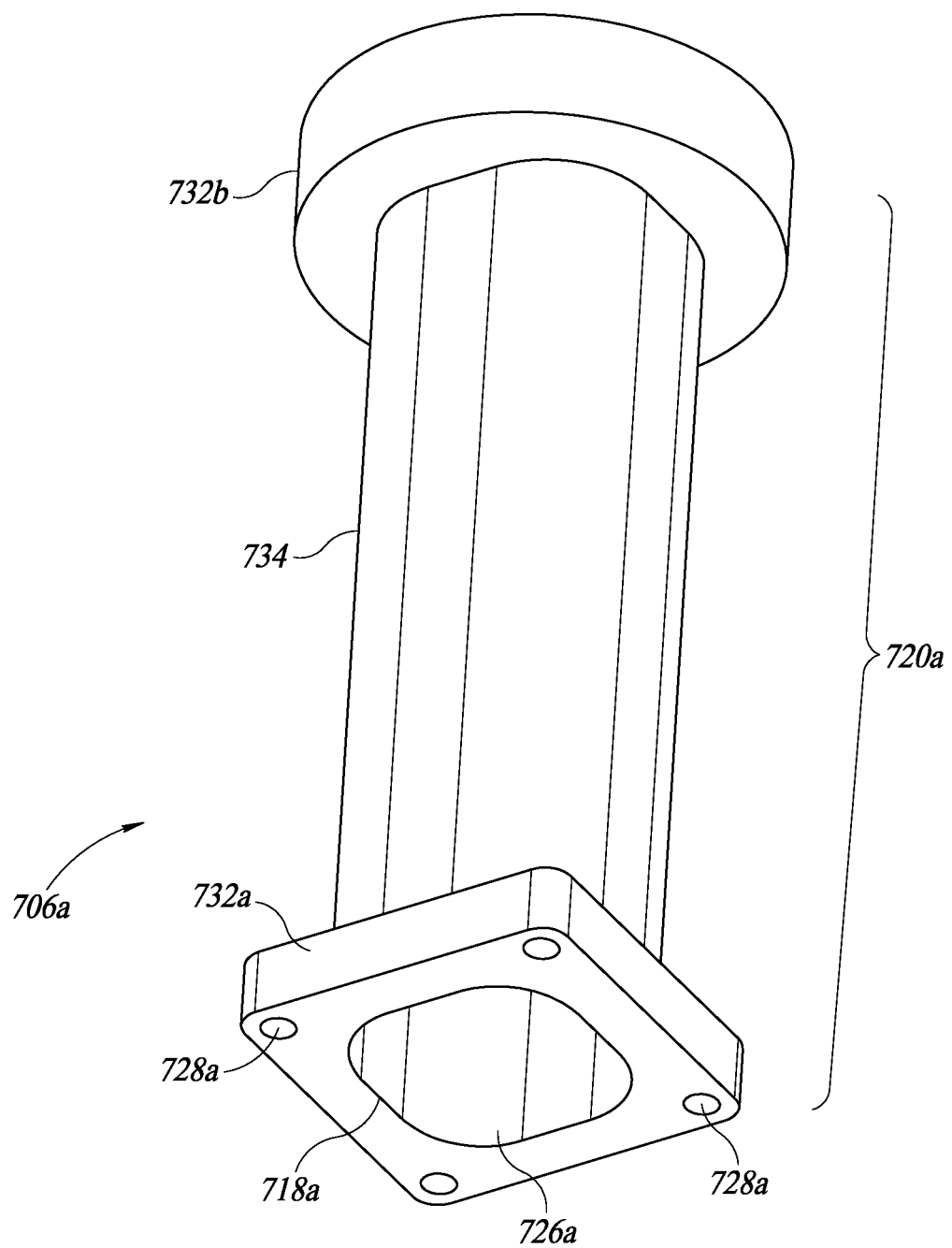
FIG. 11A is a bottom, front, right side isometric view of a proximate portion of a receiver of a pick and/or place head of the vacuum-based system of FIGS. 7A and 8A, illustrated as an proximate block or sleeve having a tubular main body with a distal flange and a proximate flange, according to at least one illustrated implementation.
Figure 11B:
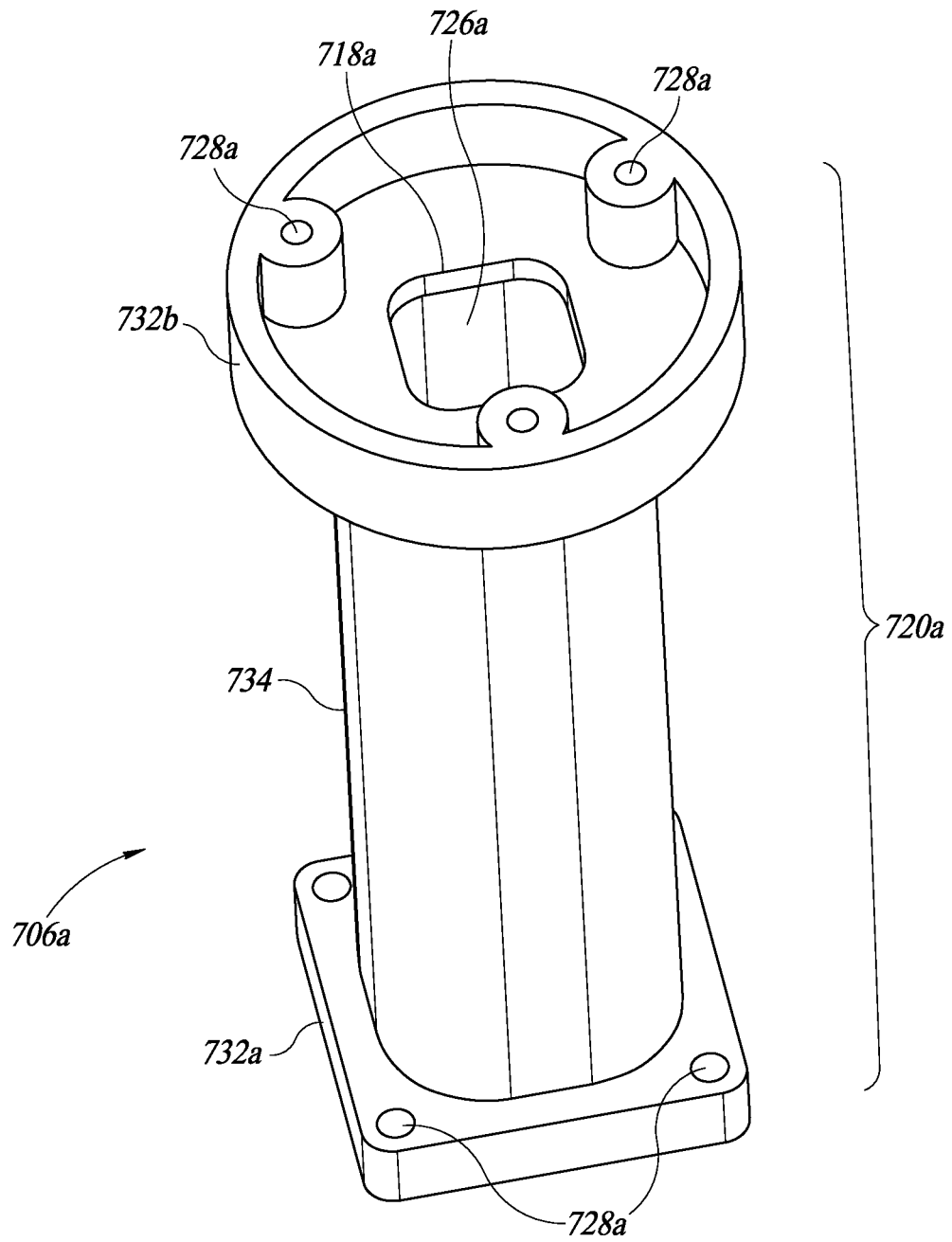
FIG. 11B is a top, front, right side isometric view of a proximate portion of a receiver of a pick and/or place head of the vacuum-based system of FIGS. 7A and 8A, illustrated as an proximate block or sleeve having a tubular main body with a distal flange and a proximate flange, according to at least one illustrated implementation.

As best illustrated in FIGS. 11A and 11B, the proximate portion 706a of the receiver 106 is illustrated as a proximate block or sleeve 720b. The proximate block or sleeve 720a comprises a tubular main body portion 734 with a distal flange 732a extending laterally from a distal end thereof and a proximate flange 732b extending laterally from a proximate end thereof. The proximate block or sleeve 720b includes a through-passage 726a with openings 718a that provide access to an interior of the proximate block or sleeve 720a. The openings 718a and/or through-passage 726a of the proximate portion 706a may have a profile that is sized and/or shaped to accommodate a profile of a single specimen container 1902 (FIGS. 7A and 8A), although may have higher fit tolerances than that of the openings 718b and/or through-passage 726b of the distal block or sleeve 720b or corresponding openings 718c and/or through-passage 726c of the intermediate block or sleeve 720c. The interior or through-passage 736a of the proximate portion 706a is laterally enclosed, with the opening 718c at the proximate end providing a vacuum port which allows a vacuum or negative pressure to be established in the interior of the proximate portion 706a, which can advantageously be used to draw a single specimen container 1902 (FIGS. 7A and 8A) inwards into the interior of the through-passage 726a from a position in which a portion of the single specimen container 1902 was received in the distal and/or intermediary blocks or sleeves 702a, 720c.

The distal flange 732a of the proximate portion 706a may have holes 728a (e.g., threaded holes) to allow the proximate portion 706a to be coupled to the intermediate portion 706c, for instance via one or more fasteners (e.g., threaded fasteners, for instance screws or bolts, not illustrated in FIGS. 11A and 11b) and/or via one or more bearings 736 (FIG. 10B) and a pivot plate 1202 (as described below). The proximate flange 732b of the proximate portion 706a may have holes 728a to allow the proximate portion 706b to be coupled to a cover 1402 (FIGS. 14A 14B) of the pick and/or place head 102 (described below), for instance via one or more fasteners (e.g., threaded fasteners, not called out in FIGS. 1-3, and omitted from FIGS. 11A and 11B).

Figure 12:
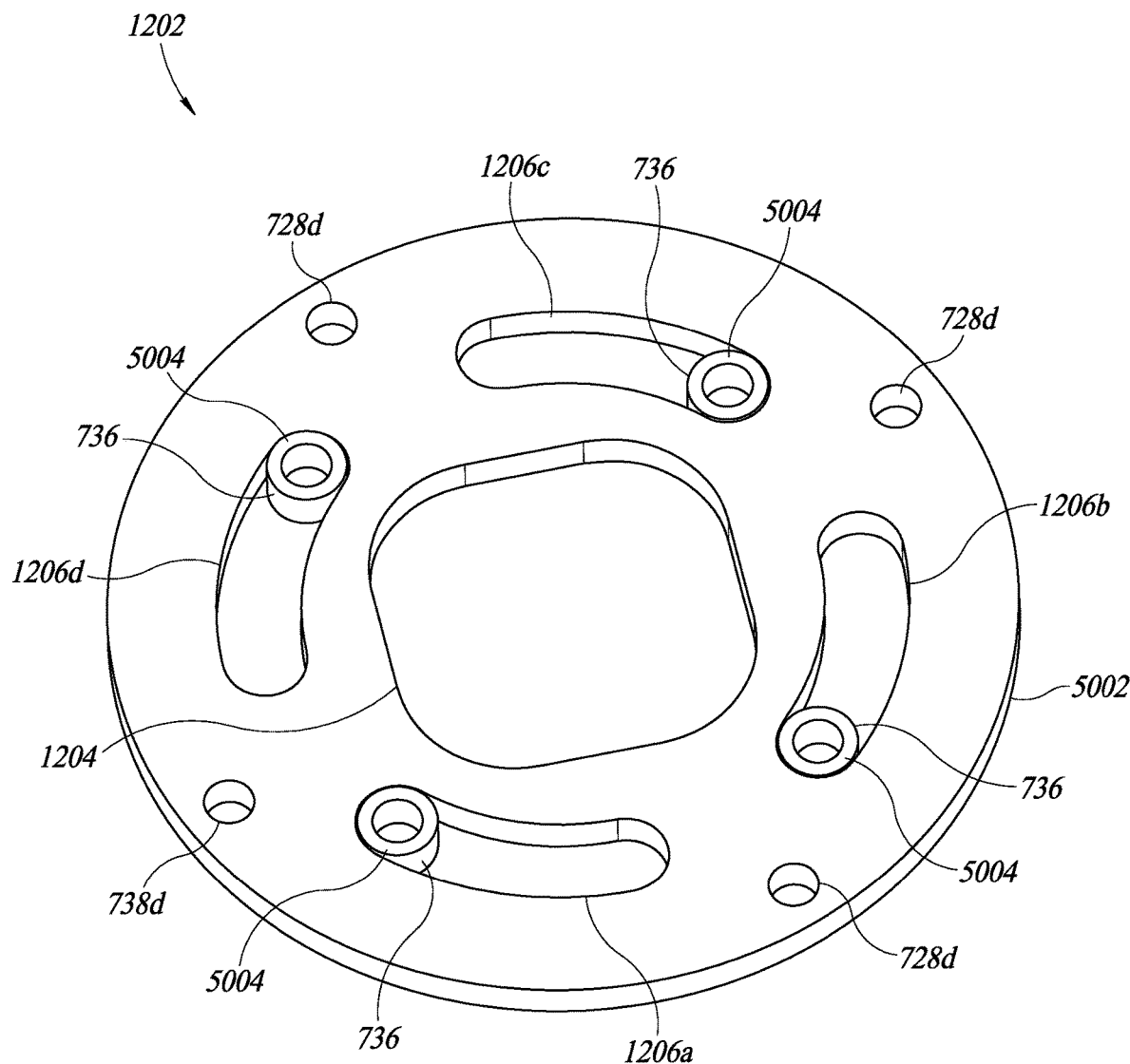
FIG. 12 is a top, front isometric view of a pivot plate and a number of bearings of a pick and/or place head of the vacuum-based system of FIGS. 7A and 8A, the pivot plate illustrated as a plate with a circular profile, a central passage and a number of arcuate slots spaced radially outward of the central passage which extend through the plate and in which the bearings ride, according to at least one illustrated implementation.

As noted above, the proximate end of the proximate portion 706a of the receiver 706 may be coupled to a pivot plate 1202. As best seen in FIG. 12, the pivot plate 1202 may, for example, take the form of a disk, and has a central passage 1204. The central passage 1204 has a profile that is sized and/or shaped to accommodate a profile of a single specimen container 1902 (FIGS. 7A and 8A). The central passage 1204 aligns with the through-passages 726a, 726b, 726c of the proximate portion 706a, distal portion 706b and intermediate portion 706c of the receiver 706 (FIGS. 7A and 8A) such that single specimen container 1902 (FIGS. 7A and 8A) can pass within or extend through the distal portion 706b, intermediate portion 706c, pivot plate 1202, and proximate portion 706a.

The pivot plate 1202 may also have a number (e.g., four) of arcuate slots 1206a, 1206b, 1206c, 1206d (collectively 1206) spaced radially outward of central passage 1204. The arcuate slots 1206 have a width sized to receive respective ones of the bearings 736. The pivot plate 1202 allows pivoting through a defined range of angles.

The pivot plate 1202 also include a number of holes 728d (e.g., threaded holes) to allow the pivot plate 1202 to be physically coupled to a torque coupler 1302 (FIGS. 13A, 13B) described below.

Figure 13A:
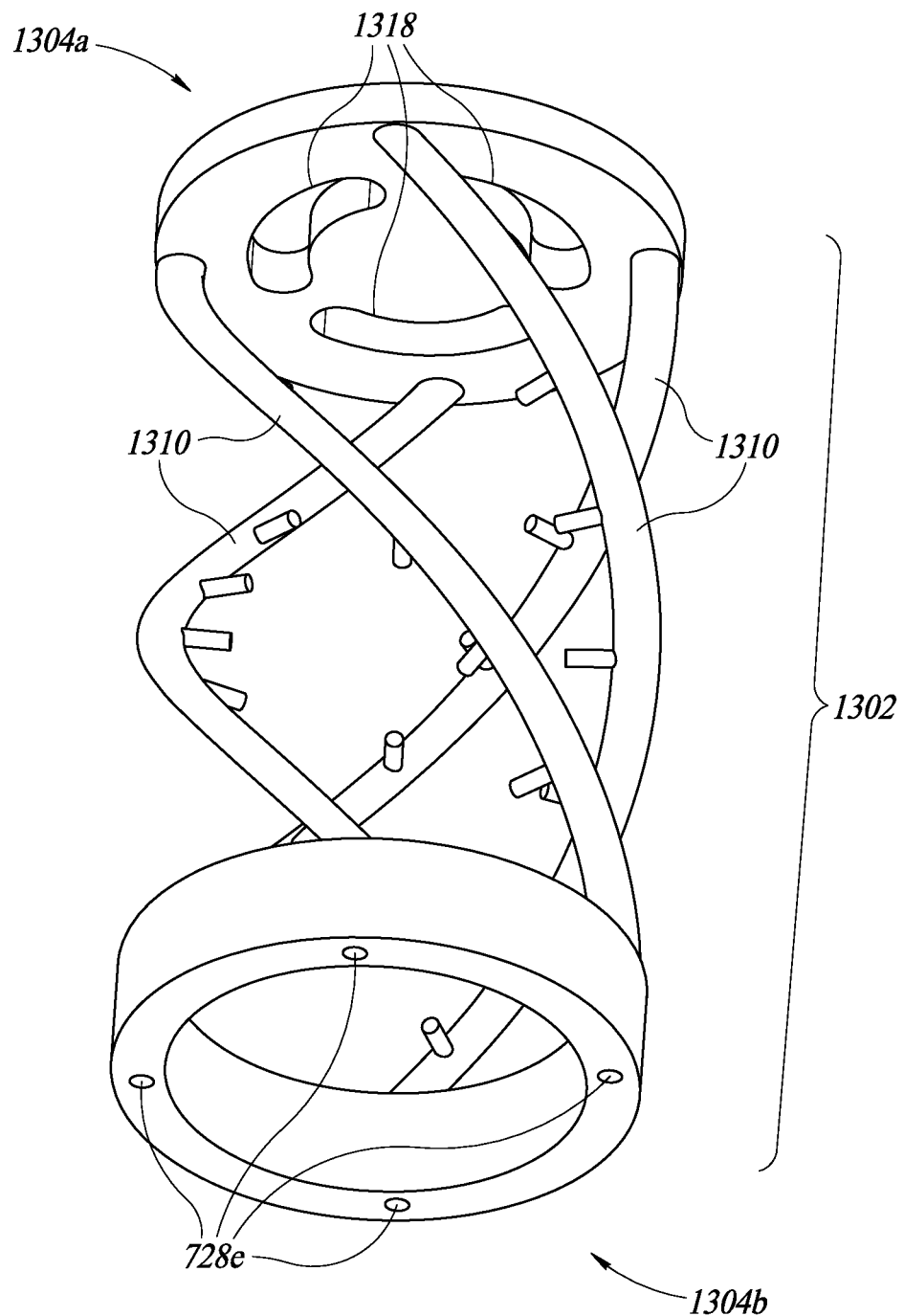
FIG. 13A is a bottom, front, right side isometric view of a torque coupler of a pick and/or place head of the vacuum-based system of FIGS. 7A and 8A, illustrated as having an annular base at a distal end, a plate at a proximate end with a number of arcuate slots extending through a thickness of the plate, and a number of strands that couple the annular base to the plate, according to at least one illustrated implementation.
Figure 13B:
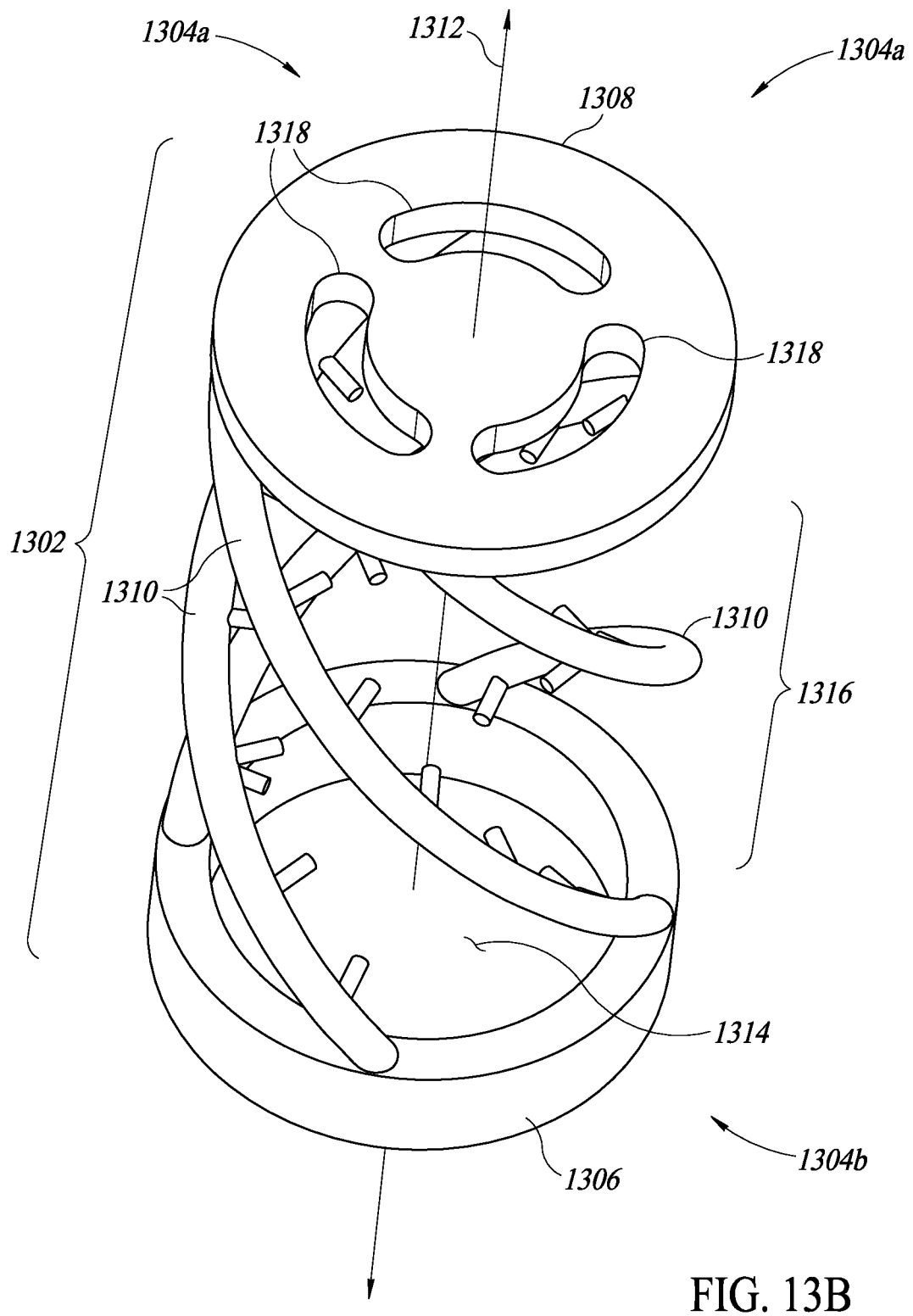
FIG. 13B is a top, front, right side isometric view of a torque coupler of a pick and/or place head of the vacuum-based system of FIGS. 7A and 8A, illustrated as having an annular base at a distal end, a plate at a proximate end with a number of arcuate slots extending through a thickness of the plate, and a number of strands that couple the annular base to the plate, according to at least one illustrated implementation.

As best illustrated in FIGS. 13A and 13B, the torque coupler 1302 has a proximate end 1304a, a distal end 1304b. The torque coupler 1302 has an annular base 1306 at the distal end 1304b and a plate 1308 in the form of a disk at the proximate end 1304a. The torque coupler 1302 has a plurality of strands 1310 (four shown) that couple the annular base 1306 with the plate 1308. The strands 1310 are spaced radially outward of a longitudinal axis 1312, to define a space 1314 in which the intermediate portion 706c (FIGS. 11A, 11B) can be received. Each of the strands 1310 may, for example, have a helical shape, the plurality of strands 1310 forming a helical cage 1316 about the intermediate portion 706c. The plurality of strands 1310 are sufficiently stiff in rotation about the longitudinal axis 1312 to transmit torque, yet may be compliant to axial forces (e.g., compression and/or tension along the longitudinal axis 1312) to dampen vibration.

The annular base 1306 at the distal end 1304b of the torque coupler 1302 has a plurality of holes 728e (e.g., threaded holes, FIG. 13A), which allows the annular base 1306 to be physically coupled to the pivot plate 1202 (FIG. 12), for instance via fasteners (not shown in FIGS. 13A, 13B), for instance threaded screws or bolts.

The plate 1308 at the proximate end 1304a of the torque coupler 1302 includes a number (e.g., three) arcuate slots 1318 spaced radially outward of the longitudinal axis 1312. The arcuate slots 1318 extend through an entire thickness of the plate 1308 so constitute through-slots. The arcuate slots 1318 are sized, shaped and/or positioned to receive respective arcuate projections of the cover 1402 (FIGS. 14A 14B) described below, that is itself attached to the proximate portion 706a of the receiver 706 at the proximate end thereof, thereby rotationally coupling the torque coupler 1302 with the intermediate portion 706c of the receiver 706 and providing for fluid (e.g., airflow, negative pressure or vacuum) as described below.

Figure 14A:
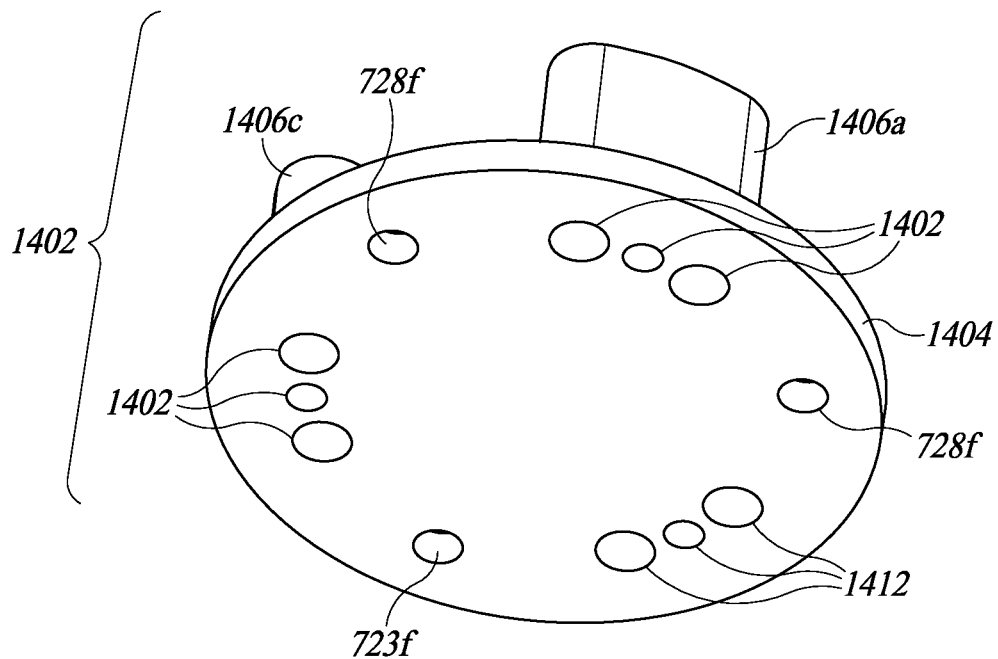
FIG. 14A is a bottom, front, right side isometric view of a cover of a pick and/or place head of the vacuum-based system of FIGS. 7A and 8A, illustrated as having a base and a number of arcuate projections with one or more throughholes, the arcuate projections sized, shaped, and positioned to be received through respective ones of the arcuate slots of the plate of the torque coupler, according to at least one illustrated implementation.
Figure 14B:
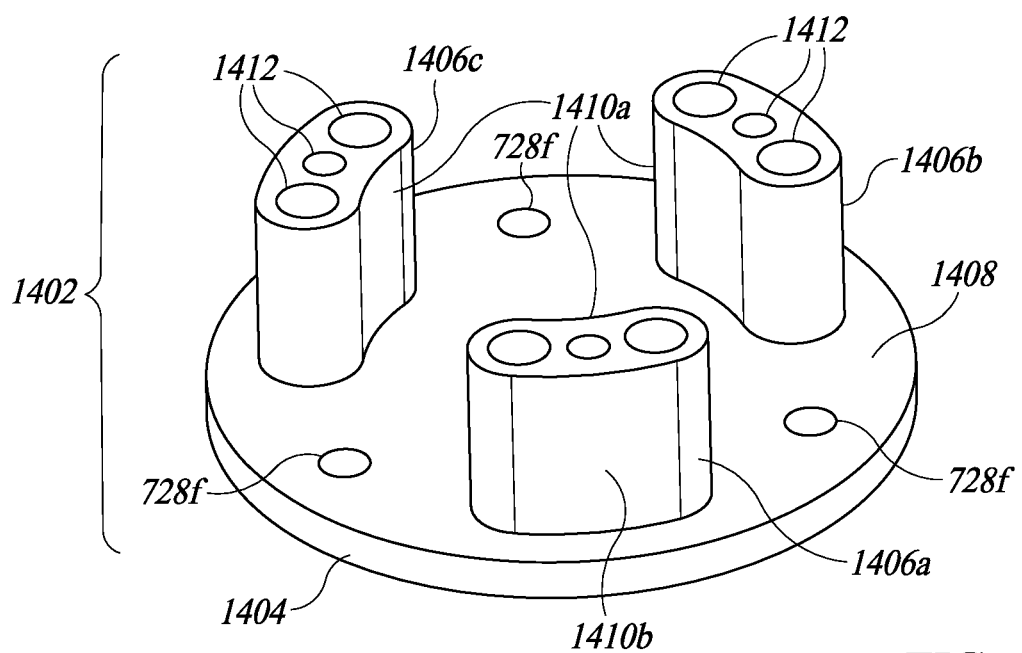
FIG. 14B is a top, front, right side isometric view of a cover of a pick and/or place head of the vacuum-based system of FIGS. 7A and 8A, illustrated as having a base and a number of arcuate projections with one or more throughholes, the arcuate projections sized, shaped, and positioned to be received through respective ones of the arcuate slots of the plate of the torque coupler, according to at least one illustrated implementation.

As best illustrated in FIGS. 14A and 14B, the cover 1402 includes a base 1404, for example a circular plate having a number of arcuate projections 1406a, 1406b, 1406c (three shown, collectively 1406) extending upwardly (e.g., perpendicularly from a top surface 1408 of the base 1404. The base 1404 may also include a number of holes 728f (e.g., threaded holes), which allows the base 1404 to be fastened to the proximate portion 706a of the receiver 706 at the proximate end thereof, hereby creating a chamber at the proximate end of the proximate portion 706a of the receiver 706.

The arcuate projections 1406 are spaced radially outward of a longitudinal axis. The arcuate projections 1406 may each have an arcuate face 1410*a* that faces radially toward the longitudinal axis and an arcuate face 1410*b* that faces radially outward with respect to the longitudinal axis. The positions of the arcuate projections 1406 of the cover 1402 both radially and angular about the longitudinal axis, as well as the shape and size of the arcuate projections 1406 of the cover 1402 match the positions and shapes and sizes of the arcuate slots 1318 of the plate 1308 of the torque coupler 1302, to mate with or be closely receive by respective ones of the arcuate slots 1318 of the plate 1308 of the torque coupler 1302.

Each of the arcuate projections 1406 includes one or more throughholes 1412 (only a few called out) which also pass through the base to provide a conduit for an airflow or pressure (e.g., negative pressure or vacuum, positive pressure) to be applied to the interior (e.g., enclosed cavity) of the intermediate portion of the receiver. Thus, the cover 1402 may alternatively be described as a manifold.

Proximate-most portions of the arcuate projections 1406 of the cover 1402 interface with a distal surface of a head 1502 (described below) of the drive shaft 708 (FIGS. 7A and 8A), the drive shaft 708 and head 1502 best illustrated in FIGS. 15A and 15B.

Figure 15A:
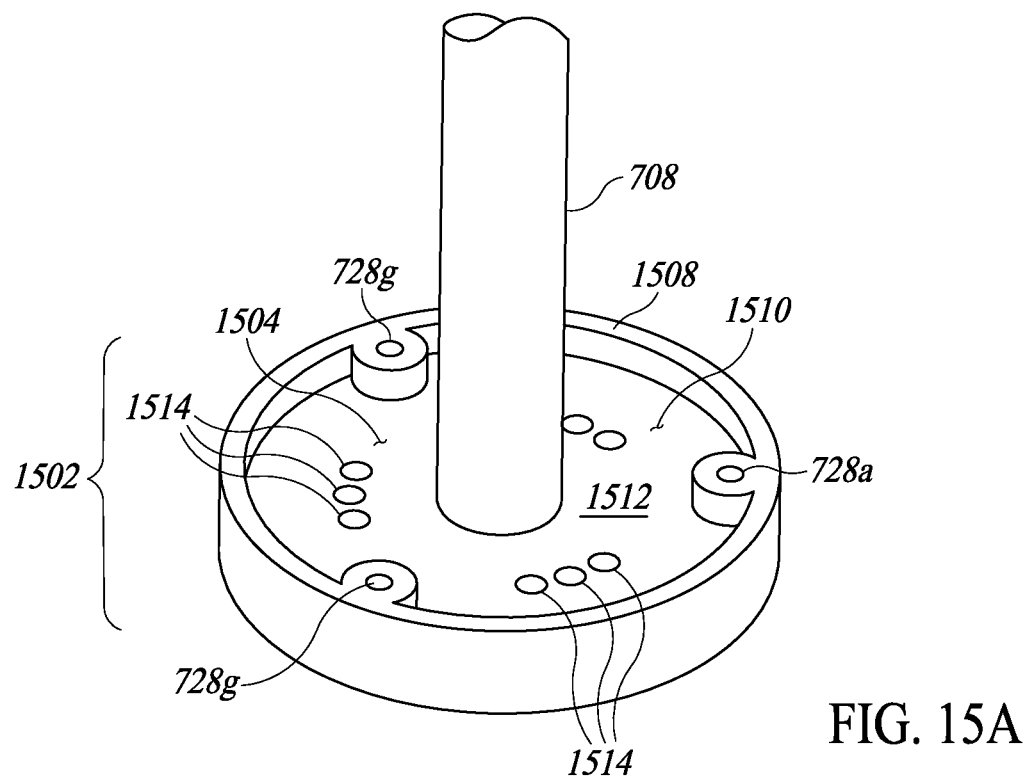
FIG. 15A is a bottom, front, right side isometric view of a drive shaft of a pick and/or place head of the vacuum-based system of FIGS. 7A and 8A, illustrated as having a rod with a head at a distal end thereof, the distal head including a number of throughholes to align with the throughholes of the arcuate projections of the cover, according to at least one illustrated implementation.
Figure 15B:
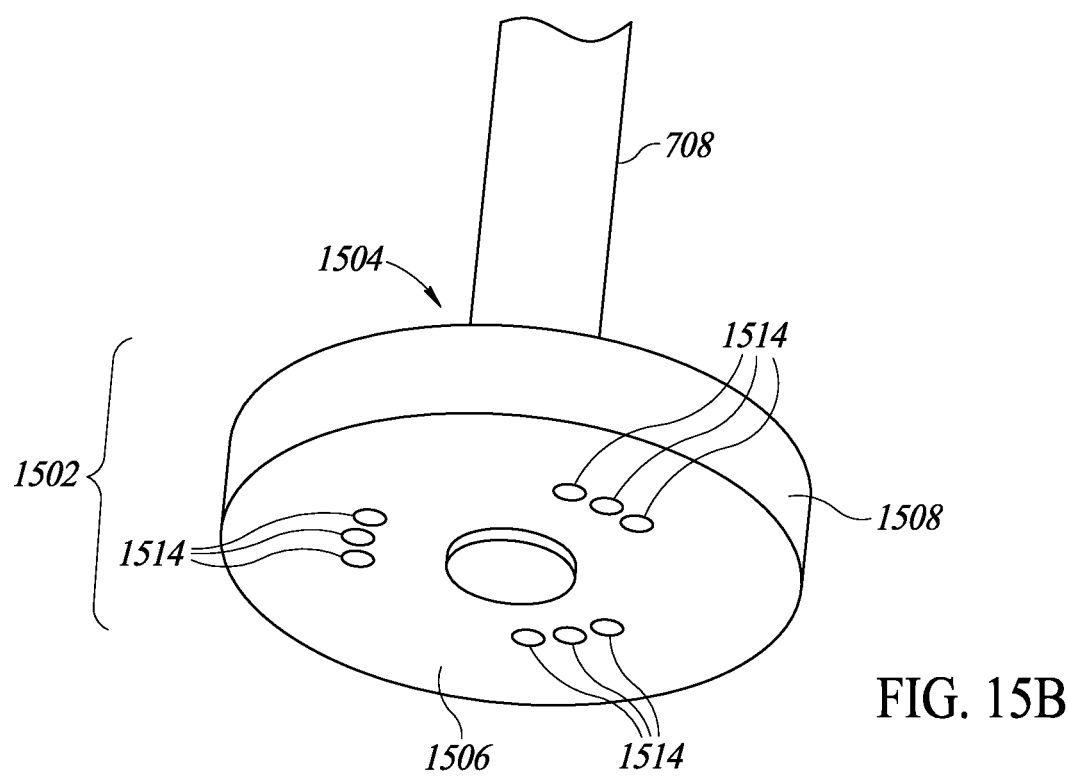
FIG. 15B is a top, front, right side isometric view of a drive shaft of a pick and/or place head of the vacuum-based system of FIGS. 7A and 8A, illustrated as having a rod with a head at a distal end thereof, the distal head including a number of throughholes to align with the throughholes of the arcuate projections of the cover, according to at least one illustrated implementation.

As best illustrated in FIGS. 15A and 15, the drive shaft 708 may take the form of an elongated member, for instance a rod, with a head 1502 at a distal end 1504 of the drive shaft 708. The head 1502 may take the form of a plate 1506, for example a disk, with an upstanding peripheral wall or edge 1508 to define a recess or interior volume 15010. The drive shaft 708 may terminate at a floor 1512 or may extend through the plate 1506. The plate 1506 has a number of throughholes 1514 that are positioned, oriented, sized, and/or shaped to align or couple with respective throughholes 1412 of the cover 1402, to provide a fluidly conductive paths therethrough.

The head 1502 may also include a number of holes 728*g* (e.g., threaded holes) which allow the head 1502 to be physically coupled or fastened to a collar 1602 (best illustrated in FIGS. 16A and 16B), described below.

Figure 16A:
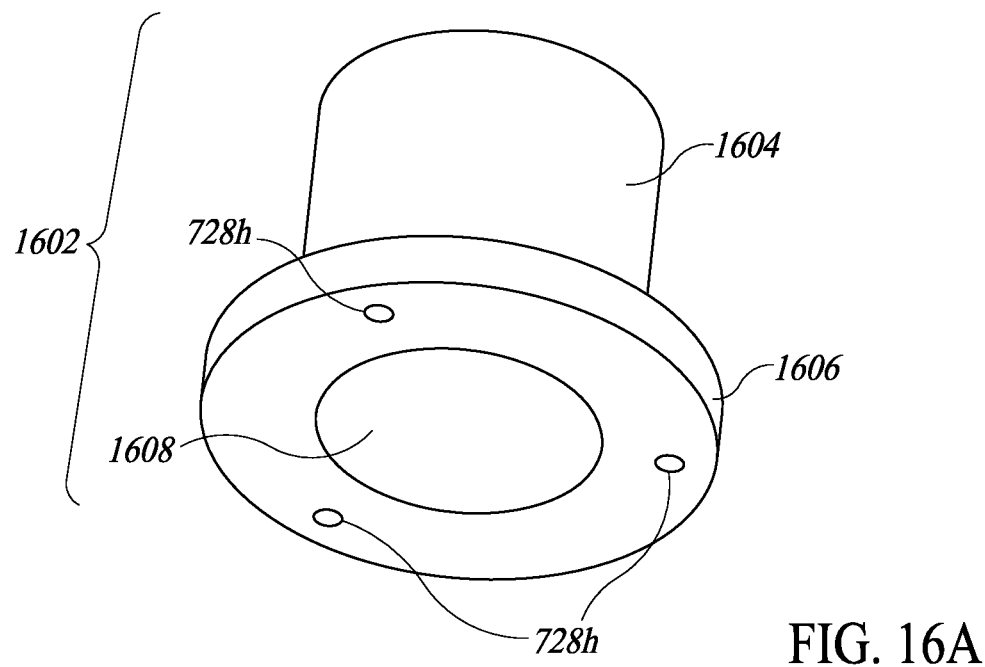
FIG. 16A is a bottom, front, right side isometric view of a collar of a pick and/or place head of the vacuum-based system of FIGS. 7A and 8A, illustrated as having a stem with a flange at a distal end thereof, the collar fastenable to the head of the drive shaft to form an enclosed volume therebetween, according to at least one illustrated implementation.
Figure 16B:
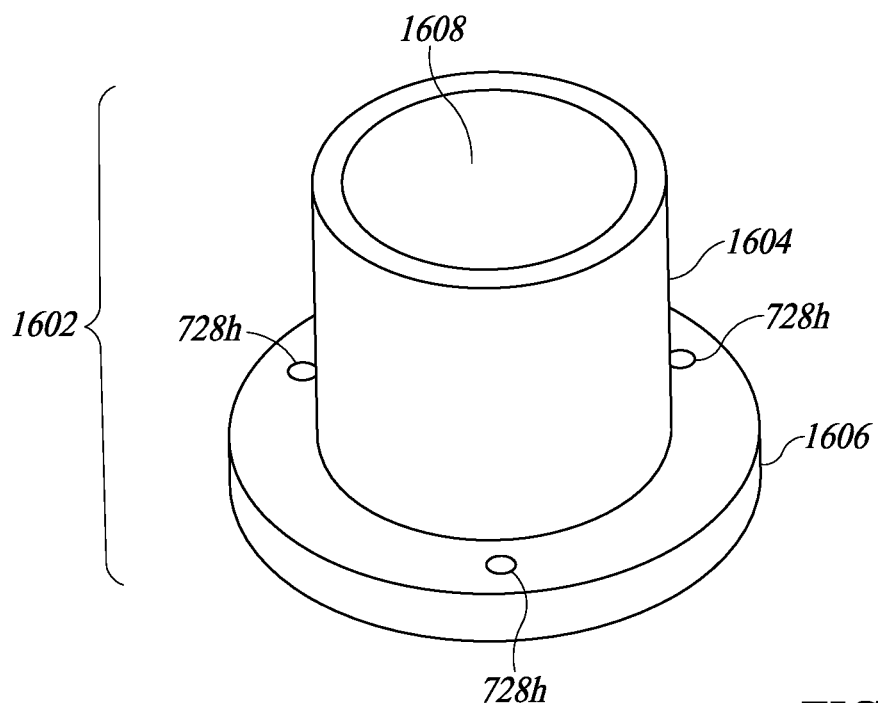
FIG. 16B is a top, front, right side isometric view of a collar of a pick and/or place head of the vacuum-based system of FIGS. 7A and 8A, illustrated as having a stem with a flange at a distal end thereof, the collar fastenable to the head of the drive shaft to form an enclosed volume therebetween, according to at least one illustrated implementation.

As best illustrated in FIGS. 16A and 16B, the collar 1602 includes a stem 1604 with a flange 1606 that extends radially outward from a distal end of the stem 1604 and collar 1602. The flange 1606 may include a number of holes 728*h* (e.g., threaded holes) which allow the collar 1602 to be physically coupled or fastened to the head 1502. When coupled to the head 1502, the collar 1602 and the head 1502 form a cavity therebetween. The stem 1604 has a central passage 1608 which provides a fluidly conductive path into an interior of the cavity formed by the collar 1602 and the head 1502.

As best illustrated in FIGS. 7A and 8A, a vacuum conduit 710 in the form of a tube or sheath receives a portion the drive shaft 708, allowing rotation of the drive shaft 708 relative to the vacuum conduit 710. The vacuum conduit 710 also provides a conduit for airflow, including a negative pressure or even a positive pressure, in a volume of the interior of the vacuum conduit 710 that is not occupied by the drive shaft 708. The vacuum conduit 710 may have a coupler 750*a* at a proximal end thereof to provide a detachable or even permanent coupling to a supply line from a vacuum source (e.g., vacuum pump, Venturi). The vacuum conduit 710 may have a coupler 750*b* at a distal end thereof to provide a detachable or even permanent coupling to the collar 1602.

The described pick and/or place head 702 of the vacuum-based system 700 provides a fluidly conductive path that allows a pressure (e.g., negative pressure or vacuum, positive pressure) generated or produced by a source to be communicated into the interior of the receiver 706. For example, a vacuum is supplied at the proximate end of the vacuum conduit 710. The vacuum is supplied by the central passage 1608 (FIGS. 16A, 16B) of the collar 1602 into the chamber formed by the head 1502 (FIGS. 15A, 15B) and cover 1402. The throughholes 1514 in the base 1506 of the head 1502 supply the vacuum into the interior volume defined at the proximate end of the proximate portion 706*a* (FIGS. 11A, 11B) of the receiver 706. The through-passage 726*a* of the proximate portion 706*a* of the receiver 706 fluidly communicatively couples the vacuum from the proximate portion 706*a* of the receiver 706 to the through-passage 726*c* of the intermediate portion 706*c* (FIGS. 10A, 10B) of the receiver 706, which in turn fluidly communicatively couples the vacuum to the through-passage 726*b* of the distal portion 706*b* (FIGS. 9A, 9B) of the receiver 706. Supplying a negative pressure at a proximate end can draw a single specimen container 1902 into, or further into, the receiver 706, for example drawing a cap 1906 of the single specimen container 1902 (FIG. 19) into the through-passage 726*a* of the proximate portion 706*a*. Additionally, or alternatively, supplying a positive pressure at a proximate end, can push a single specimen container 1902 out of, or further out of the receiver 706.

Figure 17:
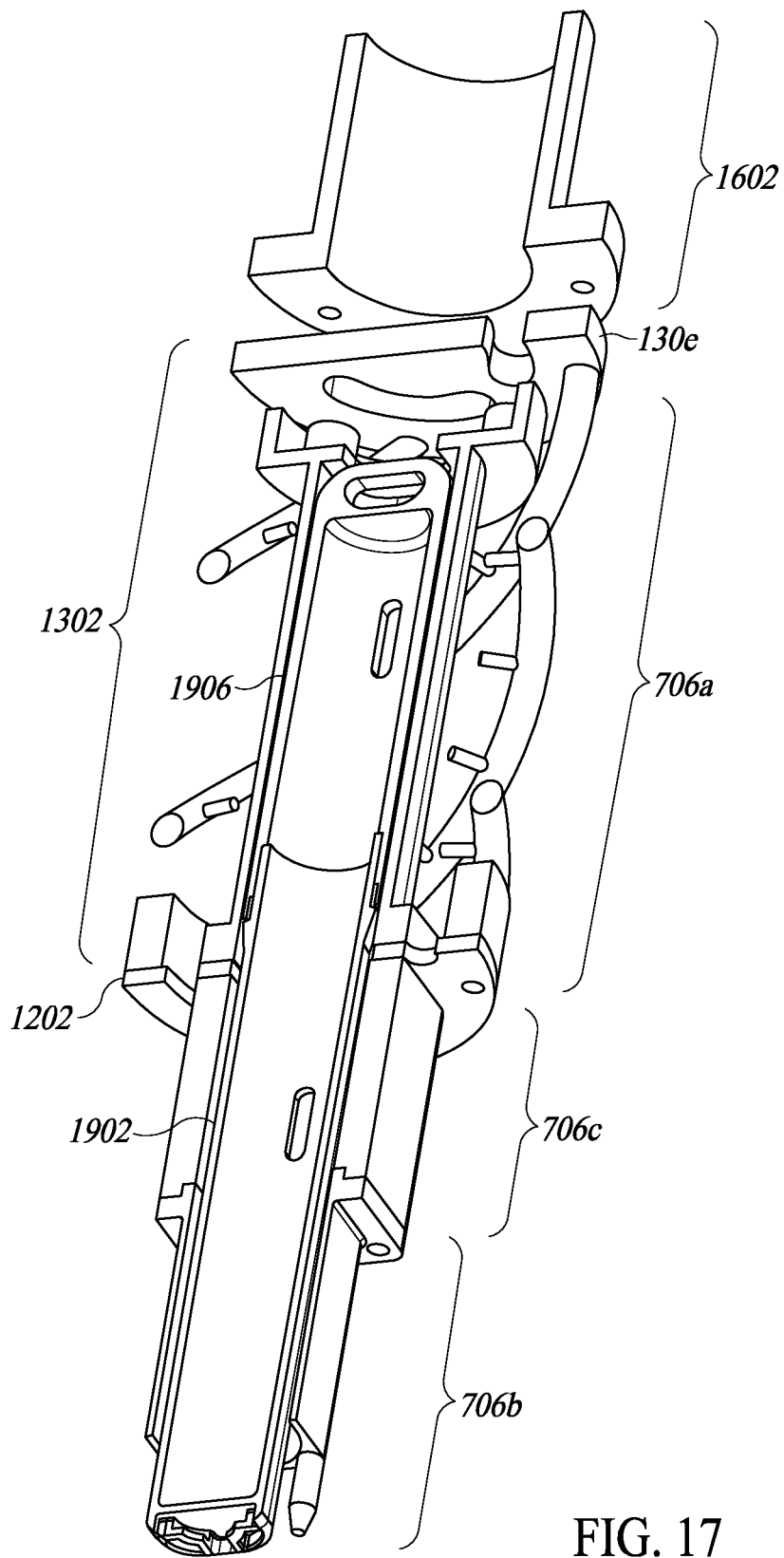
FIG. 17 is a cross-sectional view of a portion of the vacuum-based system of FIGS. 7A and 8A showing a single specimen container positioned in a receiver thereof, according to at least one illustrated implementation.

FIG. 17 illustrates a portion of the vacuum-based system 700 of FIGS. 7A and 8A showing a single specimen container 1902 positioned in a receiver 706 thereof, according to at least one illustrated implementation.

A cap 1906 of the single specimen container 1902 is positioned in the through-passage 726*a* of the proximal portion 706*a* of the receiver 706, while most of the vial portion 1904 extends through the through-passages 726*c*, 726*b* of the intermediate and distal portions 706*c*, 706*b*, respectively, of the receiver 706. Notably, the cap 1906 may have larger outer dimensions than corresponding outer dimensions of the vial 1904 of the single specimen container 1902.

In use, the torque coupler 1302 transmits rotation of the drive shaft 708 into rotation of the proximate portion 706*a* of the receiver 706, while the intermediate and distal portions 706*c*, 706*b* of the receiver 706 remain fixed due to the pivot plate 1308. The application of torque rotates the proximate portion 706*a*. The internal passage 726*a* of the proximate portion 706*a* engages portions of the cap 1906, hence the single specimen container 1902 rotates along with the proximate portion 706*a*. The rotation of the single specimen container 1902 relative to the intermediate and distal portions 706*c*, 706*b*, causes a profile of an opening at a proximate end of the intermediate portion 706*c* and/or through-passage 726*c* thereof to no longer align with a corresponding profile of a distal portion of the cap 1906 of the single specimen container 1902, and thereby prevents translation of the single specimen container 1902 with respect to the longitudinal axis of the receiver 706. At this point, application of the vacuum may be stopped since translation of the single specimen container 1902 is physically prevented.

In at least some implementations, the vacuum-based system 700 of FIGS. 7A and 8A may include a manual override mechanism that manually dispenses the single one of the specimen containers from the receiver, for example even when frost buildup prevents the at least one actuator from successfully dispensing the single one of the specimen containers from the receiver. The manual override mechanism may, for example, include at least one handle, for instance a knob, that extends lateral from the drive shaft. The manual override mechanism may optionally include a slot in a side wall of the receiver and a cover that selectively provides access laterally into the interior of the receiver via the side wall, similar in some respects to a bolt action rifle.

FIG. 18 shows a control system 1802 which may be part of, or communicatively coupled to the mechanical system 100 (FIGS. 1, 2, 7B and 8B) and/or the vacuum-based system 700 (FIGS. 7A and 8A), according to at least one illustrated implementation.

The control system 1802 may include one or more processors, for example one or more of: one or more microprocessors 1804, one or more digital signal processors (DSPs) 1806, one or more application specific integrated circuits (ASICs) and/or one or more field programmable gate array (FPGAs) operable to execute programmed logic. The control system 1802 may also include nontransitory processor-readable storage media, for example nonvolatile memory such as read only memory (ROM) and/or FLASH 1808 and/or volatile memory such as random access memory (RAM) 1810. The ROM/FLASH 1808 and RAM 1810 are communicatively coupled to the microprocessor 1814 via one or more communications channels, for example a power bus, instruction bus, address bus, command bus, etc. The microprocessor 1804 executes logic, for example logic stored in the nontransitory processor-readable media (e.g., ROM/FLASH 1806, RAM 1808) as one or more sets of processor-executable instructions and/or data. The microprocessor 1804 may also be communicatively coupled to a communications radio 1812 and associated antenna 1814 and/or wired communications port 1816 to provide information and data to external systems and/or to receive instructions therefrom.

The control system 1802 may include one or more sensors.

For example, the control system 1802 may include one or more position sensors 1818 (two shown) communicatively coupled with the processor(s) 1804, 1806. The position sensor(s) 1818 may be positioned and/or oriented to detect a position of the pick and/or place head 102 (FIGS. 1, 2, 7B and 8B) or pick and/or place head 702 (FIGS. 7A and 8A), for example with respect to one or more specimen containers 1902. The position sensor(s) 1818 may be positioned and/or oriented to detect a position of the engagement head 110 (FIGS. 1, 2, 7B and 8B) relative to the single one of the specimen containers 1902. The position sensor(s) 1818 may be positioned and/or oriented to detect a position of the single one of the specimen containers 1902 with respect to the receiver 106 (FIGS. 1, 2, 7B and 8B), 706 (FIGS. 7A and 8A) or portion thereof. The processor(s) 1804, 1806 provide control signals based on positions detected by the position sensor(s) 1818, for example providing control signals to at least one actuator (e.g., translation motor) to translate the pick and/or place head 102 (FIGS. 1, 2, 7B and 8B) or pick and/or place head 702 (FIGS. 7A and 8A), or a portion thereof (e.g., drive shaft 108).

For example, the control system 1802 may include one or more orientation sensors 1820 (two shown) communicatively coupled with the processor(s) 1804, 1806. The orientation sensor(s) 1820 may be positioned and/or oriented to detect an orientation of the single one of the specimen containers 1902 or a portion thereof (e.g., handle 1912 on cap 1906) relative to a portion of the pick and/or place head 102 (FIGS. 1, 2, 7B and 8B) or pick and/or place head 702 (FIGS. 7A and 8A), for example with respect to one or more specimen containers 1902. For instance the orientation sensor(s) 1820 may detect an orientation of the handle 1912 on cap 1906 with respect to the engagement head or lugs thereof. For instance, the control system 1802 can employ feedback from one or more encoders to determine an orientation of a specimen container 1902 and/or a handle 1912 on cap 1906 thereof, for example employing timing feedback from the encoder(s) that, for example, represents a stalling of a motor (e.g., rotation motor 162b) on engagement with a portion of the specimen container 1902 to determine the orientation of the specimen container 1902. The processor(s) 1804, 1806 provides control signals based on positions detected by the orientation sensor(s) 1820, for example providing control signals to at least one actuator (e.g., rotation motor) to rotate a portion of the pick and/or place head 102 (FIGS. 1, 2, 7B and 8B) or pick and/or place head 702 (FIGS. 7A and 8A), for instance to rotate a drive shaft 108, 708.

For example, the control system 1802 may include one or more frost detectors that detects frost build up on one or more portions of the system, the at least one frost detector communicatively coupled with the processor(s) 1804, 1806, wherein with the processor(s) 1804, 1806 provides control signals based at least in part on detected frost build up. The frost detectors can take a variety of forms, for example one or more frost sensors 1822 (two shown) and/or one or more resistance sensor(s) 1824.

The frost sensors 1822 may detect a frost build up, for example on a portion of the receiver 106, 706, on a drive shaft 108, 708 and/or a portion of a single specimen container 1902. The frost sensor(s) 1822 may, for instance optically detect the presence and/or absence of frost, for example using ambient light or via active lighting of specific wavelengths that may differ from the mixture of wavelengths comprising conventional white light. The frost sensor(s) 1822 may for example employ LIDAR to detect not only a presence, but also an extend of frost buildup.

The resistance sensor(s) 1824 may detect a resistance or change of resistance to motion of one or more components of the pick and/or place head 102 (FIGS. 1, 2, 7A and 8B) or pick and/or place head 702 (FIGS. 7A and 8A), for instance resistance to or change of resistance in the translation and/or rotation of the drive shaft 108, 708. The resistance sensor(s) 1824 may, for example, include circuitry (e.g., torque sensor or transducer, torque cell, strain gauge) that detects electromotive force or reaction torque.

The processor(s) 1804, 1806 provide control signals based on frost detected by the frost sensors 1822 and/or resistance sensor(s) 1824, for example providing control signals to at least one actuator (e.g., translation motor, rotation motor) to translate and/or rotate a portion of the pick and/or place head 102 (FIGS. 1, 2, 7B and 8B) or pick and/or place head 702 (FIGS. 7A and 8B), for instance to translate or rotate a drive shaft 108, 708. Additionally or alternatively, the processor(s) 1804, 1806 provide control signals based on frost detected by the frost sensors 1822 and/or resistance sensor(s) 1824 to, for instance, cause activation of one or more defrosters 1826 (two shown), to defrost a frost build up, for example on a portion of the receiver 106, 706, on a drive shaft 108, 708 and/or a portion of a single specimen container 1902. Additionally or alternatively, the processor(s) 1804, 1806 provide control signals based on frost detected by the frost sensors 1822 and/or resistance sensor(s) 1824 to, for instance cause a notification or alert to be presented, notifying an end user of a potential issue which may require manual service or manual intervention.

For example, the control system 1802 may include one or more optical sensors 1828 (two shown) communicatively coupled with the processor(s) 1804, 1806. The optical sensor(s) 1828 may be positioned and/or oriented to detect the single one of the specimen containers 1902 or a portion thereof, and/or to detect or optically read information (e.g., one-dimensional or two-dimensional machine-readable symbols) carried by or on the single one of the specimen containers 1902. The optical sensor(s) 1828 may be positioned and/or oriented to detect the single one of the specimen containers 1902 or a portion thereof, and/or to image an interior of the single one of the specimen containers 1902 to determine or assess the contents thereof. The optical sensor(s) 1828 may take a variety of forms. For example, the optical sensor(s) 1828 may take the form of a linear or two-dimensional array of charged-coupled devices (CCDs), for use with imaging of a machine-readable symbol using ambient lighting or active lighting. Also for example, the optical sensor(s) 1828 may take the form of a photo-diode, for use with "flying spot" machine-readable symbol reader using active lighting in which a spot of light is moved across the machine-readable symbol. The information may include information that uniquely identifies the single one of the specimen containers 1902 or the contents thereof.

For example, the control system 1802 may include one or more wireless interrogators 1830 communicatively coupled with the processor(s) 1804, 1806. The wireless interrogator(s) 1830 may include one or more interrogation radios 1832 and one or more interrogation antennas 1834 communicatively coupled to the interrogation radios 1832. The wireless interrogator(s) 1830 may include one or more mixers, filters, amplifier analog-to-digital converters and/or other electrical and electronic components operable to cause transmission of interrogation signals and processing of return signals, for example components employed in RFID interrogators. One or more processors, for example the DSP 1806 may be communicatively coupled to the interrogation radio 1832, for example to control a transmitter section and to receive signals (e.g., I/Q signals) from a receiver section of the interrogation radio 1832. The DSP 1806 may perform preprocessing on the received signals (e.g., I/Q signals) to extract information (e.g., unique identifier) from the received signals, for example including a baseband filter to filter a baseband from the received signals.

The interrogation antenna(s) 1834 may be positioned and/or oriented to interrogate wireless transponders (e.g., radio frequency identification (RFID) transponders) carried by or on the single one of the specimen containers 1902 when the single one of the specimen containers 1902 is correctly positioned in the receiver 106, 706, to wirelessly detect or read information encoded in the wireless transponder(s) carried by or on the single one of the specimen containers 1902. The information may include information that uniquely identifies the single one of the specimen containers 1902 or the contents thereof. The information may, for example, include any one or more of identification information (e.g., unique identifier for the specimen container 1902, the specimen, patient name or identifier and/or date of birth, clinic identifier, clinician identifier, procedure, times, dates).

Sensors may, for example, include one or more of contact switches, momentary switches, optical detectors for instance an infrared light emitting diode and sensor pair, range finder, time of flight camera.

The interrogation (e.g., an interrogation cycle) or optical reading may by automatic and autonomous triggered, for example in response to detection of the specimen container 1902 being in a certain position (e.g., fully inserted) in the receiver 106, 706. Automatic and autonomously triggered interrogation and/or optical reading may improve overall information capture since such is triggered based on correct positioning of the antenna of the wireless transponder carried by the specimen container 1902 with respect to the interrogation antenna(s) 1834. The automatic and autonomous triggered optical capture of information may improve overall optical capture of information from the specimen container 1902 since such is triggered based on correct positioning of a portion of the specimen container 1902 bearing optically readable information with respect to the optical sensors 1828.

The control system 1802 may include one or more actuators or transducers.

For example, the control system 1802 may include one or more electric motors (e.g., stepper motors) 1836a, 1836b, 1836c. The electric motors 1836a, 1836b, 1836c may, for example correspond to the translation motor 112a, rotation 112b, and motors 162a, 162b (FIGS. 1, 2, 7B and 8B). For example, one or more motors (e.g., 162a, 162b) can be drivingly coupled to move (e.g., translate) the pick and/or place head 102 along one or more rails with respect to a target (e.g., array of containers, vials or beacons), while one or more motors (e.g., 112a) can be drivingly coupled to move (e.g., translate) the shaft 108 and hence the engagement head 110 thereof with respect to a target (e.g., a single container, vial or beacon) and one or more motors (e.g., 112b) can be drivingly coupled to move (e.g., rotate) the shaft 108 and hence the engagement head 110 thereof with respect to a target (e.g., a single container, vial or beacon) to cause at least a portion (e.g., lugs 146a, 146b) of the engagement head 110 to alternatingly engage and disengage the first portion of the single one of the specimen containers 1902. The control system 1802 may include one or more motor controllers 1838 communicatively coupled to receive control signals from the processor 1804, and communicatively coupled to provide signals to control the motors 1836a, 1836b, 1836c accordingly.

For example, the control system 1802 may include one or more vacuum subsystems 1840 (one shown). The vacuum subsystem 1840 may, for example, include a vacuum source, for instance a vacuum pump 1842 or a Venturi, which is operated to generate a negative pressure. The vacuum subsystem 1840 may, for example, include a reservoir 1844 fluidly communicatively coupled to the vacuum source (e.g., vacuum pump 1842) to maintain a low pressure reservoir of fluid (e.g., air) thereon. The vacuum subsystem 1840 may, for example, include one or more ports 1846 fluidly communicatively coupleable to the vacuum conduit 710 of the pick and/or place head 702 to induce a negative pressure or vacuum therein. The port(s) 1846 may include any of a large variety of mechanical couplers, for example threaded couplers, bayonet couplers, detents, etc., which may allow detachable physical coupling or even permanent physical coupling. The vacuum subsystem 1840 may, for example, include one or more values 1848 operable to control fluid communication between the reservoir 1844 and the port(s) 1846, for example either manually and/or in response to control signals provided by the processor 1804. The valves 1848 may take any of a large variety of forms commonly employed with control of fluid flow, and in particular gas flow.

For example, the control system 1802 may include one or more defrosters 1826 selectively operable to defrost or remove a frost build up, for example on a portion of the receiver 106, 706, on a drive shaft 108, 708 and/or a portion of a single specimen container 1902. The defroster(s) 1826 may include one or more heat sources 1850 that is or are selectively operable to provide heat to at least one location in the system. The heat source(s) 1850 may take any of a large variety of forms, for instance electric-resistance radiant heat elements. The defroster(s) 1826 may include one or more blowers or fans 1852, selectively operable to conductively circulate heat generated by the heat source(s) 1850 to one or more components on which frost has built up or on which frost is expected to buildup. The heat source(s) 1850 and/or blowers or fans 1852 may be communicatively coupled with the at least one processor 1804, for control thereby.

The control system 1802 may include a user interface (UI) 1852. The UI 1852 may include one or more user interface (UI) components, for example one or more switches, triggers, display screens (e.g., LCD display), lights (e.g., LEDs), speakers, microphones, haptic engines, graphical user interfaces (GUIs) with via a touch-sensitive display screen which displays user-selectable icons operable to allow input to the control system 1802 and/or output from the control system 1802. The UI components allow a user to control operation and/or optionally to receive information. For example, a user may press a button, key or trigger to cause operation of pick and/or place head 102, 702.

While the above is described and illustrated with respect to automated operation including translating the pick and/or place head 102 (FIGS. 1, 2, 7B and 8B), 702 (FIGS. 7A and 8A) along a rail 104a, in some implementations the pick and/or place head 102 (FIGS. 1, 2, 7A and 8A), 702 (FIGS. 7A and 8A) may take the form of an end of arm tool or end effector (not illustrated) mounted to, or part of, a robotic appendage, and the positioning and triggering may be fully automated (i.e., performed autonomously by a robot), for example as part of a pick and place operation in response to signals from the at least one processor-based control system.

While the above is described with respect to automatic or autonomous operation, in some implementations the interrogation device or system may allow manual operation of one or more aspects.

FIG. 19 shows a holder 1900 include a plurality of specimen containers 1902 arranged in an array, according to one illustrated implementation.

The holder 1900 may include an array of positions 1900a (only one called out) in which respective ones of the specimen containers 1902 may be located and held, for example in a vertical orientation.

Each specimen container 1902 may comprises a vial 1904 and cap 1906. The vial 1904 is generally tubular, and includes one or more walls that delineate an interior or interior volume from an exterior thereof. The wall or a portion thereof may, for example, be transparent. The vial 1904 typically includes an opening (not visible) at a top thereof which provides access to the interior from the exterior. The vial 1904 may include a coupler feature (not visible) proximate the top thereof to detachable secure the cap 1906 thereto. The coupler feature may, for example, take the form of a thread, a detent, or a portion of a bayonet mount.

While illustrated as having a square with rounded corners cross-section or profile, the vial 1904 may in some implementations have other non-circular cross-sections or profiles, for example an oval cross-section or profile, a rectangular cross-section or profile, a square cross-section or profile, a D-shape cross-section or profile, hexagonal cross-section or profile, or octagonal cross-section or profile. In some instances, the vial 1904 may have a two or more different cross-sections or profiles that vary from one another along a longitudinal axis or length thereof.

The cap 1906 couples to the vial at a top thereof, and is moveable to provide and alternatingly prevent access to the interior from the exterior. In some implementations, the cap 1906 is completely removably from the vial 1904, while in other implementations the cap 1906 may remain tethered to the vial 1904 even when removed from the opening. The cap 1906 may include a complementary coupler feature 1908, that is complementary to the coupler feature of the vial 1904. The complementary coupler feature may, for example, take the form of a thread, a detent, or a portion of a bayonet mount sized, positioned or otherwise configured to engagingly mate with the coupler feature of the vial 1904.

The specimen container 1902 including the vial 1904 and cap 1906 may take any of a large variety of forms, and may be composed of any of a large variety of materials (e.g., plastics), for example materials which are suitable to withstand cryogenic temperatures and/or repeated cycling between room temperatures and cryogenic temperatures. The vial 1904 and/or the cap 1906 may include one or more ports 1910a and/or vents 1910b to allow ingress and egress of fluid (e.g., liquid nitrogen, air) into and out of the interior of the vial. In some implementations, the cap 1906 may include one or more engagement features that facilitate engagement, for example a handle 1912.

The specimen container 1902 has a set of outer dimensions 1914 that represent the outer dimensions of at least one portion (e.g., cap 1906, vial 1904) of the specimen container 1902 measure at one or more positions along a longitudinal axis of the specimen container 1902. For example, FIG. 19 illustrates a set of outer dimensions 1914 of the cap 1906, which includes a first dimension between outer portions of a first pair of parallel sides, a second dimension between outer portions of a second pair of parallel sides, and a third dimension between outer portions of two corners that extend between perpendicular sides (e.g., third dimension extends across diametrically opposed corners). The set of outer dimensions 1914 may, for example, be the outer lateral dimensions of a largest portion of the single one of the specimen containers 1902 to be received in the receiver 106, 706. In at least some implementations, the vial 1904 and the cap 1906 will have the similar or even the same profile, although the outer lateral dimensions of the cap 1906 will typically be slightly larger than the corresponding outer lateral dimensions of the vial 1904. As noted earlier, an interior passage of the receiver 706, 706 has a shape or profile and interior dimensions that allow the outer dimensions of at least a portion of a single one of the specimen containers 1902 to be received therein, and in at least some implementations prevent or restrain the single one of the specimen containers 1902 from rotating within the receiver 106, 706. For instance, the interior passage 726a of the proximate portion 706a of the receiver 706 may have inner lateral dimensions to closely receive the outer lateral dimensions of the cap 1906. In contrast the receiver 106 may not restrain rotation of the single one of the specimen containers 1902, relying rather on the engagement head 110 to restrain such. Thus, the receiver 106 may have inner lateral dimensions to loosely receive the outer lateral dimensions of the cap 1906.

The specimen container 1902 may hold one or more specimen holders (not visible), which may take any of a large variety of forms capable of retaining a biological specimen, according to one illustrated implementation. For example, the specimen holders may take the form of cryopreservation straws, cryopreservation tubes, sticks or spatulas. The specimen holders may be composed of any of a large variety of materials (e.g., plastics), for example materials which are suitable to withstand cryogenic temperatures and/or repeated cycling between room temperatures and cryogenic temperatures.

One or more wireless transponders (not visible), for example radio frequency identification (RFID) transponders, are physically associated with the specimen container 1902. For example, one or more wireless transponders may be physically secured to the vial 1904, for instance molded thereon, secured thereto via adhesive and/or fasteners, or via an interference fit or even a shrink fit. Also for example, one or more wireless transponders may be physically secured to the cap 1906, for instance molded thereon, secured thereto via adhesive and/or fasteners, or via an interference fit or even a shrink fit. Additionally or alternatively, one or more wireless transponders may, for example, be physically secured to the specimen holders 102, for instance molded thereon, secured thereto via adhesive and/or fasteners, or via an interference fit or even a shrink fit.

Typically, the wireless transponder(s) will have an antenna and will be secured to the such that a principal axis of transmission of the antenna is aligned with the longitudinal axis or length of the vial 1904, although such is not necessary to operation of the described embodiments. The antenna of the wireless transponder(s), whether attached to the vial 1904, cap 1906, or specimen holders will also be located at a defined distance along the longitudinal axis or length of the vial 1904 from some fixed point (e.g., a top of the cap 1906, or top of the vial 1904).

One or more optically readable symbols (not visible), for example machine-readable symbols (e.g., one- or two-dimensional machine-readable symbols for instance barcode symbols or QR code symbols) and/or human-readable symbols (e.g., alphanumeric symbols) may be carried by or inscribed in or on the specimen container 1902.

Figure 20:
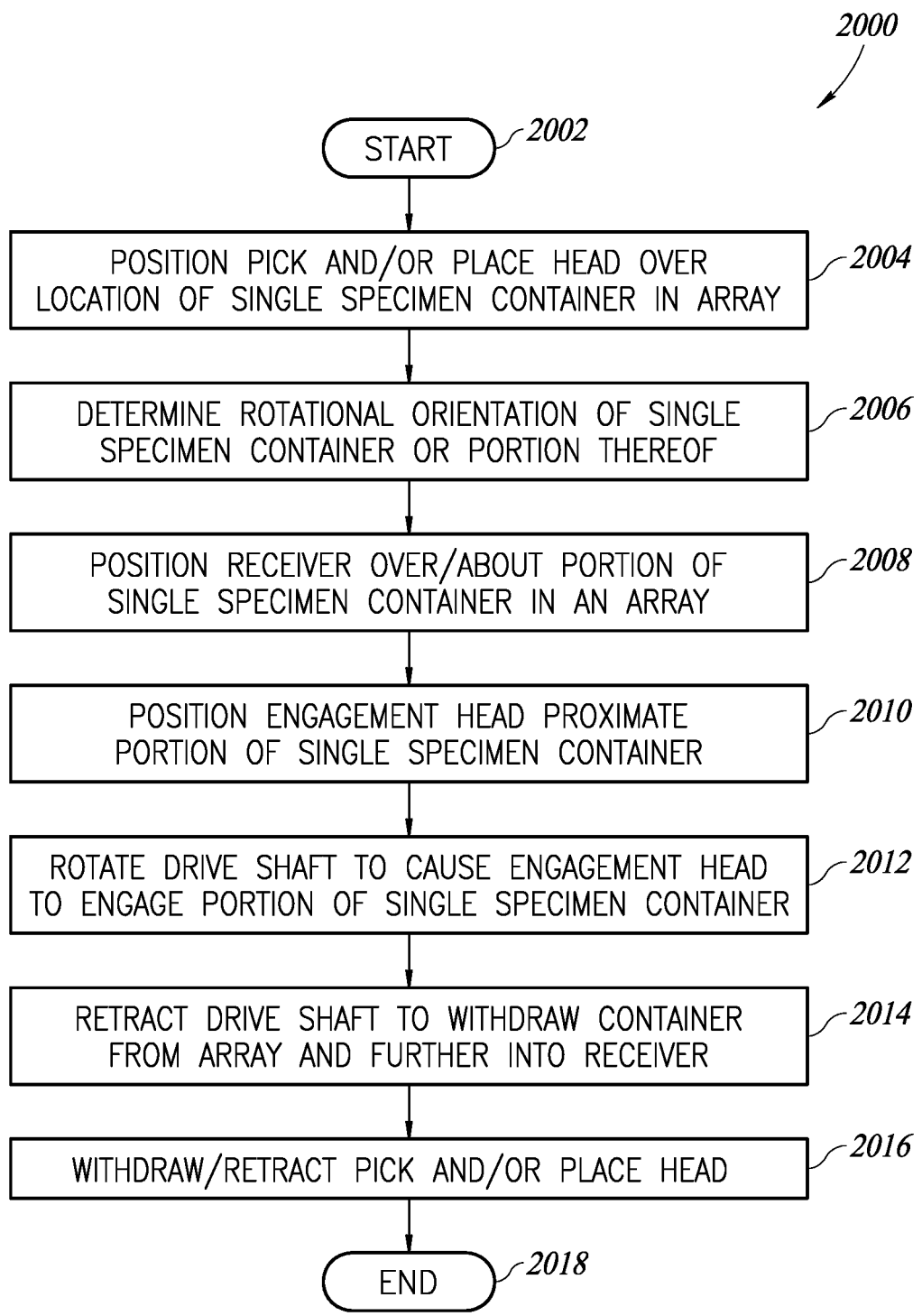
FIG. 20 is a flow diagram showing a method of operating a mechanical system of FIGS. 1, 2, 7B and 8B with a pick and/or place head to pick a single one of the specimen containers from an array of specimen containers, according to at least one illustrated implementation.

FIG. 20 shows a method 2000 of operating a mechanical system 100 (FIGS. 1, 2, 7B and 8B) with a pick and/or place head 102 to pick a single one of the specimen containers from an array of specimen containers, according to at least one illustrated implementation.

The method may start at 2002, for example in response to a powering ON event, a user input, or an invocation from a calling routine.

At 2004, a pick and/or place head 102 is moved to be positioned over a location of selected single specimen container in an array of specimen containers.

At 2006, a control system of the mechanical system 100 determines a rotational orientation of the selected single one of the specimen containers or portion thereof. For example, the control system may employ an image (e.g., image of top plane view) of a portion (e.g., handle of cap) of the selected single one of the specimen containers, performing image processing to determine an orientation of the portion.

At 2008, the control system of the mechanical system 100 positions the receiver over/about at least portion of selected single specimen container in an array of specimen containers or portion thereof, with at least the portion of the selected single specimen container received within a portion of receptacle. For example, the control system may send signals to a motor controller that causes a motor to translate the pick and/or place head 102 toward (e.g., downward) the single specimen container until at least a portion of the single specimen container is positioned within the internal passage of a portion of the receiver 106.

At 2010, the control system of the mechanical system 100 positions the engagement head proximate a portion (e.g., handle on cap) of the single specimen container. For example, the control system may send signals to a motor controller that causes a motor to extend the drive shaft toward (e.g., downward) the handle on the cap of the single specimen container. The control system may translate the drive shaft a defined distance, or may rely on signals from one or more sensors to determine when the engagement head is properly positioned with respect to the portion of the portion of the single specimen container.

At 2012, the control system of the mechanical system 100 the rotates the drive shaft to cause a portion (e.g., lugs) of engagement head to engage a portion (e.g., handle on cap) of the single specimen container. For example, the control system may send signals to a motor controller that causes the motor to rotate (e.g., counterclockwise, clockwise) the drive shaft such that the lugs physically engage the handle on the cap of the single specimen container.

At 2014, the control system of the mechanical system 100 retracts the drive shaft to withdraw container from array and further into the receiver. For example, the control system may send signals to a motor controller that causes a motor to retract the drive shaft (e.g., upward) with the lugs physically engaged with the handle on the cap of the single specimen container. The control system may translate the drive shaft a defined distance, or may rely on signals from one or more sensors to determine when the engagement head is properly positioned with respect to a portion of the receiver.

At 2016, the control system of the mechanical system 100 withdraws or retracts the pick and/or place head 102, for example to move the pick and/or place head 102 out of the cryogenic freezer or dewar along with the single specimen container located in the receiver. For example, the control system may send signals to a motor controller that causes a motor to translate the pick and/or place head 102 away (e.g., upward) from the array of specimen containers, for example until the pick and/or place head 102 is clear of the array and optionally clear of the cryogenic freezer or dewar.

The method 2000 may terminate at 2018, for example until invoked again. Alternatively, the method 2000 may repeat to pick or retrieve additional specimen containers from the array of specimen containers.

Figure 21:
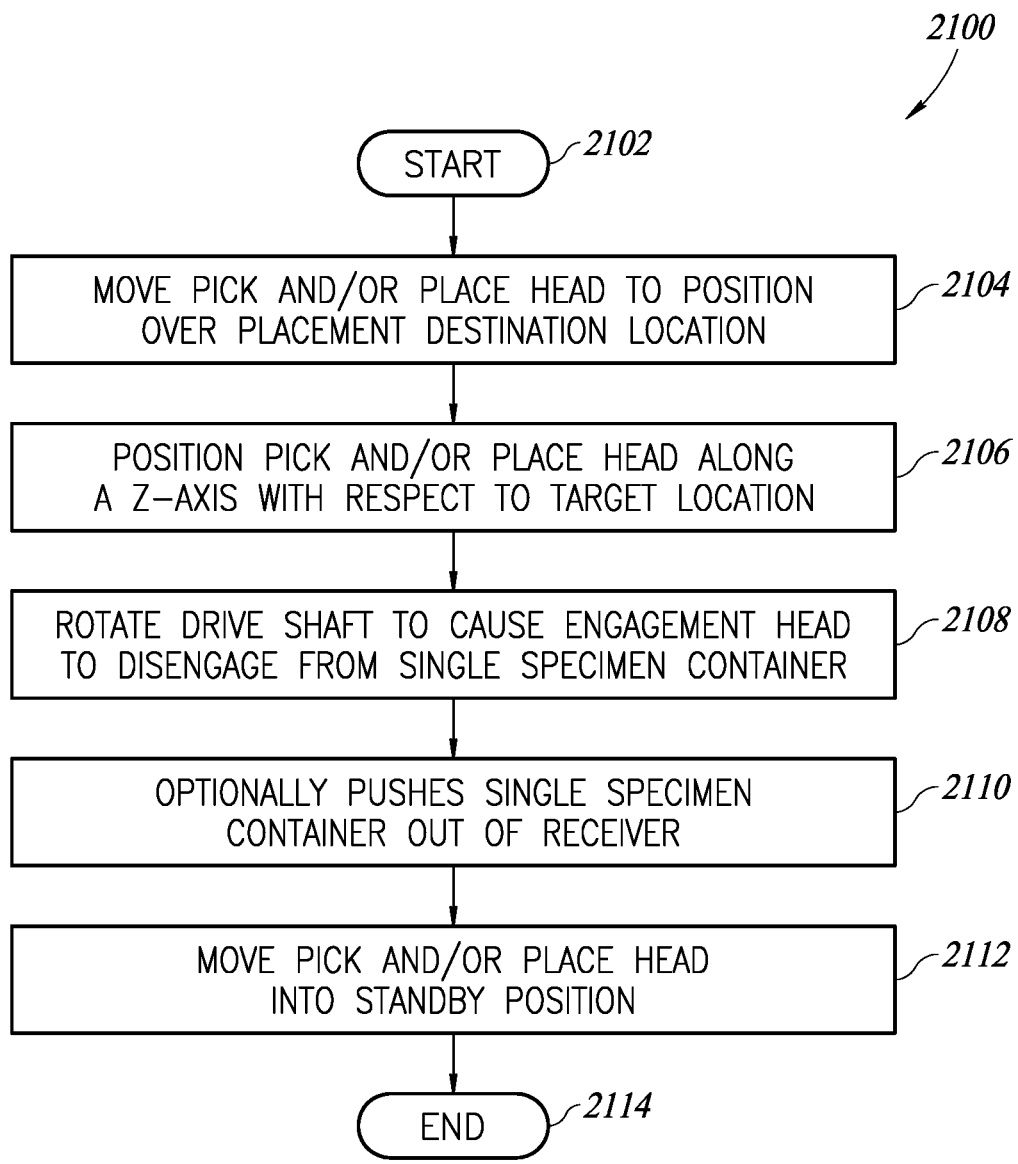
FIG. 21 is a flow diagram showing a method of operating a mechanical system of FIGS. 1, 2, 7B and 8B with a pick and/or place head to place a single one of the specimen containers, according to at least one illustrated implementation.

FIG. 21 shows a method 2100 of operating a mechanical system 100 (FIGS. 1, 2, 7B and 8B) with a pick and/or place head 102 to place a single one of the specimen containers, according to at least one illustrated implementation.

The method may start at 2102, for example in response to a powering ON event, a user input, or an invocation from a calling routine.

At 2104, a pick and/or place head 102 is moved to be positioned over a destination location at which a single specimen container will be placed, for example placed into an array of specimen containers.

At 2106, the control system of the mechanical system 100 positions the pick and/or place head 102 along a Z-axis with respect to the target location. For example, the control system may send signals to a motor controller that causes a motor to translate the pick and/or place head 102 toward (e.g., downward) the target location, positioning a distal end of a receiver proximate the target location.

At 2108, the control system of the mechanical system 100 the rotates the drive shaft to cause a portion (e.g., lugs) of engagement head to disengage from a portion (e.g., handle on cap) of the single specimen container. For example, the control system may send signals to a motor controller that causes the motor to rotate (e.g., clockwise, counterclockwise) the drive shaft such that the lugs physically disengage the handle on the cap of the single specimen container.

Optionally at 2110, the control system of the mechanical system 100 pushes the single specimen container out of the receiver 106. For example, the control system may send signals to a motor controller that causes a motor to extend the drive shaft toward (e.g., downward), for example overcoming any natural resistance or resistance due to the formation of frost. The control system may translate the drive shaft a defined distance, or may rely on signals from one or more sensors to determine when the engagement head is properly positioned with respect to pushing the single specimen container out of the receiver.

At 2112, the control system of the mechanical system 100 moves the pick and/or place head 102 into a standby position, for example translating the pick and/or place head 102 along the Z-axis, away from the target location. For example, the control system may send signals to a motor controller that causes a motor to translate the pick and/or place head 102 away (e.g., upward) the target location. As part of such, the control system may also, optionally, translate the engagement head of the drive shaft upward to a proximate portion of the receiver.

The method 2100 may terminate at 2014, for example until invoked again. Alternatively, the method 2100 may repeat to pick or retrieve additional specimen containers from the array of specimen containers.

Figure 22:
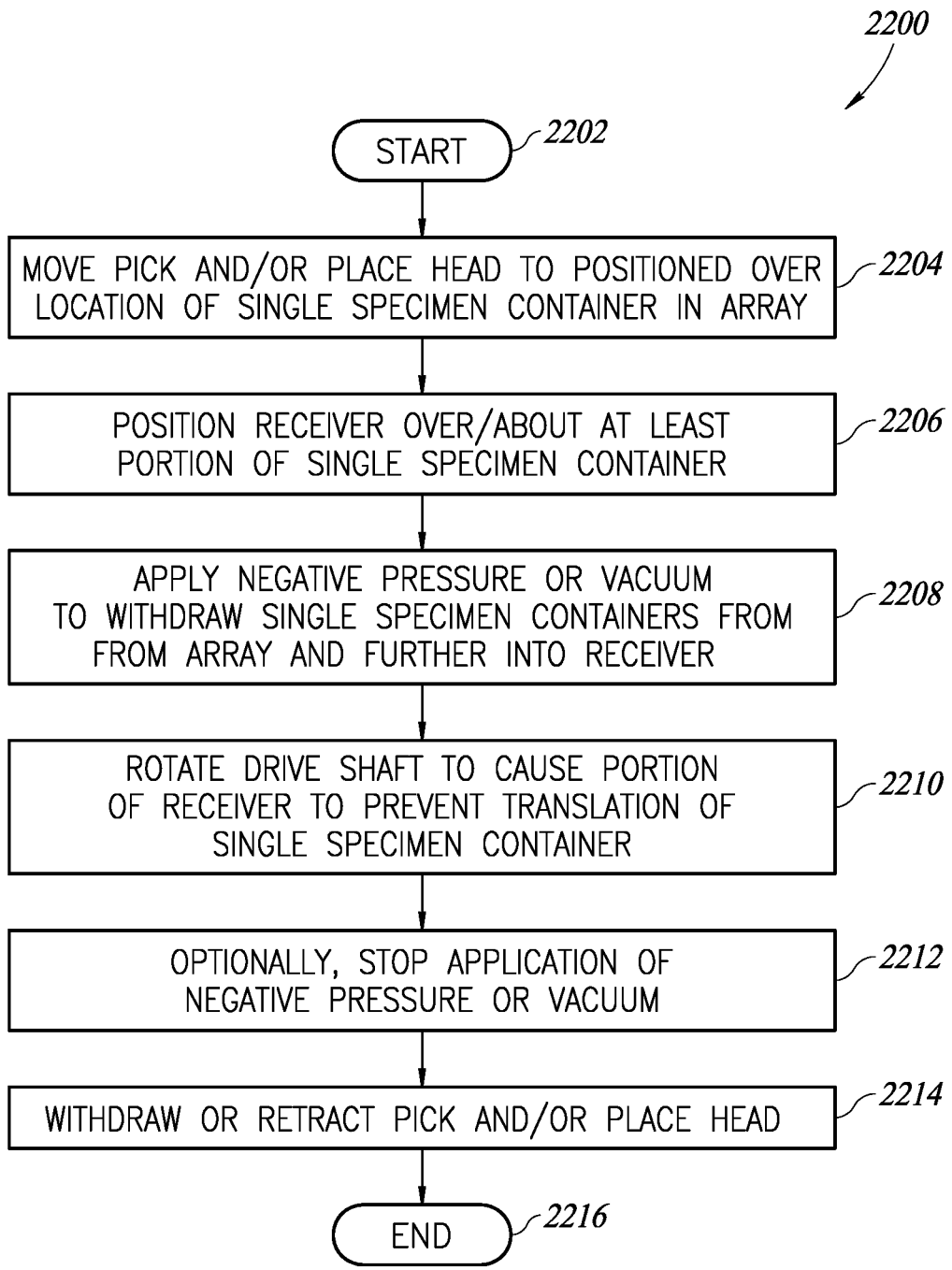
FIG. 22 is a flow diagram showing a method of operating a vacuum-based system of FIGS. 7A and 8A with a pick and/or place head to pick a single one of the specimen containers from an array of specimen containers, according to at least one illustrated implementation.

FIG. 22 shows a method 2200 of operating a vacuum-based system 700 (FIGS. 7A and 8A) with a pick and/or place head 702 to pick a single one of the specimen containers from an array of specimen containers, according to at least one illustrated implementation.

The method may start at 2202, for example in response to a powering ON event, a user input, or an invocation from a calling routine.

At 2204, a pick and/or place head 702 is moved to be positioned over a location of selected single specimen container in an array of specimen containers.

At 2206, the control system of the mechanical system 100 positions the receiver over/about at least portion of selected single specimen container in an array of specimen containers or portion thereof, with at least the portion of the selected single specimen container received within a portion of receptacle. For example, the control system may send signals to a motor controller that causes a motor to translate the pick and/or place head 702 toward (e.g., downward) the single specimen container until at least a portion of the single specimen container is positioned within the internal passage of a portion of the receiver 706.

At 2208, the control system of the mechanical system 100 applies a negative pressure or vacuum to withdraw a single one of the specimen containers from array and further into the receiver 706. For example, the control system may send signals to control a vacuum source and/or a valve controller that causes the negative pressure or vacuum to be applied via the through-passage of the proximate portion 706a of the receiver 706.

At 2210, the control system of the mechanical system 100 the rotates the drive shaft to cause a portion of receiver to prevent translation (e.g., downward or outward of receiver) of the single specimen container. For example, the control system may send signals to a motor controller that causes the motor to rotate (e.g., counterclockwise, clockwise) the drive shaft 708 such that the proximate portion 706a of the receiver 706 rotates with respect to an intermediary portion 706c and/or distal portion 706b of the receiver 706, where an inner profile of a through-passage 726c, 726b thereof no longer aligns with an inner profile of a through-passage of the proximate portion 706a and/or an outer profile of the single specimen container.

Optionally at 2212, the control system of the mechanical system 100 stops the application of the negative pressure or vacuum, with the single one of the specimen containers physically retained in the receiver 706. For example, the control system may send signals to control a vacuum source and/or a valve controller that causes application of the negative pressure or vacuum to be stopped.

At 2214, the control system of the mechanical system 100 withdraws or retracts the pick and/or place head 702, for example to move the pick and/or place head 702 out of the cryogenic freezer or dewar along with the single specimen container located in the receiver 706. For example, the control system may send signals to a motor controller that causes a motor to translate the pick and/or place head 702 away (e.g., upward) from the array of specimen containers, for example until the pick and/or place head 702 is clear of the array and optionally clear of the cryogenic freezer or dewar.

The method 2200 may terminate at 2216, for example until invoked again. Alternatively, the method 2200 may repeat to pick or retrieve additional specimen containers from the array of specimen containers.

Figure 23:
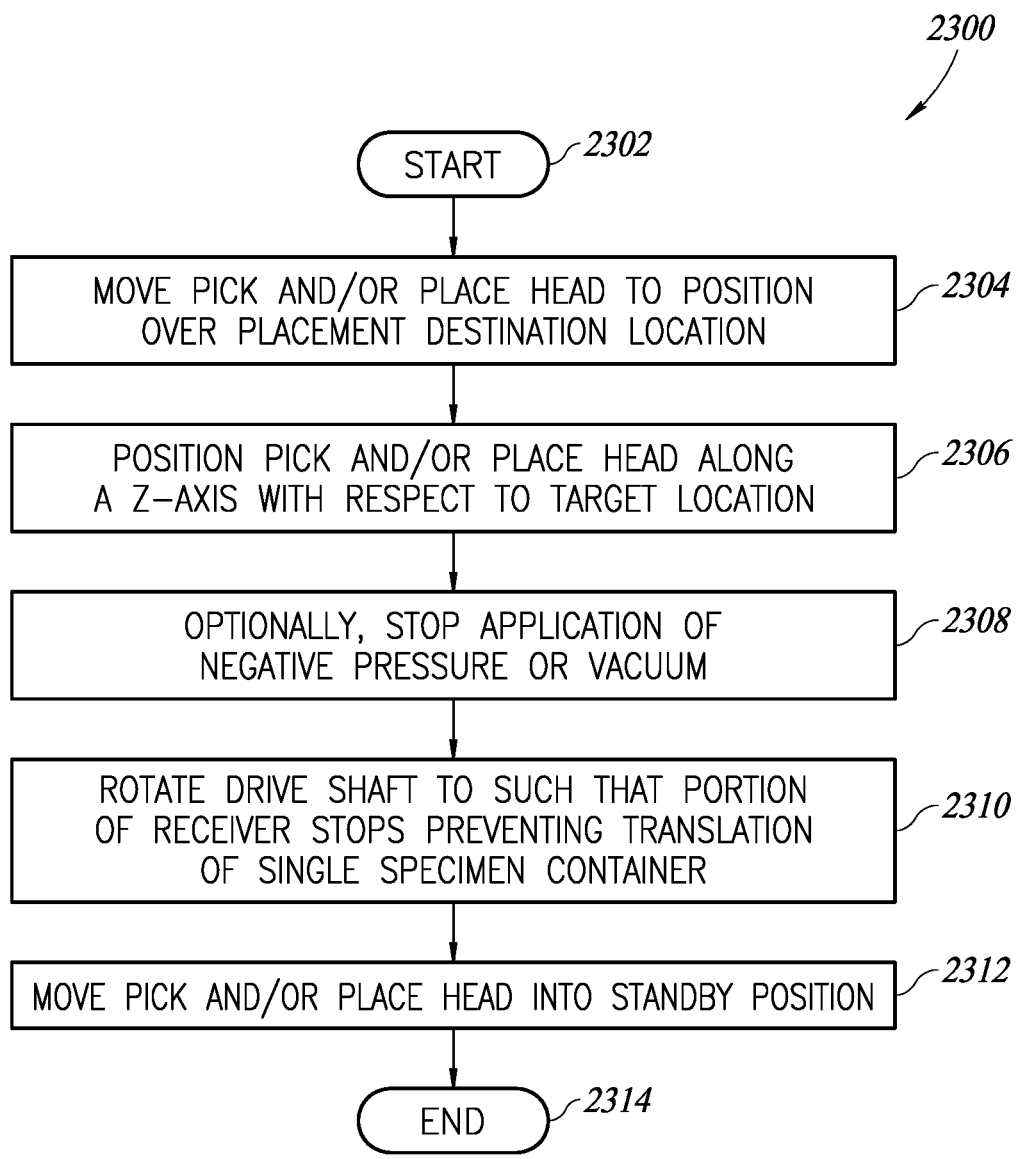
FIG. 23 is a flow diagram showing a method of operating a vacuum-based system of FIGS. 7A and 8A with a pick and/or place head to place a single one of the specimen containers, according to at least one illustrated implementation.

FIG. 23 shows a method 2300 of operating a vacuum-based system 700 (FIGS. 7A and 8A) with a pick and/or place head 702 to place a single one of the specimen containers, according to at least one illustrated implementation.

The method may start at 2302, for example in response to a powering ON event, a user input, or an invocation from a calling routine.

At 2304, a pick and/or place head 702 is moved to be positioned over a destination location at which a single specimen container will be placed, for example placed into an array of specimen containers.

At 2306, the control system of the mechanical system 100 positions the pick and/or place head 702 along a Z-axis with respect to the target location. For example, the control system may send signals to a motor controller that causes a motor to translate the pick and/or place head 702 toward (e.g., downward) the target location, positioning a distal end of a receiver proximate the target location.

Optionally at 2308, the control system of the mechanical system 100 stops the application of the negative pressure or vacuum, with the single one of the specimen containers physically retained in the receiver 706. For example, the control system may send signals to control a vacuum source and/or a valve controller that causes application of the negative pressure or vacuum to be stopped.

At 2310, the control system of the mechanical system 100 the rotates the drive shaft to cause a portion of receiver to stop preventing translation (e.g., downward or outward of receiver) of the single specimen container. For example, the control system may send signals to a motor controller that causes the motor to rotate (e.g., clockwise, counterclockwise) the drive shaft 708 such that the proximate portion 706a of the receiver 706 rotates with respect to an intermediary portion 706c and/or distal portion 706b of the receiver 706, where an inner profile of a through-passage 726c, 726b thereof aligns with an inner profile of a through-passage of the proximate portion 706a and/or an outer profile of the single specimen container.

At 2312, the control system of the mechanical system 100 moves the pick and/or place head 702 into a standby position, for example translating the pick and/or place head 702 along the Z-axis, away from the target location. For example, the control system may send signals to a motor controller that causes a motor to translate the pick and/or place head 702 away (e.g., upward) the target location.

The method 2300 may terminate at 2014, for example until invoked again. Alternatively, the method 2300 may repeat to pick or retrieve additional specimen containers from the array of specimen containers.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including: U.S. Application Ser. No. 63/087,000; U.S. application Ser. No. 16/593,062, now published as US2020-0107541; U.S. Application Ser. No. 62/927,566; U.S. Application Ser. No. 62/936,133; U.S. Application Ser. No. 63/026,526; U.S. application Ser. No. 29/748,815; International (PCT) Application Serial No. PCT/US2019/054722; U.S. application Ser. No. 17/082,359; U.S. application Ser. No. 17/083,179; U.S. Application Ser. No. 63/082,789; U.S. Application Ser. No. 63/106,533; U.S. Application Ser. No. 63/136,886; and U.S. Application Ser. No. 63/253,856, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to pick and/or place individual specimen containers from and/or to an array of specimen containers, the system comprising:
 a receiver having a proximate end, a distal end, and a receptacle having an opening at the distal end of the receiver, the receptacle having a principal axis and a set of lateral inner dimensions measured laterally with respect to the principal axis, the lateral inner dimensions of the receptacle sized to accommodate a set of lateral outer dimensions of at least a portion of a single container therein and at least a portion of the receptacle sized and configured to physically prevent rotation of the single one of the specimen containers about the principal axis while allowing translation with respect thereto;
 a drive shaft having a proximate end and a distal end; and
 an engagement head at the distal end of the drive shaft and which is configured to translate and rotate along with the drive shaft,
 wherein the drive shaft is translatable parallel with the principal axis and configured to selectively position the engagement head alternatingly distally from and proximate to a first portion of the single one of the specimen containers when the single one of the specimen containers is positioned at least partially in the receptacle of the receiver, and at least when positioned proximate to the first portion of the single one of the specimen containers the drive shaft is and configured selectively rotate alternatingly in a clockwise and a counterclockwise direction about the principal axis to cause at least a portion of the engagement head to alternatingly engage and disengage the first portion of the single one of the specimen containers while at least a portion of the receptacle of the receiver prevents the single one of the specimen containers from rotating about the principal axis.

2. The system of claim 1 wherein the receiver includes a proximate portion and a distal portion, the distal portion positioned at a distal end of the proximate portion.

3. The system of claim 2 wherein at least one of the proximate portion or the distal portion includes the portion of the receptacle sized to physically prevent rotation of the single one of the specimen containers about the principal axis while allowing translation with respect thereto.

4. The system of claim 2 wherein the distal portion includes a set of standoffs that extend distally to space the opening of the receptacle a defined distance from a planar surface of the array of containers.

5. The system of claim 2 wherein the receiver comprises a rectangular cuboid frame.

6. The system of claim 2 wherein the specimen containers are arranged in the array the specimen containers with a defined spacing between outmost portions of nearest neighboring ones of the specimen containers, and the distal portion of the receiver has an outer lateral dimension that provides a defined clearance with all neighboring ones of the specimen containers when any one of the specimen containers is positioned in the receptacle of the receiver.

7. The system of claim 1, further comprising:
 at least one bearing that supports the drive shaft for translation along the principal axis and rotation about the principal axis.

8. The system of claim 1 wherein the engagement head includes a base and a pair of lugs and each of the lugs comprises a stem extending downwardly from the base and a finger that extends radially inwardly from the stem, the finger having a distal most portion that is spaced radially inwardly of the principal axis, and the finger of each of the lugs is disposed in a same rotational direction about the principal axis as the finger of the other one of the pair of lugs.

9. The system of claim 8 wherein specimen containers each include a vial and a cap, the cap having a handle, the cap threadedly coupled to vials, and the lugs are disposed about the principal axis such that a counterclockwise rotation of the drive shaft causes the lugs to engage the handle of the cap in a direction in which the cap tightens to the vial, and such that a clockwise rotation of the drive shaft causes the lugs to disengage the handle of the cap.

10. The system of claim 1, further comprising:
one or more actuators drivingly coupled to control translation and rotation of the drive shaft and the engagement head; and
at least one processor-based control system communicatively coupled to control the one or more actuators.

11. The system of claim 10, further comprising:
at least one position sensor positioned to detect a position of the engagement head relative to the single one of the specimen containers, the at least one position sensor communicatively coupled with the at least one processor-based control system, the at least one processor-based control system which is configured to provide control signals to the at least one of the one or more actuators to translationally position the engagement head with respect to the first portion of the specimen container.

12. The system of claim 10, further comprising:
at least one orientation sensor positioned to detect an orientation of the single one of the specimen containers relative to the engagement head, the at least one orientation sensor communicatively coupled with the at least one processor-based control system, wherein the at least one processor-based control system is configured to provide control signals to the at least one of the one or more actuators to rotationally align at least one of the receiver, the receptacle or the engagement head with respect to the first portion of the specimen container.

13. The system of claim 10, further comprising:
at least one frost detector that detects frost build up on one or more portions of the system, the at least one frost detector communicatively coupled with the at least one processor-based control system, wherein the at least one processor-based control system is configured to provide control signals based at least in part on detected frost build up.

14. The system of claim 13 wherein the at least one frost detector comprises at least one sensor to detect a frost build up on a first member, on a second member, or on the single one of the specimen containers.

15. The system of claim 13 wherein the at least one frost detector detects a resistance or an increase in resistance to movement of the engagement head.

16. The system of claim 13, further comprising:
at least one defroster comprising at least one heat source that is selectively operable to provide heat to at least one location in the system, the at least one defroster communicatively coupled with the at least one processor-based control system.

17. The system of claim 1 wherein the receiver, the drive shaft and the engagement head form at least part of a pick and/or place head, and further comprising:
a rail on which the pick and/or place head are mounted to translate; and
one or more actuators drivingly coupled to control translation of the pick and/or place head in response to signals from at least one processor-based control system.

18. The system of claim 1, further comprising:
a manual override mechanism that manually dispenses the single one of the specimen containers from the receiver even when frost buildup prevents at least one actuator from successfully dispensing the single one of the specimen containers from the receiver, the manual override mechanism including at least one handle (e.g., a knob) that extends lateral from the drive shaft, and optionally includes a slot in a side wall of the receiver that selectively provides access into an interior of the receiver.

19. The system of claim 1 wherein the receiver, the drive shaft and the engagement head are all part of a pick and/or place head, and in order to retrieve the single one of the specimen containers from an array of the specimen containers, and at least one processor-based control system is configured to control one or more actuators to: i) move the pick and/or place head proximate the one of the specimen containers; ii) translate at least the distal portion of the receiver to encompass at least a portion of the single one of the specimen containers; iii) translate the drive shaft from a retracted position to an extended position to position the engagement head proximate a second portion of the single one of the specimen containers; iv) rotate the drive shaft in a first rotational direction about the principal axis to engage the second portion of the single one of the specimen containers with the engagement head while at least one first engagement feature prevents the single one of the specimen containers from rotating about the principal axis; v) translate the drive shaft from the extended position to the retracted position to draw the single one of the specimen containers further into the receiver, and vi) translate the pick and place head away from the array of specimen containers.

20. The system of claim 1 wherein the receiver, the drive shaft and the engagement head are all part of a pick and/or place head, and in order to place the single one of the specimen containers at a destination location, at least one processor-based control system is configured to control at least one actuator to: i) translate the pick and/or place head over the destination location; ii) translate the pick and/or place head to position in which at least the receiver proximate the destination location; iii) rotate the drive shaft in a second rotational direction about the principal axis to disengage a second portion of the single one of the specimen containers from the engagement head while at least one first engagement feature prevents the single one of the specimen containers from rotating about the principal axis; iv) translate the pick and/or place head away from the position in which at least the receiver is proximate the destination location.

21. The system of claim 20 wherein, in order to place the single one of the specimen containers at a destination location, the at least one processor-based control system is configured to control the at least one actuator to translate the drive shaft from a retracted position to an extended position to push the single one of the specimen containers out of the receiver after iii) the drive shaft was rotated in the second rotational direction about the principal axis to disengage the second portion of the single one of the specimen containers from the engagement head and before iv the pick and/or place head was translated away from the position in which at least the receiver is proximate the destination location.

22. A method operation of a system to pick individual specimen containers from or to an array of specimen containers, the system comprising a pick and/or place head comprising a receiver, a drive shaft and an engagement head at a distal end of the drive shaft, the method comprising:
  i) moving the pick and/or place head proximate the one of the specimen containers;
  ii) translating at least a distal portion of the receiver to encompass at least a portion of a single one of the specimen containers;
  iii) translating the drive shaft from a retracted position to an extended position to position the engagement head proximate a second portion of the single one of the specimen containers;
  iv) rotating the drive shaft in a first rotational direction about a principal axis to engage the second portion of the single one of the specimen containers with the engagement head while at least one first engagement feature prevents the single one of the specimen containers from rotating about the principal axis; and
  v) translating the drive shaft from the extended position to the retracted position to draw the single one of the specimen containers further into the receiver, and vi) translate the pick and place head away from the array of specimen containers.

23. A method operation of a system to place individual specimen containers to a destination location, the system comprising a pick and/or place head comprising a receiver, a drive shaft and an engagement head at a distal end of the drive shaft, the method comprising:
  i) translating the pick and/or place head over the destination location;
  ii) translating the pick and/or place head to position in which at least the receiver proximate the destination location;
  iii) rotating the drive shaft in a second rotational direction about a principal axis to disengage a second portion of a single one of the specimen containers from the engagement head while at least one first engagement feature prevents the single one of the specimen containers from rotating about the principal axis;
  iv) translating the pick and/or place head away from the position in which at least the receiver is proximate the destination location.

* * * * *